United States Patent

Miyazawa

[11] Patent Number: 5,960,148
[45] Date of Patent: Sep. 28, 1999

[54] IMAGE INFORMATION RECORDING METHOD AND APPARATUS, IMAGE INFORMATION REPRODUCING METHOD AND APPARATUS AND EDITING METHOD AND SYSTEM

[75] Inventor: Satoshi Miyazawa, Kanagawa, Japan

[73] Assignee: Sony Corporation, Tokyo, Japan

[21] Appl. No.: 08/781,190

[22] Filed: Jan. 10, 1997

Related U.S. Application Data

[62] Division of application No. 08/448,317, May 23, 1995, Pat. No. 5,706,386.

[30] Foreign Application Priority Data

May 24, 1994 [JP] Japan ................................. 6-109747

[51] Int. Cl.$^6$ ................................................ H04N 5/76
[52] U.S. Cl. .......................................... 386/52; 386/111
[58] Field of Search ............................. 386/52, 111, 109, 386/112, 124, 46, 95, 65; H04N 5/76

[56] References Cited

U.S. PATENT DOCUMENTS 5,191,436  3/1993  Yonemitsu ................... 386/52
5,631,742  5/1997  Shimoda ..................... 386/109

Primary Examiner—Huy Nguyen
Attorney, Agent, or Firm—Frommer Lawrence & Haug, LLP.; William S. Frommer

[57] ABSTRACT

The coded image information is divided into first and second groups in the same frame, and decoding information is added to the divided coded image information of the first and second groups. The first group of divided coded image information with the decoding information added in the recording unit is recorded in a first recording area of a recording medium, and the second group of divided coded image information with the decoding information added in the recording unit is recorded in a second recording area of the recording medium. It is determined whether a start-of-record frame or end-of-record frame of coded image information to be recorded agrees with an intermediate frame in the recording unit of coded image information recorded on the recording medium, in an editing recording mode in which the coded image information is recorded in superposed relation to the areas of the recording medium in which the first group of divided coded image information and the second group of divided coded image information are recorded.

4 Claims, 39 Drawing Sheets

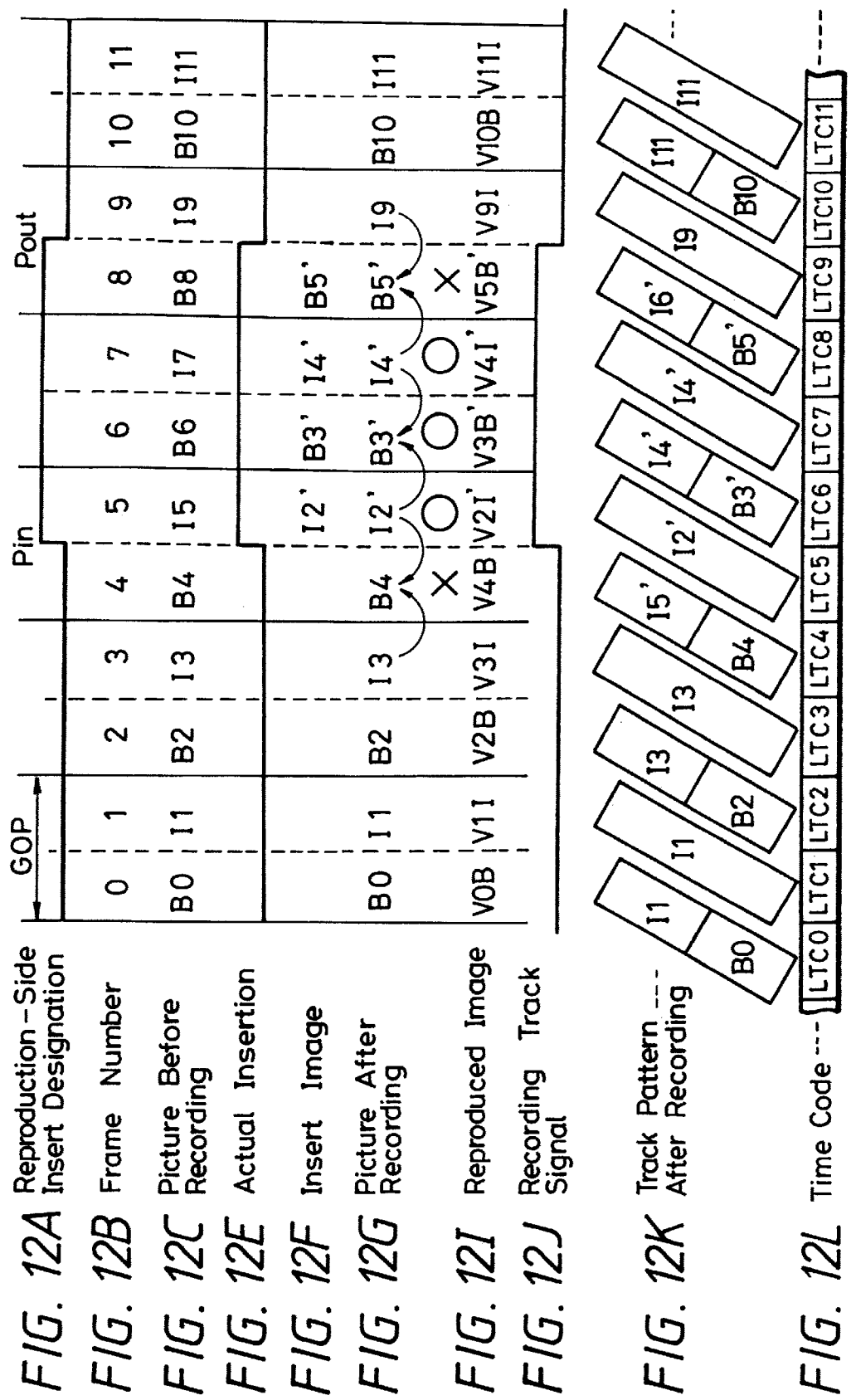

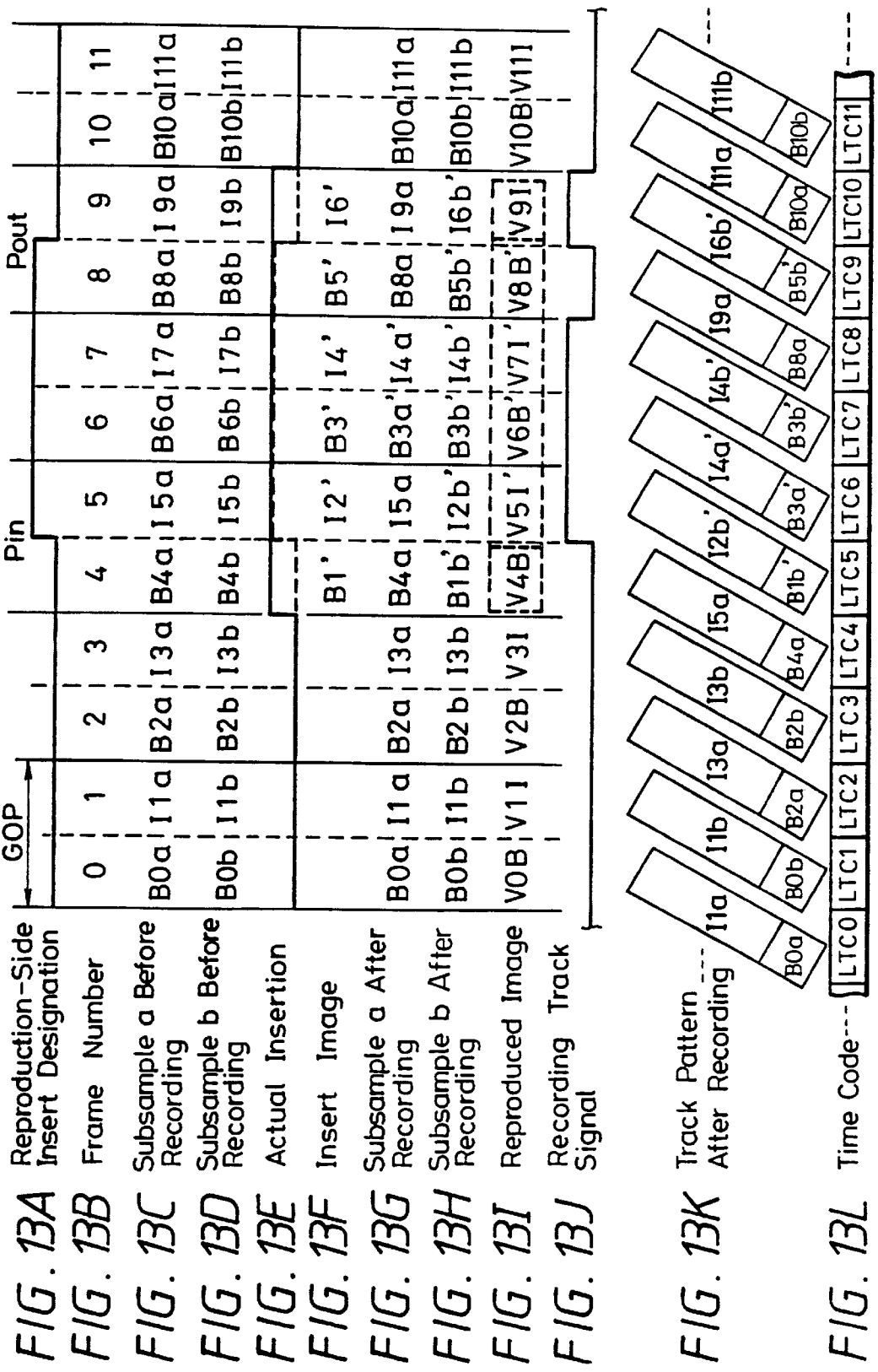

FIG. 15A
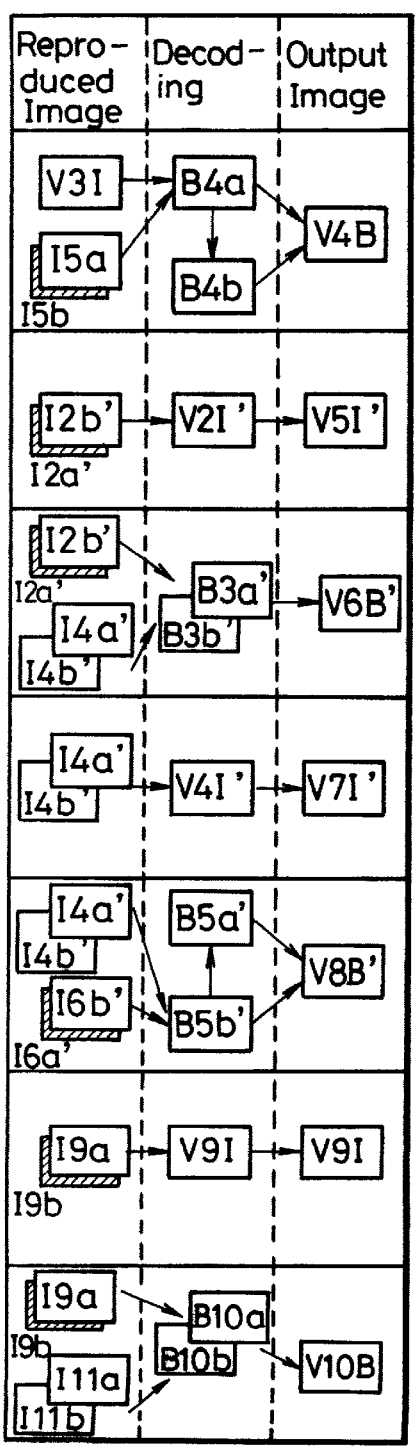
FIG. 15B
GOP SEL EDT Ba -- GOP SEL Ia ----
FIG. 15C
GOP SEL EDT Bb -- GOP SEL Ib ----
FIG. 15D
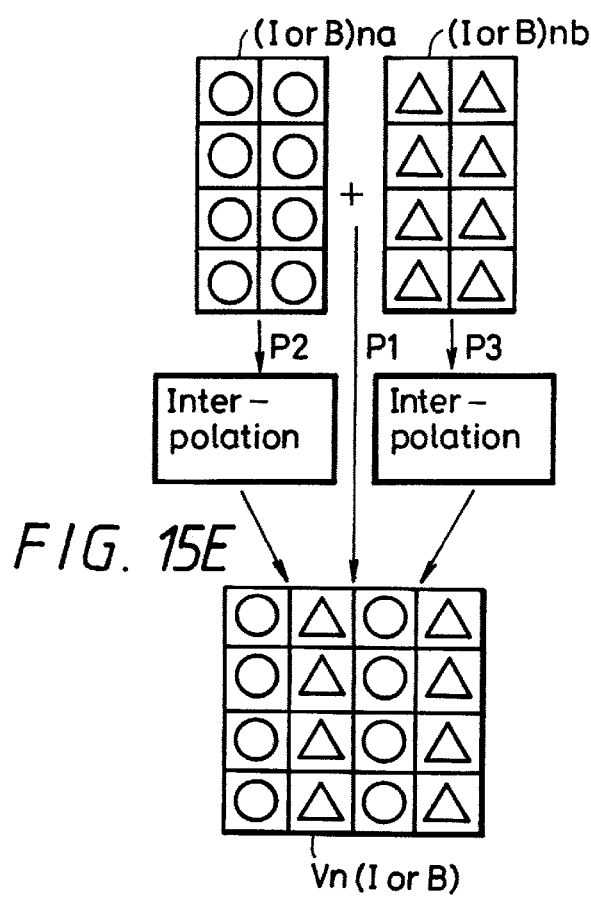
FIG. 15E

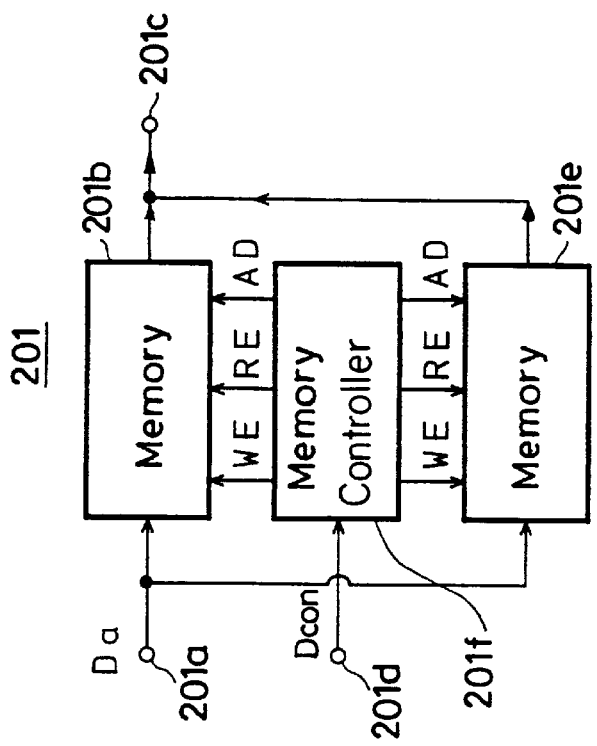
FIG. 18A
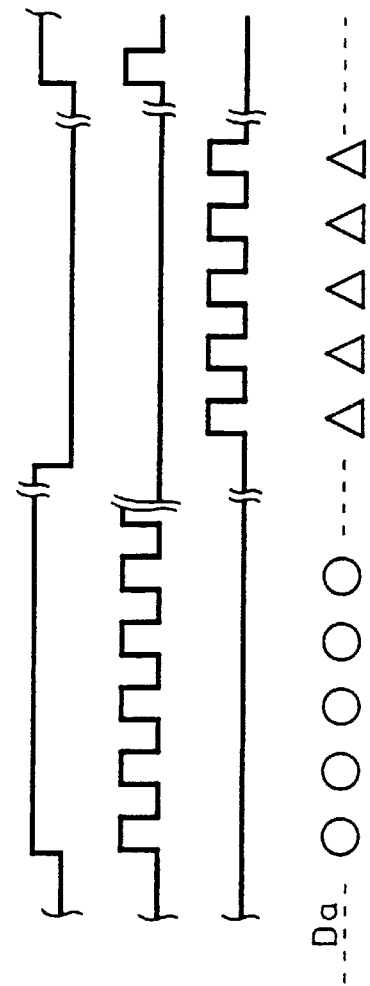
FIG. 18B
FIG. 18C
FIG. 18D
FIG. 18E

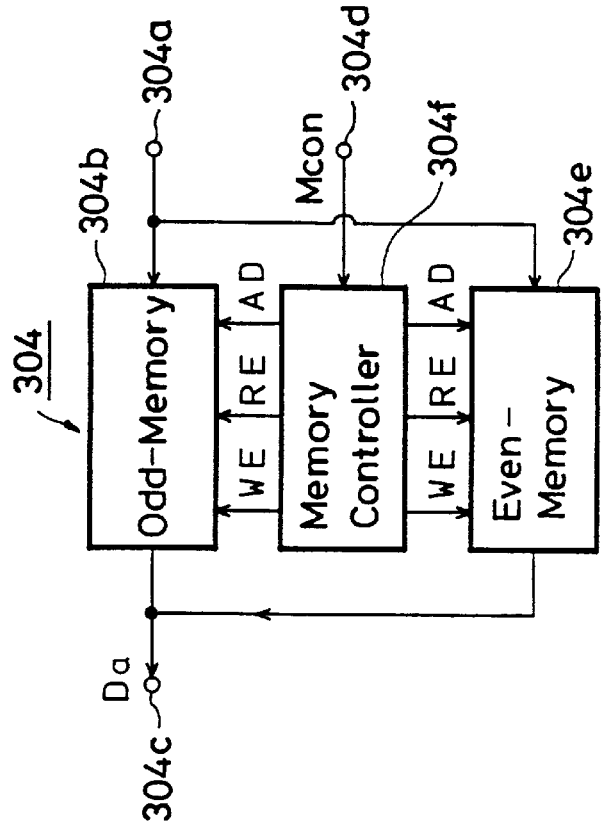
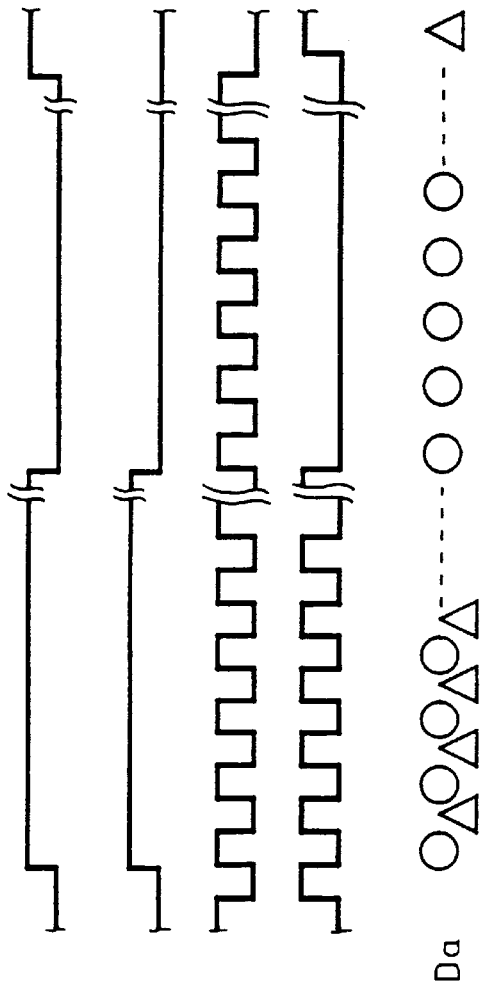
FIG. 20A
FIG. 20B1
FIG. 20B2
FIG. 20C
FIG. 20D
FIG. 20E

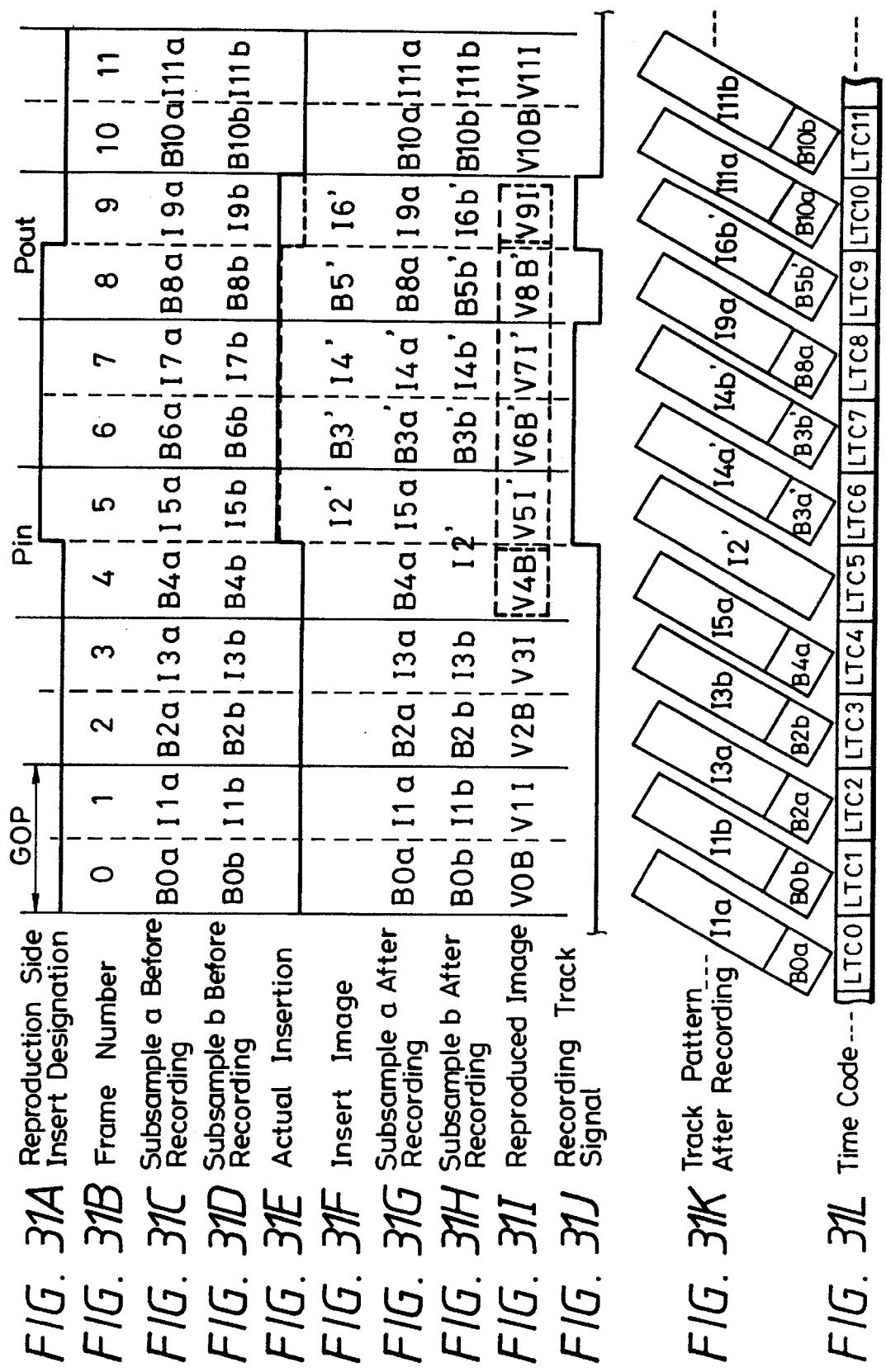

FIG. 32A
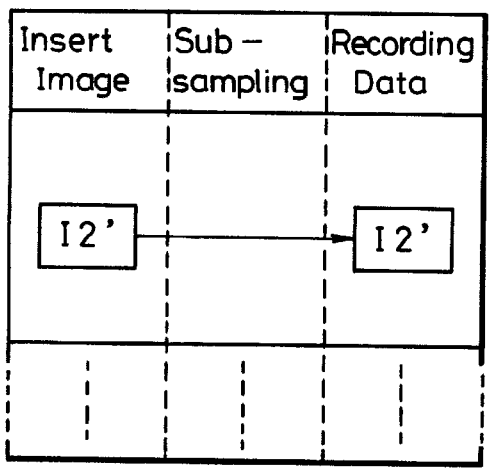
FIG. 32D
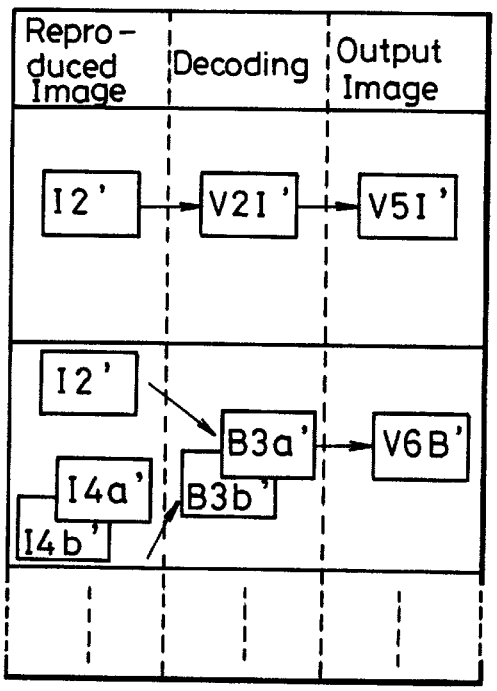
FIG. 32B
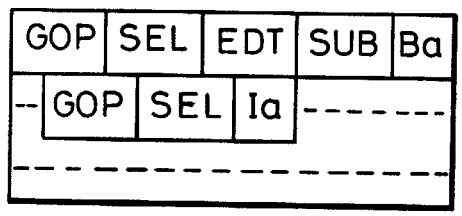
FIG. 32E
| GOP SEL EDT SUB Ba---GOP SEL Ia--- |
FIG. 32C
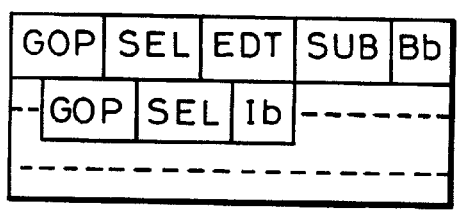
FIG. 32F
| GOP SEL EDT SUB Bb---GOP SEL Ib--- |

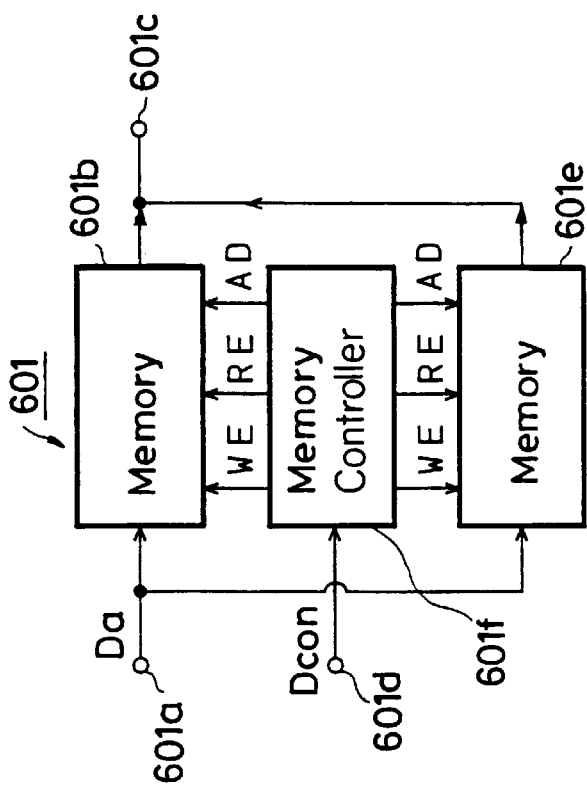
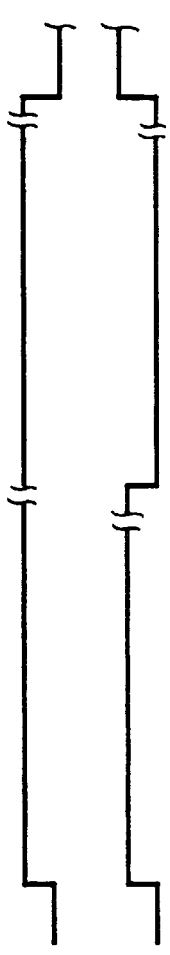
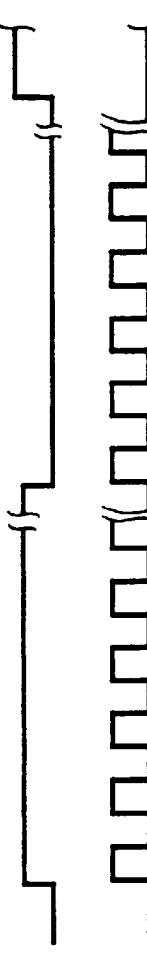
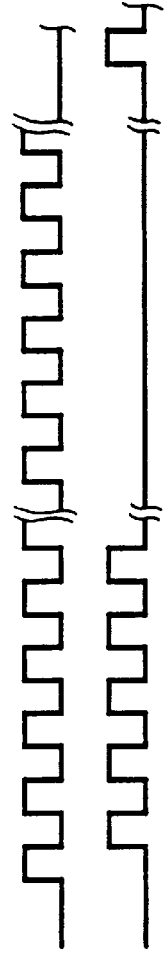
FIG. 34A
FIG. 34B1
FIG. 34B2
FIG. 34C
FIG. 34D
FIG. 34E

IMAGE INFORMATION RECORDING METHOD AND APPARATUS, IMAGE INFORMATION REPRODUCING METHOD AND APPARATUS AND EDITING METHOD AND SYSTEM

CROSS-REFERENCE TO RELATED APPLICATION

This application is a division of the U.S. application Ser. No. 08/448,317, filed on May 23, 1995, U.S. Pat. No. 5,706,386.

BACKGROUND OF THE INVENTION

1. Field of the Invention

The present invention relates to image information recording method and apparatus, image information reproducing method and apparatus which are suitable for use in application to an editing method, a digital VTR, a hard disc apparatus, an optical disc apparatus and so on, and an editing method and system.

2. Description of the Related Art

There has been an editing system as shown in FIG. 1 in which video signals recorded on a desired portion of a magnetic tape of a video tape cassette loaded into a reproduction-side VCR can be recorded on a portion succeeding a desired position on a magnetic tape of a video tape cassette loaded into a recording-side VCR.

The editing system shown in FIG. 1 has a reproduction-side VCR 1, a recording-side VCR 10, a reference signal generator 37 for supplying reference signals REF to both of the reproduction-side VCR 1 and the recording-side VCR 10 a switching circuit 38 for selectively supplying video signals reproduced by the reproduction-side VCR 1 and the recording-side VCR 10 to a television monitor 39 and selectively supplying audio signals reproduced by the reproduction-side VCR 1 and the recording-side VCR 10 to an amplifier 40, the television monitor 39 for displaying a video signal from the switching circuit 38 as an image on its screen, the amplifier 40 for amplifying an audio signal from the switching circuit 38, and a loudspeaker 41 for outputting an audio signal from the amplifier 40 as a sound.

The reproduction-side VCR 1 is a reproduction only digital VCR which reproduces digital video and audio data recorded on a magnetic tape of a video tape cassette. The recording-side VCR 10 is a digital VCR which can code recording data and decode reproduced data, i.e., code video and audio data to be recorded and record the same on a magnetic tape of a video tape cassette and reproduce digitally coded video and audio data coded and recorded on a magnetic tape of a video tape cassette.

The reproduction-side VCR 1 has a recording and reproducing head 4 mounted on a rotary drum (not shown), a fixed head 5 for recording longitudinal time code (LTC), a tape transport unit 2 having the rotary drum (not shown), a drive system for transporting a magnetic tape 3, a tape loading mechanism and so on, a servo control circuit 6 for effecting servo control on the drive system of the tape transport unit 2, a reproduction signal-processing circuit 7 for subjecting reproduced video and audio data PAV and reproduction time code PLTC to reproduction processing, a system controller 8 for controlling the servo control circuit 6 and the reproduction signal-processing circuit 7, a console panel 9 used for inputting various commands such as commands for reproduction, recording, rewinding, fast-forwarding and so on by pushing keys (not shown). While only one recording and reproduction head is shown in FIG. 1, description will hereinafter be made on the condition that two recording and reproduction heads are mounted on the rotary drum at an interval of an angle of 180.

The recording-side VCR 10 has a recording signal-processing circuit 11 for effecting various recording processings such as a pre-emphasis on video data PV and audio data PA supplied from the reproduction-side VCR 1, a video encoder 12v for effecting a compression coding processing on the video data RV that are subjected to recording processing by the recording signal-processing circuit 11 and supplied therefrom, an audio encoder 12a for effecting a compression coding processing on the audio data RA that are subjected to recording processing by the recording signal-processing circuit 11 and supplied therefrom, a switching circuit 13 for changing a data path, a recording and reproduction head 15 mounted on a rotary drum (not shown), a fixed head 16 for recording an LTC, a tape transport unit 14 having the rotary drum (not shown), a drive system for traveling a magnetic tape 17, a tape loading mechanism and so on, a servo control circuit 24 for effecting servo control on the drive system of the tape transport unit 14, a video decoder 20v for decoding reproduced video data pav to obtain original video data PV, an audio decoder 21a for decoding reproduced audio data pa to obtain original audio data PA, a reproduction signal-processing circuit 22 for subjecting video data PV and audio data PA respectively supplied from the video and audio decoders 20v, 21a to reproduction processings such as de-emphasis and subjecting a time code LTC to reproduction processing, a system controller 23 for controlling the servo control circuit 24 and the reproduction signal-processing circuit 22, a console panel 25 used for inputting various commands such as commands for reproduction, recording, rewinding, fast-forwarding and so on by pushing keys.

The console panel 25 has a switch key 26, a playback key 27, a pause key 28, a stop key 29, a fast forward key 30, a rewind key 31, a recording key 32, a variable-speed playback key 33s, a jog dial 33j, a ten-key pad 34 having keys "0" to "9", an enter key 35 representing "decision", and a liquid crystal display (LCD) 36. The switch key 26 is used to designate the reproduction-side VCR 1 or the recording-side VCR 10 as a VCR to be controlled by the system controller 23 when each of the keys is pressed.

There will be described an operation of recording reproduced video and audio data PV, and PA reproduced a desired amount succeeding a desired position of the magnetic tape 3 of the video tape cassette loaded into the reproduction-side VTR 1, on a portion succeeding a desired position of the magnetic tape 17 of the video tape cassette. Hereinafter, such edition is referred to as "an insertion edition".

Before the insertion edition is carried out, the video and audio data PV and PA to be reproduced by the reproduction-side VCR 1 must be selected and a recording start point on the magnetic tape 17 of the video tape cassette loaded into the recording-side VCR 10 must be designated. The reason for these pre-processings is to obtain an edited result desired by a user by selecting an insert image and designating from which position the insert image is to be inserted.

In pressing the switch key 26 by the user, the system controller 23 recognizes that a command supplied thereto through the console panel 25 is a command used to control the reproduction-side VCR 1. Initially, the user must determine which video and audio data PV and PA recorded on the magnetic tape 3 of the video tape cassette loaded into the reproduction-side VCR 1 are selected as the insert image, i.e., determine which position on the magnetic tape 3 the insert image starts and at which position the insert image ends.

The user can monitor the video and audio data PV and PA reproduced, respectively, by the reproduction-side VCR 1 through the television monitor 39 and the loudspeaker 40 by manually switching the switching circuit 38. Subsequently, the user searches start and end positions of the insert image by operating the playback key 27, the pause key 28, the stop key 29, the fast forward key 30, the rewind key 31, the variable-speed playback key 33s or the jog dial 33j etc. on the console panel 25. The video data PAV reproduced by the reproduction-side VCR 1 are supplied through the switching circuit 38 to the television monitor 39 and displayed as the image on the screen of the television monitor 39. The reproduced audio data PA are supplied to through the switching circuit 38 and the amplifier 40 to the loudspeaker 41 and output therefrom as the sound.

The time code PLTC reproduced by the reproduction-side VCR 1 is supplied to the system controller 23 and converted by the system controller 23 into character data corresponding to time information indicated by the time code PLTC. The character data are supplied to the LCD 36 of the console panel 25 and displayed on a display screen of the LCD 36 as an image representing contents of the time code.

Accordingly, the user can watch the time code displayed on the display screen of the LCD 36 while monitoring the video and audio data PV and PA. Specifically, when the user sees the start of a desired insert image, the user can write a time code thereof being displayed on the LCD 36 on a suitable matter such as a paper. Similarly, the user can write a time code of an end position of the insert image.

The user can monitor the video and audio data PV and PA reproduced by the recording-side VCR 10 through the television monitor 39 and the loudspeaker 40, respectively, by manually switching the switching circuit 38. Subsequently, the user searches start and end positions of the insert image by operating the playback key 27, the pause key 28, the stop key 29, the fast forward key 30, the rewind key 31, the variable-speed playback key 33s or the jog dial 33j etc. on the console panel 25. similarly, the user can write an insertion start position of the insert image on the paper.

In order that the editing system carries out an inserting operation, the user must input time codes of the head and end position of the insert image and a time code of an insert position on the magnetic tape 17 by using the ten-key pad 34 and the enter key 35 of the console panel 25. How to input the time codes is easy. Since the time code is usually displayed by using units of "HH (hour), MM(minute), SS (second) and FF (frame)", it is sufficient to press necessary keys of the ten-key pad 34 in an order of the units and lastly press the enter key 35.

When the three time codes are inputted by the above manner, since the system controller 23 of the recording-side VTR 10 has already recognized a present position of the magnetic tape 3 based on the latest time code PLTC supplied from the reproduction-side VCR 1, the system controller 23 supplies a control signal CON commanding a forward or reverse direction high-speed reproduction to the system controller 8 of the reproduction-side VCR 1. When the control signal CON is supplied to the system controller 8 of the reproduction-side VCR 1, the system controller 8 controls the tape transport unit 2 and the servo control circuit 6 to carry out the forward or reverse direction high-speed reproduction. While the high-speed reproduction is carried out, the system controller 23 of the recording-side VCR 10 monitors the time codes PLTC supplied from the reproduction-side VCR 1. When the system controller 23 recognizes that a value indicated by the time code PLTC supplied from the reproduction-side VCR 1 becomes a value of a time code several-second prior to a value of a time code of the head of the insert image, the system controller 23 supplies the control signal commanding stop of an operation of the reproduction-side VCR 1 to the system controller 8 of the reproduction-side VCR 1 to stop the operation. In this description, the value of the time code several-second prior to the value of the time code of the head of the insert image is referred to as a value of a time code of a position precedent to a position where the operation of the reproduction-side VCR 1 is to be stopped temporarily.

The system controller 23 of the recording-side VCR 10 supplies the control signal CON commanding normal-speed reproduction to the system controller 8 of the reproduction-side VCR 1. Based on the control signal CON, the system controller 8 controls the tape transport unit 2 and the servo control circuit 6 to carry out the normal-speed reproduction. While the normal-speed reproduction is carried out, the system controller 23 of the recording-side VCR 10 monitors the time codes PLTC supplied from the reproduction-side VCR 1. When the system controller 23 recognizes that a value indicated by the time code PLTC supplied from the reproduction-side VCR 1 becomes a value of a time code several-second prior to a value of a time code of the head of the insert image, the system controller 23 supplies the control signal commanding pause of an operation of the reproduction-side VCR 1 to the system controller 8 of the reproduction-side VCR 1 to pause the operation. In this description, several seconds in words "a value of a time code several-second prior to a value of a time code of the head of the insert image" means time from a point when the system controller 23 supplies the control signal commanding reproduction to a point when the reproduction-side VCR 1 actually reproduces data, and time prepared for a portion where previously recorded data and data to be recorded are to be overlapped. A position of the magnetic tape 17 loaded into the recording-side VCR 10, i.e., the insertion start point is automatically set by the processings similar to the above processings.

The system controller 23 of the recording-side VCR 10 supplies the control signal CON commanding start of reproduction to the system controller 8 of the reproduction-side VCR 1 and controls the tape transport unit 14 and the servo control unit 24 to start the reproduction operations. The system controller 23 controls the system controller 8 of the reproduction-side VCR 1 and the servo control circuit 24 of the recording-side VCR 10 by employing the reference signal REF supplied from the reference signal generator 37, thereby synchronizing the reproduction-side VCR 1 and the recording-side VCR 10 with each other.

When the time code PLTC supplied from the reproduction-side VCR 1 becomes the time code representing the head position of the insert image, the system controller 23 of the recording-side VCR 10 supplies the control signal CON to the tape transport unit 14 and control the tape transport unit 14 to start a recording operation. Thus, the video and audio data PV and PA reproduced by the reproduction-side VCR 1 are subjected by the recording signal-processing circuit 11 to the recording processings. The video data RV subjected to the recording processing are supplied to the video encoder 12v and subjected thereby to the compression coding processing. The audio data RA subjected to the recording processing are supplied to the audio encoder 12a and subjected thereby to the compression coding processing.

Compression-coded audio data ra are supplied to the video encoder 12v. The video encoder 12v adds compression-coded video data rv and compression-coded audio data ra with a inner parity and an outer parity, respectively, to convert the same into data series having product codes, further adding the data series with synchronization signals and so on. The video encoder 12v supplies the video and audio data rav through the switching circuit 13 to the recording and reproducing head 15. Thus, the video and audio data rav are recorded on the magnetic head 17 in slant tracks formed on a recording surface thereof.

When the time code PLTC supplied from the reproduction-side VCR 1 becomes the time code indicating the end position of the insert image, the system controller 23 of the recording-side VCR 10 supplies the control signal to the tape transport unit 14 and controls the tape transport unit 14 to stop the recording operation. The system controller 23 of the recording-side VCR 10 supplies the control signal CON commanding the stop of the operation of the reproduction-side VCR 1 to the system controller 8 of the reproduction-side VCR 1. When the system controller 8 of the reproduction-side VCR 1 is supplied with the control signal CON, the system controller 8 supplies the control signal to the tape transport unit 2 and controls the tape transport unit 2 to stop the reproduction operation.

As described above, it is possible to record the video and audio data of a desired portion recorded on the magnetic tape 3 of the video tape cassette loaded into the reproduction-side VCR 1 on the portion succeeding the desired position of the magnetic tape 17 of the video tape cassette.

Subsequently, the video encoder 12v shown in FIG. 1 will be described with reference to FIG. 2. FIG. 2 is a structural diagram showing an inner arrangement of the video encoder 12v shown in FIG. 1.

The video encoder 12v shown in FIG. 2 has an input terminal 50 to which the video data RV are supplied from the recording signal-processing circuit 11 shown in FIG. 1. The input terminal 50 is connected to a first input terminal of a motion detection circuit 51, the other input terminal of a motion compensation circuit 56 and an input terminal of a frame memory 52. An output terminal of the frame memory 52 is connected to a second input terminal of the motion detection circuit 51, an input terminal of a frame memory 54, an addition-side input terminal of an adder circuit 59, the other fixed contact b of a switch 60, and the other input terminal of a inter/intra determining circuit 61. An output terminal of the frame memory 54 is connected to a third input terminal of the motion detection circuit 51 and the other input terminal of a motion compensation circuit 57. An output terminal of the motion compensation circuit 56 is connected to a one addition-side input terminal of the adder circuit 58 having a ½ multiplier. An output terminal of a motion compensation circuit 57 is connected to the other addition-side input terminal of the adder circuit 58 having a ½ multiplier. An output terminal of the adder circuit 58 is connected to a subtraction-side input terminal of the adder circuit 59. An output terminal of the adder circuit 59 is connected to a fixed contact a of the switch 60 and one input terminal of the inter/intra determining circuit 61. A movable contact c of the switch 60 is connected to an input terminal of a Discrete cosine transform (DCT) circuit 64. An output terminal of the DCT circuit 64 is connected to an input terminal of a quantizing circuit 65. An output terminal of the quantizing circuit 65 is connected to an input terminal of a variable-length coding circuit 66. An output terminal of the variable-length coding circuit 66 is connected to an input terminal of an output coding circuit 68. An output terminal of the output coding circuit 68 is connected through an output terminal 69 of the video encoder 12v to an input terminal of the switching circuit 13 shown in FIG. 1. An output terminal of the motion detection circuit 51 is connected to the respective input terminals of the motion compensation circuits 56, 57 and the input terminal of the variable-length coding circuit 66.

The frame memories 52, 54 read and write image data based on respective read/write control signals supplied thereto from the system controller 23 shown in FIG. 1 through input terminals 53I, 55I.

When frame image data are stored in the frame memory 52, if an output from the frame memory 52 is defined as data of a frame at present, then frame image data supplied to the input terminal 50 are data of a frame in future and an output from the frame memory 54 are data of a frame in past. Hereinafter, a frame at present, a frame in future and a frame in past are referred to as "the present frame", "the succeeding frame" and "the preceding frame", respectively.

The motion detection circuit 51 subjects frame image data supplied through the input terminal 50, frame image data read out from the frame memory 52 and the frame image data read out from the frame memory 54 to motion detection processing by a macro block unit of 16 lines×16 pixels. A known motion detection method is a block matching (U.S. Pat. No. 4,897,720).

Specifically, the motion detection circuit 51 carries out motion detection by using macro block data MB (f) of the present frame stored in the frame memory 52 and macro block data MB (f+1) of the succeeding frame supplied through the input terminal 50 to obtain motion vector data MV on the basis of the results of the motion detection. The motion detection circuit 51 carries out motion detection by using the macro block data MB (f) of the present frame stored in the frame memory 52 and macro block data MB (f−1) of the preceding frame stored in the frame memory 54 to obtain motion vector data MV on the basis of results of the motion detection.

While a signal line connected to the output terminal of the motion detection circuit 51 is represented by a single line and one "MV" is used as a reference symbol depicting the motion vector data in FIG. 2, the motion vector data MV of the same number as all the macro blocks of the frame image data stored in the frame memory 52 are calculated in each of the motion detections.

Based on the motion vector data MV supplied from the motion detection circuit 51, the motion compensation circuit 56 extracts the macro black data MB (f+1) most similar to the contents of the macro black data MB (f) being processed of the present frame, from frame image data of the succeeding frame supplied through the input terminal 50. The motion compensation circuit 56 supplies the extracted macro block data MB (f+1) to the adder circuit 58.

Based on the motion vector data MV supplied from the motion detection circuit 51, the motion compensation circuit 57 extracts the macro black data MB (f−1) most similar to the contents of the macro black data MB (f) being processed of the present frame, from frame image data of the preceding frame stored in the frame memory 54. The motion compensation circuit 56 supplies the extracted macro block data MB (f−1) to the adder circuit 58.

The adder circuit 58 add the macro block data MB (f+1) supplied from the motion compensation circuit 56 and the macro block data MB (f−1) supplied from the motion compensation circuit 57 and multiples a result of the addition by a coefficient "½" by the ½ multiplier provided therein. As a result, the adder obtains a mean value of the macro block data MB (f+1) supplied from the motion compensation circuit 56 and the macro block data MB (f−1) supplied from the motion compensation circuit 57.

The adder circuit 59 subtracts the addition output from the adder circuit 58 from the macro block data MB (f) of the present frame supplied from the frame memory 52, thereby obtaining a difference between the macro block data MB (f) of the present frame and the macro block data obtained by bidirectional prediction.

The inter/intra determining circuit 61 properly connects the movable contact c of the switch 60 to the inter-side fixed contact a or the intra-side fixed contact b based on the difference data supplied from the adder circuit 59, the macro block MB (f) supplied from the frame memory 52 and a frame pulse Fp supplied thereto from the system controller 23 shown in FIG. 1 through an input terminal 62I.

The above description will be summarized. An object to be coded is the frame memory data of the present frame stored in the frame memory 52. A processing unit is a macro block unit. An object of the motion detection processing in the motion detection circuit 51 is to search the respective macro block data MB (f+1) and MB (f−1) of the succeeding and preceding frame most similar to the contents of the macro block MB (f) of the present frame to be coded. A result of the search, i.e., a result of detecting the respective macro block data MB (f+1) and MB (f−1) of the succeeding and preceding frame most similar to the contents of the macro block MB (f) of the present frame is the motion vector data MV. The respective macro block data MB (f+1) and MB (f−1) of the succeeding and preceding frame most similar to the contents of the macro block MB (f) of the present frame are extracted by using the motion vector data MV, thereby common contents being prevented from being transferred.

However, the macro block data MB (f) of the present frame form which the adder circuit 59 calculates difference by using the macro block data obtained by the bidirectional prediction cannot be decoded only with difference data when decoded. Therefore, as shown in FIG. 2, the motion vector data MV are supplied to the variable-length coding circuit 66, compressed by variable-length processing therein and then transferred to the output coding circuit 68 together with the difference data.

A role of the inter/intra determining circuit 61 is to select coding of the difference data and coding of the output from the frame memory 54 as described above. To code the difference data, i.e., difference information between frames is referred to as interframe coding (inter-coding). To code an output from the frame memory is referred to as intraframe coding (intra-coding). "Coding" in the description means not calculation of difference by the adder circuit 59 but coding carried out by circuits, which will be described later, succeeding the DCT circuit 64. While switching inter-coding and intra-coding is controlled by a macro block unit, the switching is controlled by a frame unit in order to facilitate the following description.

The image data of each frame output from the switch 60 and coded by the succeeding circuits is generally referred to as an intra-coded picture (I picture), a bidirectionally predictive-coded picture (B picture) and a predictive-coded picture (P picture) depending on coding state.

The I picture is coded image data of one frame amount formed of data obtained by subjecting the macro block data MB (f) of the present frame output from the switch 60 to intraframe coding. The word "coding" used in the above sentence is coding in the DCT circuit 64, the quantizing circuit 65, and the variable-length coding circuit 66. Accordingly, when the image data is the I picture, the movable contact c of the switch 60 must be connected to the fixed contact b thereof under the control of the inter/intra determining circuit 61.

The P picture is coded image data of one frame amount formed of data obtained by coding difference data between the macro block data MB (f) of the present frame output from the switch 60 and motion-compensated macro block data of I or P picture which is precedent, in view of time, to the macro block data MB (f) of the present frame, and data obtained by subjecting the macro block data MB (f) of the present frame to the intraframe coding. Motion vector data MV used to motion compensate the image data as the I picture when the P picture is generated are calculated from image data to be coded as the P picture and image data immediately prior to the image data in view of an order of image data input to the video encoder 12v.

The B picture is data obtained by coding (interframe coding) difference data between the macro block data MB (f) of the present frame output from the switch 60 and the following six kinds of macro block data.

The six kinds of macro block data are the motion-compensated macro block data of I picture of a frame precedent, in view of time, to the macro block data MB (f) of the present frame, the motion-compensated macro block data of P picture of a frame precedent, in view of time, to the macro block data MB (f) of the present frame, the motion-compensated macro block data of I picture of a frame which succeeds, in view of time, the macro block data MB (f) of the present frame, the motion-compensated macro block data of P picture of a frame which succeeds, in view of time, the macro block data MB (f) of the present frame, interpolated macro block data generated from an I picture of a frame precedent, in view of time, to the macro block data MB (f) of the present frame and a P picture succeeding, in view of time, the macro block data MB (f), and interpolated macro block data generated from a P picture of a frame precedent, in view of time, to the macro block data MB (f) of the present frame and a P picture succeeding, in view of time, the macro block data MB (f).

As understood from the above description, the P picture includes the data coded by using the image data of other than the present frame, i.e., interframe-coded data. The B picture is formed only of interframe-coded data so that the B picture cannot be decoded independently. As known, a plurality of related pictures are handled as one group of pictures (GOP) and the pictures are processed by GOP unit.

In general, the GOP is formed of one or a plurality of I pictures and one or a plurality of non-I pictures. In order to facilitate the following description, it is assumed that intraframe-coded image data and bidirectionally predictive-coded image data are the I picture and the B picture, respectively, and one GOP is formed of one B picture and one I picture. However, it is assumed that the B picture processed initially after the processing is started and the B picture processed last before the processing is ended are image data predictive-coded in one direction.

As understood from the above description, in FIG. 2, the I picture is generated at a stage of the output terminal of the frame memory 52, the switch 60, the DCT circuit 64 and the circuits succeeding the DCT circuit 64. In FIG. 2, the B picture is generated at a stage of the output terminal of the frame memory 54, the motion compensation circuit 57, the adder circuit 58, the adder circuit 59, the switch 60, the DCT circuit 64 and the circuits succeeding the DCT circuit 64.

The DCT circuit 64 converts the DC output from the switch 60 into coefficient data of a higher AC component. The quantizing circuit 65 quantizes the coefficient data from the DCT circuit 64 by a predetermined quantization step size. The variable-length coding circuit 60 codes the coefficient data from the quantizing circuit 65 and the motion vector data from the motion detection circuit 51 by some suitable methods such as Huffman coding, run-length coding or the like. The output coding circuit 68 adds the output from the variable-length coding circuit 66 and decoding information EDa supplied through an input terminal 68I with the inner parity and the outer parity, respectively, converts the same into data series of product codes, adds the data series with the synchronization signal or the like, and output the data series through the output terminal 69. In the data in one GOP when data is output, the decoding information, frame data of the B picture, decoding information and frame data of the I picture are successively arranged.

The decoding data EDa is formed of GOP head data indicating a head of the GOP and an inter/intra selection signal SEL. When the GOP head data has a value of "1", the GOP head data indicates that frame data added with the GOP data at the head position are head frame data of the GOP. When the GOP head data has a value of "0", the GOP head data indicates that frame data added with the GOP data at the head position are not head frame data of the GOP but frame data located at the head of the picture.

Though not shown, after the output coding circuit 68 adds the audio data from the audio encoder 12a with the inner parity and the outer parity and converts the same into the data series of product codes as shown in FIG. 1, the output coding circuit 68 subjects the data series to channel coding and outputs the same through the output terminal 69.

An operation of the video encoder 12v will be described. The B picture coded and generated when an encoding processing is started and the B picture coded and generated immediately before the encoding processing is ended will now be described.

When the B picture forming one GOP is generated, the movable contact c of the switch 60 is connected to the inter-side fixed contact a under the control of the inter/intra determining circuit 61.

The motion detection circuit 51 successively carries out motion detection by using the macro block data MB (f) of the present frame and the macro block data MB (f+1) of the frame image data of the succeeding frame. As a result of the motion detection, there are selected macro block data MB (f+1) most similar to the contents of the macro block data MB (f) of the present frame, and there are obtained the motion vector data MV which start from the position of the macro block data MB (f) of the present frame and represent a position of the macro block data MB (f+1). Similarly, the motion detection circuit 51 successively carries out the motion detection by using the macro block data MB (f) of the present frame and the macro block data MB (f-1) of the frame image data of the preceding frame. As a result of the motion detection, there are selected macro block data MB (f-1) most similar to the contents of the macro block data MB (f) of the present frame, and there are obtained the motion vector data MV which start from the position of the macro block data MB (f) of the present frame and represent a position of the macro block data MB (f-1).

The two motion vector data MV are supplied to the variable-length coding circuit 66 and also supplied to the motion compensation circuits 56, 57. The motion compensation circuits extract the macro block data MB (f+1) indicating the motion vector data MV from the frame image data of the succeeding frame. The extracted macro block data MB (f+1) are supplied to the adder circuit 58. On the other hand, the motion compensation circuit 57 extracts the macro block data MB (f-1) indicating the motion vector data MV from the frame image data of the preceding frame. The extracted macro block data MB (f-1) are supplied to the adder circuit 58.

The adder circuit 58 adds the macro block data MB (f+1) from the motion compensation circuit 56 and the macro block data MB (f-1) from the motion compensation circuit 57 and multiples the addition result by a coefficient "½" to thereby calculate a mean value of the two macro block data. The added and averaged output is supplied to the adder circuit 59. The adder circuit 59 is supplied with the macro block data MB (f) of the present frame read out from the frame memory 52. Therefore, the adder circuit 59 subtracts the added and averaged output from the adder circuit 58 from the macro block MB (f) of the present frame. The output from the adder circuit 59 is subjected to interframe coding by the DCT circuit 64, the quantizing circuit 65 and the variable-length coding circuit 66, subjected to output coding processing by the output coding circuit 68 and then output therefrom as the B picture.

After all the macro block data MB (f) stored in the frame memory 52 are subjected to the above-mentioned processings, i.e., after the interframe coding processing is finished, the frame image data stored in the frame memory 52 are read out, supplied to the frame memory 54, and stored as image data of the preceding frame in the frame memory 54. On the other hand, subsequent frame image data are stored in the frame memory 52 as the frame image memory of the present frame.

When the I picture forming the one GOP is generated, the movable switch c of the switch 60 is connected to the intra-side fixed contact b under the control of the inter/intra determining circuit 61.

Subsequently, the video decoder 20v shown in FIG. 1 will be described with reference to FIG. 3. FIG. 3 is a structural diagram showing an arrangement inside the video decode shown in FIG. 1.

The video decoder 20v shown in FIG. 3 has an input decoding circuit 71, a variable-length decoding circuit 73, an inverse quantizing circuit 74, an inverse discrete cosine transform (IDCT) circuit 75, a frame memory 76, a frame memory 79, a motion compensation circuit 80, a motion compensation circuit 81, an adder circuit 82, an adder circuit 81, and a switch 84. The input decoding circuit 71 decodes reproduced video and audio data pav supplied thereto from the switching circuit 13 shown in FIG. 1 by channel coding processing, subjects the reproduced video and audio data pav to error correction processing by using the inner and outer parities, supplies the error-corrected video data to the variable-length decoding circuit 73, supplies error-corrected decoding information DDa through an output terminal 720 to the system controller 23 shown in FIG. 1, and supplies the error-corrected audio data to the audio decoder shown in FIG. 1. The variable-length decoding circuit 73 decodes image data of the output from the input decoding circuit 71 to restore the image data to quantized coefficient data and decodes the motion vector data MV to supply the decoded motion vector data MV to the motion compensation circuits 80, 81. The inverse quantizing circuit 74 inverse-quantizes an output from the variable-length decoding circuit 73 to restore the same to the coefficient data subjected to the DCT. The IDCT circuit 75 subjects an output from the inverse quantizing circuit 74 to inverse discrete cosine transform to obtain image data as the I or B picture. The frame memory 76 stores an output from the IDCT circuit 75 in accordance with the read/write control signal supplied from the system controller 23 shown in FIG. 1 through an input terminal 77I. The frame memory 79 stores image data read out from the frame memory 76 in accordance with the read/write control signal supplied from the system controller 23 shown in FIG. 1 through an input terminal 78I. The motion compensation circuit 80 extracts macro block data indicated by the motion vector data MV supplied from the variable-length coding circuit 73 from frame image data stored in the frame memory 79. The motion compensation circuit 81 extracts macro block data indicated by the motion vector data MV supplied from the variable-length coding circuit 73 from frame image data as the I picture from the IDCT circuit 75. The adder circuit 82 adds macro block data from the motion compensation circuit 80 and macro block data from the motion compensation circuit 81 and multiplies the added result by a coefficient "½" by a ½ multiplier provided therein to thereby obtain an average of addition of the two macro block data. The adder circuit 83 adds an added and averaged output from the adder circuit 82 and difference data as the B picture read out from the frame memory 76 to obtain original macro block data. The switch 84 switch macro block data from the adder circuit 83 and macro block data read out from the frame memory 76 based on the inter/intra selection signal SEL supplied from the system controller 23 shown in FIG. 1 through an input terminal 85I, and supplies the switched output to the reproduction signal-processing circuit 22.

In FIG. 3, the I picture is decoded at a stage from an output terminal of the frame memory 76 to the switch 84. The B picture is decoded in stages from the IDCT circuit 75 through the motion compensation circuit 80 to the adder circuit 82 and from the output terminal of the frame memory 79 through the compensation circuit 81, the adder circuit 82, the adder circuit 83 to the switch 84.

An operation of the video decoder 20v will be described. In order to facilitate the following description, it is assumed that when the image data are decoded, the frame memory 79 holds image data as a decoded I picture of the immediately preceding GOP, the frame memory 76 holds image data as a B picture of a GOP to be decoded, and the IDCT circuit 75 outputs image data as a decoded I picture of the GOP to be decoded. Frame image data as the decoded I picture of the immediately preceding GOP are frame image data of a preceding frame. Frame image data as the B picture of the GOP to be decoded are differential image data of the present frame. Frame image data as decoded I picture of the GOP to be decoded are frame image data of the succeeding frame.

The input decoding circuit 71 subjects the reproduced video and audio data pav from the switching circuit 13 shown in FIG. 1 to the channel coding processing to decode the reproduced video and audio data pav. The decoded reproduced video and audio data pav are error-corrected by the input decoding circuit 71 by using the inner and outer parities. The error-corrected audio data pa are supplied to the audio decoder 21a 1. The error-corrected video data pv are supplied to the variable-length decoding circuit 73 shown in FIG. 3. The video data are decoded by the variable-length decoding circuit 73 and converted into quantized coefficient data. The decoded video data are supplied to the inverse quantizing circuit 74 which restores the decoded video data to the coefficient data subjected to the DCT. The video data restored to the coefficient data subjected to the DCT are supplied to the IDCT circuit 75 and restored thereby to original image data. The "original image data" are "difference data" when the image data are the B picture generated by the interframe coding and are "macro block data" when the image data are the I picture generated by intraframe coding.

On the other hand, the input decoding circuit 71 supplies decoding information DDa through an output terminal 72O to the system controller 23 shown in FIG. 1. The system controller 23 shown in FIG. 1 extracts GP head data and the inter/intra selection signal SEL from the decoding information DDa and supplies the inter/intra selection signal SEL as a switching control signal to the switch 84 through the input terminal 85I. Thus, a movable contact c of the switch 84 is connected to an inter-side fixed contact a thereof, because data initially transferred are the B picture. Information indicating a switching timing of the switch 84 based on the inter/intra selection signal SEL is the GOP head data detected from the decoding information DDa. Since the GOP head data is added with every GOP, it is possible to discriminate that one GOP data is data between the detected GOP head data and next detected GOP data.

The motion compensation circuit 80 extracts the macro block data MB (f+1) indicated by the motion vector data MV supplied from the variable-length decoding circuit 73 from frame image data of the succeeding frame as the decoded I picture from the IDCT circuit 75. The macro block data MB (f+1) extracted from the frame image data as the succeeding frame by the motion compensation circuit 80 are supplied to the adder circuit 82.

On the other hand, after the frame image data the decoded I picture of the immediately preceding GOP are stored in the frame memory 79, the motion compensation circuit 81 starts its processing in response to a processing start timing of the motion compensation circuit 80. Specifically, the motion compensation circuit 81 extracts the macro block data MB (f−1) indicated by the motion vector data MV supplied from the variable-length decoding circuit 73 from the frame image data as the decoded I picture of the immediately preceding GOP stored in the frame memory 79. The macro block data MB (f−1) extracted from the frame image data as the preceding frame by the motion compensation circuit 81 are supplied to the adder circuit 82.

While a signal line connected to the output terminal of the variable-length decoding circuit 73 is indicated by a single line a single reference symbol depicting the motion vector is used, the motion vector data of all macro blocks of one frame image data are calculated in every motion detection carried out when image data are encoded. Accordingly, the motion vector data MV supplied to the motion compensation circuit 80 and the motion vector data MV supplied to the motion compensation circuit 81 are different data obtained when image data are encoded.

The macro block data MB (f+1) from the motion compensation circuit 80 and the macro block data MB (f−1) from the motion compensation circuit 81 are added by the adder circuit 82. The addition result is multiplied by a coefficient "½" by the ½ multiplier of the adder circuit 82 and averaged by the adder circuit 82. An added and averaged output from the adder circuit 82 is supplied to the adder circuit 83.

The adder circuit 83 adds the difference data read out from the frame memory 76 and the added and averaged output from the adder circuit 82. The addition result is supplied as decoded reproduced video data PV of the present frame through the output terminal 86 to the reproduction signal-processing circuit 22 shown FIG. 1.

When the frame memories 76 and 79 are respectively supplied with the read/write control signal R/W from the system controller 23 shown in FIG. 1 through input terminals 77I, 78I, the macro block data of the succeeding frame as the I picture output from the IDCT circuit 75 are supplied to the motion compensation circuit 80 and also supplied to the frame memory 76 and stored thereby.

Significance of the processings in the adder circuit 82 and the adder circuit 83 will be described for confirmation. The adder circuit 58 shown in FIG. 2 calculates the average of the addition of the macro block data MB (f+1) of the succeeding frame obtained by motion compensation of the motion compensation circuit 56 and the macro block data MB (f−1) of the preceding frame obtained by motion compensation of the motion compensation circuit 57. The adder circuit 59 subtracts the added and averaged output from the adder circuit 58. The processing in the adder circuit 59 is shown in the following equation 1:

$$MBd(f)=MB(f)-[\{MB(f+1)+MB(f-1)\}/2] \quad \text{(equation 1)}$$

where MBd (f) is difference data of each of the macro block unit of the present frame.

Accordingly, in order to obtain the macro block data MB (f) of the present frame from the difference data MBd at the video decoder 20v side, calculation of the following equation 2 must be carried out:

$$MB(f)=MBd(f)+[\{MB(f+1)+MB(f-1)\}/2] \quad \text{(equation 2)}$$

where MB (f) and MBd (f) are macro block data of the present frame and difference data of each of the macro block unit of the present frame, respectively.

A symbol "+" at the head of equation 2, i.e., addition corresponds to addition carried out by the adder circuit 83 shown in FIG. 3. A symbol "+" indicating addition of the macro block data MB (f+1 and the macro block data MB (f−1) in braces in equation 2 corresponds to addition carried out by the adder circuit 82 shown in FIG. 3. A value "½" used to multiple data in parentheses corresponds to multiplication of the coefficient "½".

Accordingly, in order to calculate equation 2, it is necessary to extract the macro block data MB (f+1) from the frame image data of the transferred succeeding frame and to extract the macro block data MB (f−1) from the frame image data of the transferred preceding frame. The motion vector data MV supplied from the variable-length decoding circuit 73 to the motion compensation circuits 80 and 81 are used to carry out the above-mentioned "extraction".

When the above-mentioned processings are repeated to restore all the frame image data of the present frame as the B picture, the system controller 23 shown in FIG. 1 supplies the inter/intra selection signal SEL through the input terminal 85I to the switch 84. In response to the inter/intra selection signal SEL, the movable contact c of the switch 84 is connected to the intra-side fixed contact b. Since the contents of the frame memory 76 is successively changed to the macro block data MB (f+1) of the succeeding frame as the I picture at every processing, the frame image data of the succeeding frame as the I picture are stored in the frame memory 76 at this time.

The frame memory 76 is supplied with the read/write control signal R/W from the system controller 23 shown in FIG. 1 through the input terminal 77I, whereby the frame image data of the succeeding frame as the I picture stored in the frame memory 76 are supplied as the decoded reproduced video data PV through the switch 84 and the output terminal 86 to the reproduction signal-processing circuit 22.

Subsequently, the system controller 23 shown in FIG. 1 will be described with reference to FIG. 4. FIG. 4 is a structural diagram of an inner arrangement of the system controller 23 shown in FIG. 1.

The system controller 23 shown in FIG. 4 has a central processing unit (CPU) 90, a clock generating circuit 94 connected thereto, a bus 91 formed of address, data and control buses connected to the CPU 90, a ROM 92 for storing program data and parameter data, a RAM 93 used to execute processing based on the program data stored in ROM 92 and used as a holding means for temporarily holding the parameter data stored therein, and an input/output port 97 for transmitting and receiving data to and from the respective units shown in FIG. 1. The bus 91 is connected with the ROM 92, the RAM 93 and the input/output port 97.

The clock generating circuit 94 generates a clock signal based on the reference signal REF supplied from the reference signal generator 37 shown in FIG. 1 through an input terminal 95, supplying the clock signal as a system clock to the CPU 90.

A number of terminals connected to the input/output port 97 will be described. These terminals are marked with a reference symbol "I" or "O". If a terminal is marked with reference numeral including the reference symbol "I", it is an input terminal. If a terminal is marked with reference numeral including the reference symbol "O", it is an output terminal. The terminals in FIG. 4 are marked with the same reference numerals in order to facilitate understanding of connection thereof with the respective terminal shown in FIGS. 1, 2 and 3. The system controller 23 will hereinafter be described with reference to FIGS. 1, 2, 3 and 4.

The output terminals 53O and 55O are used to output the read/write control signal R/W and respectively connected to the input terminal 53I, 55I of the frame memory 52, 54 of the video encoder 12v shown in FIG. 2.

The output terminal 62O is used to output a frame pulse Fp and connected to the input terminal 62I of the inter/intra determining circuit 61 of the video encoder 12v shown in FIG. 2.

The input terminal 63I is used to input the frame pulse Fp and connected to the input terminal 63O of the inter/intra determining circuit 61 of the video encoder 12v shown on FIG. 2.

The output terminal 68O is used to output the decoding information EDa and connected to the input terminal 68I of the output coding circuit 68 of the video encoder 12v shown in FIG. 2.

The input terminal 72I is used to input the decoding information DDa and connected to the output terminal 72O of the input decoding circuit 71 of the video decoder 20v shown in FIG. 3.

The output terminals 77O, 78O are used to output the read/write control signal R/W and respectively connected to the input terminals 77I, 78I of the frame memories 76, 79 of the video decoder 20v shown in FIG. 3.

The output terminal 85O is used to output the inter/intra selection signal SEL and connected to the input terminal of the switch 84 of the video decoder 20v shown in FIG. 3.

An output terminal 98 is used to output the control signal CON used for control of the reproduction-side VCR 1 and connected to a control signal input terminal of the system controller 8 of the reproduction-side VCR 1 shown in FIG. 1.

An input terminal 99 is used to input the reproduction time code PLTC from the reproduction-side VCR 1 shown in FIG. 1 and connected to a time code output terminal of the reproduction signal-processing circuit 7 of the reproduction-side VCR 1 shown in FIG. 1.

An output terminal 100 is used to output the control signal for control of the recording signal-processing circuit 11 of the recording-side VCR 10 and connected to a control signal input terminal of the recording signal-processing circuit 11 of the recording-side VCR 10 shown in FIG. 1.

An output terminal 101 is used to output the control signal for control of the reproduction signal-processing circuit 22 of the recording-side VCR 10 and connected to a control signal input terminal of the reproduction signal-processing circuit 22 of the recording-side VCR 10 shown in FIG. 1.

An input/output terminal 102 is used to output the time code data PLTC generated by the system controller 23 and to input the reproduction time code LTC supplied from the switching circuit 13 of the recording-side VCR 10 shown in FIG. 1. The input terminal 102 is connected to input and output terminals of the switching circuit 13 of the recording-side VCR 10 shown in FIG. 1.

An input/output terminal 103 is used to input a drum switching pulse SWP supplied from the tape transport unit 14 shown in FIG. 1 through the servo control circuit 24 and to output various control signals by which the servo control circuit 24 shown in FIG. 1 controls a drum motor and a capstan motor of the rotary drum of the tape transport unit 14 and the tape transport unit 14 carries out loading and unloading of the magnetic tape 17, ejection of the video tape cassette and so on. The input/output terminal 103 is connected to the input/output terminal of the servo control circuit 24 shown in FIG. 1.

An input/output terminal 104 is used to input data KEY indicating contents of operation from the console panel 25 shown in FIG. 1 and to output the image data indicating the contents of the time code data displayed on the LCD 36. The input/output terminal 104 is the input/output terminal of the console panel 25 shown in FIG. 1.

Subsequently, there will be described functions which the system controller 23 has after power is supplied to the system controller.

When the power is supplied from a power supply to the system controller 23, the program data and the parameter data stored in the ROM 92 become resident in a main memory of the CPU 90, whereby the CPU 90 has a number of functions shown in a large block shown by a one-dot chain line in FIG. 4.

A tape transport unit controlling means 105 supplies a control signal through an input/output port 97, an input/output terminal 103 and the servo control circuit 24 shown in FIG. 1 to the tape transport unit 14, thereby controlling the tape transport unit 14 to carry out some operations such as to load and unload the magnetic tape 17 thereonto and therefrom, to eject the video tape cassette therefrom, or the like. The tape transport unit controlling means 105 generates a recording track signal RT based on the drum switching pulse SWP supplied from the tape transport unit 14 shown in FIG. 1 through the input terminal 103.

When data is recorded, a high "1" level of the recording track signal RT corresponds to "recording" and a low "0" level thereof corresponds to "non-recording". When data is reproduced, the recording track signal RT becomes the same signal as the drum switching pulse SWP.

A servo control means 106 supplies a control signal through the input/output port 97 and the input terminal 103 to the servo control circuit FIG. 1, thereby controlling the servo control circuit 24 to effect servo control on the drum motor (not shown) of the tape transport unit 14 and the capstan motor (not shown) thereof.

An LCD control means 107 generates image data indicating contents of the time code LTC supplied from the reproduction-side VCR 1 shown in FIG. 1 through the input terminal 99 and supplies the image data through the input/output port 97 and the input/output terminal 104 to the LCD 36 shown in FIG. 1, thereby controlling the LCD 36 to display the contents of the time code LTC as an image and controlling the LCD 36 to be driven.

An external VCR controlling means 108 supplies control commands of some operations, such as reproduction, recording, fast forwarding, rewinding, stop, pause or the like, the control signal CON including the time code data LTC through the input/output port 97 and the input/output terminal 98 to the system controller 8 of the reproduction-side VCR 1 shown in FIG. 1, thereby controlling the reproduction-side VCR 1 shown in FIG. 1 to carry out the above operations.

Though an input terminal and an output terminal are not shown in FIG. 4 in order to facilitate the description, the timing controlling means 109 supplies various timing signal used as reference to the respective units shown in FIG. 1. The timing controlling means 109 supplies the frame pulse Fp through the input/output port 97 and the output terminal 62O to the inter/intra determining circuit 61 of the video encoder 12v.

A time code generating means 110 generates the time code LTC for the recording-side VCR 10 and supplies the generated time code LTC through the input/output port 97, the input/output terminal 102 and the switching circuit 13 shown in FIG. 1 to the recording and reproducing head 16.

A key input discriminating means 111 discriminates which command is made through the console panel 25 shown in FIG. 1, on the basis of the input data KEY supplied from the console panel 25 through the input/output terminal 104 and the input/output port 97.

An external memory controlling means 112 supplies the read/write control signal R/W through the input/output port 97 and the output terminal 53O, 55O, 77O or 78O to the frame memories 52, 54 shown in FIG. 2 and the frame memories 76, 79 shown in FIG. 3, thereby controlling data to be read from and written in the frame memories 52, 54, 76 and 79.

An inside memory controlling means 113 supplies the read/write control signal to the ROM 92 and the RAM 93 shown in FIG. 4, thereby controlling operations of reading out the data stored in the ROM 92 and the RAM 93 and writing data in the RAM 93.

A decoding information generating means 114 supplies the inter/intra selection signal SEL supplied from the inter/intra determining circuit 61 of the video encoder 12v shown in FIG. 2 through the input terminal 63I and the input/output port 97 and the decoding information of the GOP head data from a GOP discriminating means 116, through the input/output port 97 and the output terminal 68O to the output coding circuit 68 of the video encoder 12v shown in FIG. 2.

A decoding information extracting means 115 extracts the inter/intra selection signal SEL and the GOP head data described above from the decoding information supplied from the input decoding circuit 71 of the video decoder 20v shown in FIG. 3 through the input terminal 72I and the input/output port 97.

The GOP discriminating means 116 generates the GOP head data based on the inter/intra selection signal SEL supplied from the inter/intra determining circuit 61 of the video encoder shown in FIG. 2 through the input terminal 63I and the input/output port 97 and the frame pulse Fp generated by the timing controlling means 109, supplying the generated GOP head data to the decoding information generating means 114. In the decoding processing, the GOP discriminating means 116 discriminates the head of the GOP based on the GOP head data extracted by the decoding information extracting means 115, supplying the discriminated results to an inter/intra discriminating means 117.

In the decoding processings, the inter/intra discriminating means 117 discriminates whether coding is the interframe coding of intraframe coding based on the inter/intra selection signal SEL extracted by the decoding information extracting means and discriminated results from the GOP discriminating circuit 116, supplying the inter/intra selection signal SEL through the input/output port 97 and the output terminal 85O to the switch 84 of the video decoder 20v shown in FIG. 3.

A time code reading means 118 reads the reproduced time code PLTC supplied from the reproduction-side VCR 1 shown in FIG. 1 through the input terminal 99 and the input/output port 97 and the reproduced time code LTC reproduced by the recording and reproducing head 16 of the recording-side VCR 10 and supplied therefrom through the input/output terminal 102 and the input/output port 97.

A time code comparing means 119 carries out at least two comparing operations. The first comparing operation is carried out to detect whether or not the reproduction time code PLTC supplied from the reproduction-side VCR 1 obtained when recording or reproduction is carried out is coincident with the time code stored in the RAM 93.

In order to synchronize the reproduction-side VCR 1 and the recording-side VCR 10 in their pre-roll period so that difference between time codes at the reproduction starting points thereof should constantly be a predetermined difference, the other comparing operation is carried out to detect whether or not a desired difference and an actual difference are equal to each other. When video data recorded on a portion from an optional first position to an optional second position of the magnetic tape 3 are recorded on a portion succeeding an optional recording position of the magnetic tape 17 of the video tape cassette loaded into the recording-side VCR 10, the desired difference is difference between a time code recorded at an optional first position on the magnetic tape 3 of the video tape cassette loaded into the reproduction-side VCR 1 and a time code recorded at the optional position on the magnetic tape 17 of the video tape cassette loaded into the recording-side VCR 10. If the reproduction-side VCR 1 and the recording-side VCR 10 are synchronized so that the desired difference and the actual difference should be constant, then it is possible to record a desired recording signal on the magnetic tape 3 on a portion succeeding the desired position of the magnetic tape 17.

Subsequently, a control operation of the system controller 23 shown in FIG. 4 will be described with reference to flowcharts shown in FIGS. 5 to 11. Means for mainly carrying out control operations are the above-mentioned means of the CPU 90. The terminals and the input/output port 97 have already been described and therefore need not to be described in the following description in order to avoid long sentences which prevents contents of the control operations of the respective means for mainly carrying out the control operations from being understood.

In step S1 shown in FIG. 5, the key input discriminating means 111 determines whether or not a "0" key of the ten key pad 34 of the console panel 25 shown in FIG. 1 is pressed. If it is determined as "YES" in step S1, then the process proceeds to step S150. If it is determined as "NO", then the process proceeds to step S2. An expression of "to press the "0" key of the ten-key pad 34" is described in order to facilitate the description.

In step S150, the CPU 90 shown in FIG. 4 carries out a processing based on a reproduction-side setting processing routine. The process proceeds to step S200. The reproduction-side setting processing is a processing for setting which portion of image data recorded on the magnetic tape 3 of the video tape cassette loaded into the reproduction-side VCR 1 shown in FIG. 1. Specifically, in the processing, data input when the a key of the ten-key pad 34 of the console panel 25 shown in FIG. 1 is pressed are held as time code data by pressing the enter key 34.

In step S200, the CPU 90 shown in FIG. 4 carries out a recording-side setting processing routine. The process proceeds to step S250. The recording-side setting processing is a processing for setting from which position on the magnetic tape 17 of the video tape cassette loaded into the recording-side VCR 10 shown in FIG. 1 the recording is started.

In step S250, the CPU 90 shown in FIG. 4 carries out a processing based on an insert edition processing routine. The process is ended. The insert edition processing is a processing for recording an insert image determined in step S150 on a portion succeeding the recording position, determined in step S250, of the magnetic tape 17 of the video tape cassette loaded into the recording-side VCR 10.

In step S2, the key input discriminating means 111 shown in FIG. 4 discriminates whether or not the reproduction key 27 of the console panel 25 shown in FIG. 1 is pressed. If it is determined as "YES" in step S2, then the process proceeds to step S100. If it is determined as "NO" in step S100, then the process proceeds to step S1000.

In step S100, the CPU 90 shown in FIG. 4 carries out a processing based on a reproduction processing routine. The process is ended. In step S100, the reproduction processing is a processing for reproducing operation.

In step S1000, the CPU 90 shown in FIG. 4 carries out a processing based on other processing routine. The process is ended. The "other processing routine" means processings such as a recording processing, but in this embodiment, the "other processing routine" need not be described. Therefore, it is only suggested that the "other processing routine" is provided and its contents will not be described.

FIGS. 6, 7 are flowcharts used to explain the control operation based on the reproduction side setting processing routine in step S150 of the flowchart shown in FIG. 5.

In step S151, the key input discriminating means 111 shown in FIG. 4 determines whether or not a key is pressed. If it is determined as "YES" in step S151, then the process proceeds to step S152.

In step S152, the key input discriminating means 111 determines whether or not the enter key 35 of the console panel 25 shown in FIG. 1 is pressed, based on the contents of the input data KEY. If it is determined as "YES" in step S153, then the process proceeds to step S153. If it is determined as "NO" therein, then the process proceeds to step S154.

In step S153, in accordance with a command from the key input discriminating means 111 shown in FIG. 4, the inside memory control means 113 controls the data held by the RAM 93 to be stored again in the RAM 93 as time code data Pin at an in-point. Then, the process proceeds to step S155.

In step S154, in accordance with the command from the key input discriminating means 111 shown in FIG. 4, the inside memory controlling means 113 controls the input data KEY to be temporarily held in the RAM 93. The process proceeds to step S151 again.

Processings in steps S151 to S154 will be described. In the reproduction-side setting processing routine, an in-point and an out-point on the magnetic tape 3 of the video tape cassette loaded into the reproduction-side VCR 1 are set by pressing the ten-key pad 34 and the enter key 35 of the console panel 25 shown in FIG. 1. As long as the key input discriminating means 111 shown in FIG. 4 does not determine that the enter key 35 is pressed, the input data KEY supplied by pressing the ten-key pad 34 are temporarily stored in the RAM under the control of the inside memory controlling means 112 in step S154. If in step S152 the key input discriminating means 111 determines that the enter key 35 is pressed, then in step S153 the data series of the input data KEY temporarily held in the RAM 93 at the time of determination are determined as one previous time code data Pin.

If contents of the time code data the user inputs are "01h (hour) 01m (minute) 01s (second) 01 (frame)", then the user should input "01010101" by using the ten-key pad 34 shown in FIG. 1. If the user presses the enter key 35 after the user inputs the time code by using the ten-key pad 34, then the input data "01010101" are stored in the RAM 93 as the time code data.

In step S155, the key input discriminating means 111 shown FIG. 4 determines whether or not the key is pressed. If it is determined as "YES" in step S155, then the process proceeds to step S156.

In step S156, the key input discriminating means 111 shown in FIG. 4 determines whether or not the enter key 35 is pressed based on the contents of the input data KEY. If it is determined as "YES", then the process proceeds to step S157. If it is determined as "NO", the process proceeds to step S158.

In step S157, in accordance with the command from the key input discriminating means 111 shown in FIG. 4, the inside memory controlling means 113 controls the data held in the RAM 93 to be stored again in the RAM 93 as time code data Pout of the out-point. Then, the process proceeds to step S159 of the flowchart shown in FIG. 7.

In step S158, in accordance with the command from the key input discriminating means 111 shown in FIG. 4, the inside memory controlling means 113 controls the input data KEY to be held in the RAM 93 temporarily. Then, the process proceeds to step S156 again.

The above-mentioned processings in steps S155 to S158 are steps for inputting the time code of the out-point. In the processings in steps S155 to S158, the time code of the output-point is determined in the similar process to steps S151 to S154.

In step S159, the external VCR controlling means 108 shown in FIG. 4 supplies the control signal CON commanding reproduction to the system controller 8 of the reproduction-side VCR 1 shown in FIG. 1. Based on the control signal CON, the system controller 8 of the reproduction-side VCR 1 controls the tape transport unit 2 and the servo control circuit 6 to start the reproducing operation of the tape transport unit 2. When the reproducing operation of the reproduction-side VCR 1 is started, the reproduced time code data PLTC are supplied from the reproduction-side VCR 1 to the system controller 23 of the recording-side VCR 10. The time code reading means 118 shown in FIG. 4 read the reproduction time code data PLTC supplied from the reproduction-side VCR 1 and supplies the read reproduction time code data PLTC to the RAM 93. The inside memory controlling means 112 supplies the read/write control signal to the RAM 93 under the control of the time code reading means 118. Based on the read/write control signal, the reproduction time code data PLTC are stored in the RAM 93. Then, the process proceeds to step S160.

In step S160, the external VCR controlling means 108 shown in FIG. 4 supplies the control signal CON commanding stop to the system controller 8 of the reproduction-side VCR 1 shown in FIG. 1. Based on the control signal CON, the system controller 8 of the reproduction-side VCR 1 controls the tape transport 2 and the servo control unit 6 to stop the reproducing operation of the tape transport unit 2. Then, the process proceeds to step S161.

In step S161, the inside memory controlling means 113 read the reproduction time code data PLTC and the time code data Pin of the in-point from the RAM 93 under the control of the time code comparing means. The read reproduction time code data PLTC and the read time code data Pin of the in-point are supplied to the time code comparing means 119. The time code comparing means 119 compares the reproduction time code data PLTC and the time code data Pin of the in-point. Then, the process proceeds to step S162.

In step S162, the time code comparing means 119 shown in FIG. 4 determines whether or not a position on time base of the reproduction time code data PLTC are prior to a position on time base of the time code data Pin of the in-point. If it is determined as "YES", then the process proceeds to step S163. If it is determined as "NO", then the process proceeds to step S167. The determination in step S162 is carried out to determine whether the reproduction-side VCR 1 carries out a rewinding operation or fast forwarding operation in order to set a position of the magnetic tape to the position indicated by the time code data Pin of the in-point.

In step S163, the external VCR controlling means 108 shown in FIG. 4 supplies the control signal CON commanding rewinding to the system controller 8 of the reproduction-side VCR 1 shown in FIG. 1. Based on the control signal, the system controller 8 of the reproduction-side VCR 1 controls the tape transport unit 2 and the servo control unit 6 to start a rewinding operation of the tape transport unit 2. Then, the process proceeds to step S164.

In step S164, the time code reading means 118 shown in FIG. 4 reads the reproduction time code PLTC supplied from the reproduction-side VCR 1 and supplies the read reproduction time code data PLTC to the RAM 93. The inside memory controlling means 113 supplies the read/write control signal to the RAM 93 under the control of the time code reading means 118. Based on the read/write control signal, the reproduction time code data PLTC are stored in the RAM 93. Then, the process proceeds to step S165.

In step S165, under the control of the time code comparing means 119 shown in FIG. 4, the inside memory control means 113 reads the reproduction time code data PLTC and the time code data Pin of the in-point from the RAM 93. The read reproduction time code data PLTC and the read time code data Pin of the in-point are supplied to the time code comparing means 119. The time code comparing means 119 compares the reproduction time code data PLTC and the time code data Pin of the in-point and determines whether or not the position on time base of the reproduction time code data PLTC are several-second previous to the position on time base of the time code data Pin of the in-point. If it is determined as "YES", the process proceeds to step S166.

In step S166, the external VCR controlling means 108 supplies the control signal CON commanding pause to the system controller 8 of the reproduction-side VCR 1 shown in FIG. 4. Based on the control signal, the system controller 8 of the reproduction-side VCR 1 controls the tape transport unit 2 and the servo control unit 6 to stop the rewinding operation of the tape transport unit 2 and thereafter set the tape transport unit 2 in its pause mode. The process proceeds from the reproduction-side setting processing routine to the recording-side setting processing routine in step S200 in the main routine shown in FIG. 5.

In step S162, if it is determined as "NO", then the process proceeds to step S167. In step S167, the external VCR controlling means 108 shown in FIG. 4 supplies the control signal CON commanding fast forwarding to the system controller 8 of the reproduction-side VCR 1 shown in FIG. 1. Based on the control signal, the system controller 8 of the reproduction-side VCR 1 controls the tape transport unit 2 and the servo control unit 6 to start the fast forwarding operation of the tape transport unit 2. Then, the process proceeds to step S164.

FIGS. 8 and 9 are flowcharts used to explain control operations based on the recording-side setting processing routine in step S200 of the flowchart shown in FIG. 5.

In step S201, the key input discriminating means 111 shown in FIG. 4 determines whether or not the key is pressed. If it is determined as "YES", then the process proceeds to step S202.

In step S202, the key input discriminating means 111 shown in FIG. 4 determines whether or not the enter key 35 shown in FIG. 1 is pressed, based on the contents of the input data KEY. If it is determined as "YES", then the process proceeds to step S203. If it is determined as "NO", then the process proceeds to step S204.

In step S203, in accordance with the command from the key input discriminating means 111 shown in FIG. 4, the inside memory controlling means 113 controls the data held by the RAM 93 to be stored in the RAM 93 as the time code data Rin of the in-point (the recording start point) again. Then, the process proceeds to step S205 of the flowchart shown in FIG. 9.

In step S204, in accordance with the command from the key input discriminating means 111 shown in FIG. 4, the inside memory control means 113 temporarily holds the input data KEY in the RAM 93. Then, the process proceeds to step S201.

The above-mentioned processings in steps S201 to S204 are processings for inputting the time code of the recording start point on the magnetic tape 17 of the video tape cassette loaded into the recording-side VCR 10. In the processings in steps S201 to S204, the time code of the in-point is determined in the similar process to that in steps S151 to S154 of the reproduction-side setting processing routine and that in steps S155 to S158 thereof.

In step S205, the tape transport unit controlling unit 105 shown in FIG. 4 supplies the control signal commanding reproduction through the servo control circuit 24 to the tape transport unit 2 to thereby control the tape transport unit 2 to start its reproducing operation. When the reproducing operation of the tape transport unit 14 is started, the tape transport unit 14 supplies the time code data LTC to the system controller 23. The time code reading means 118 shown in FIG. 4 supplies the read time code data LTC to the RAM 93. The inside memory control means 112 supplies the read/write control signal to the RAM 93 under the control of the time code reading means 118. Based on the read/write control signal, the time code data LTC are stored in the RAM 93. Then, the process proceeds to the step S206.

In step S206, the tape transport unit controlling means 105 shown in FIG. 4 supplies the control signal commanding stop through the servo control circuit 24 to the tape transport unit 14 to control the tape transport unit 14 to stop its reproducing operation. Then, the process proceeds to S207.

In step S207, under the control of the time code comparing means 119 shown in FIG. 4, the inside memory controlling means 113 read the time code data LTC and the time code data Rin from the RAM 93 and supplies the read time code data LTC and the read time code data Rin to the time code comparing means 119. The time code comparing means 119 compares the time code data LTC and the time code data Rin of the in-point. Then, the process proceeds to step S208.

In step S208, the time code comparing means 119 shown in FIG. 4 determines whether or not the position on time base of the time code data LTC is prior to the position on time base of the time code data Rin of the in-point. If it is determined as "YES", then the process proceeds to step S209. If it is determined as "NO", then the process proceeds to step S213. The determination in step S208 is carried out to determine whether the tape transport unit 14 carries out its rewinding operation or fast forwarding operation in order to set the position of the magnetic tape 17 to the position indicated by the time code data Pin of the in-point.

In step S209, the tape transport unit controlling means 105 shown in FIG. 4 supplies the control signal commanding rewinding through the servo control circuit 24 to the tape transport unit 14 to control the tape transport unit 14 to start its rewinding operation. Then, the process proceeds to step S210.

In step S210, the time code reading means 118 shown in FIG. 4 reads the time code data LTC supplied from the tape transport unit 14 and supplies the read reproduction time code data LTC to the RAM 93. The inside memory controlling means 113 supplies the read/write control signal to the RAM 93 under the control of the time code reading means 118. Based on the read/write control signal, the time code data LTC are stored in the RAM 93. Then, the process proceeds to step S211.

In step S211, under the control of the time code comparing means 119 shown in FIG. 4, the inside memory controlling means 113 read the time code data LTC and the time code data Rin of the in-point from the RAM 93. The read time code data LTC and the read time code data Rin of the in-point are supplied to the time code comparing means 119. The time code comparing means 119 compares the time code data LTC and the time code data Rin of the in-point and determines whether or not the position on time base of the time code data LTC is several-second previous to the position on time base of the time code data Rin of the in-point. If it is determined as "YES", the process proceeds to step S212.

In step S212, the external VCR controlling means 108 shown in FIG. 4 supplies the control signal commanding pause through the servo control circuit 24 shown in FIG. 1 to the tape transport unit 14 to control the tape transport unit 2 to stop its rewinding operation and then to set the tape transport unit 2 in its pause state. Then, the process proceeds from the recording-side setting processing routine to the insert edition processing routine in step S250 of the main routine shown in FIG. 5.

In step S213, tape transport unit controlling means 105 shown in FIG. 4 supplies the control signal commanding fast forwarding through the servo control circuit 24 to the tape transport unit 14 to control the tape transport unit 14 to start its fast forwarding operation, Then, the process proceeds to step S210.

FIG. 10 is a flowchart used to explain the control operations based on the insert edition processing routine in step S250 of the flowchart shown in FIG. 5.

In step S251, the external VCR controlling means 108 shown in FIG. 4 supplies the control signal CON commanding reproduction to the system controller 8 of the reproduction-side VTR 1 shown in FIG. 1. Based on the control signal, the system controller 8 of the reproduction-side VTR 1 controls the tape transport unit 2 and the servo control circuit 6 to start the reproducing operation of the tape transport unit 2. When the reproducing operation of the reproduction-side VCR 1 is started, the reproduction-side VCR 1 supplies the reproduction time code data PLTC to the system controller 23. The time code reading means 118 shown in FIG. 4 read the reproduction time code data PLTC supplied from the reproduction-side VCR 1 and supplies the read reproduction time code data PLTC to the RAM 93. The inside memory controlling means 112 supplies the read/write control signal to the RAM 93 under the control of the time code reading means 118. Based on the control signal, the reproduction time code data PLTC are stored in the RAM 93. Then, the process proceeds to step S252.

In step S252, the tape transport unit controlling means 105 shown in FIG. 4 supplies the control signal commanding reproduction through the servo control circuit 24 to the tape transport unit 14 to control the tape transport unit 14 to start its reproducing operation. When the reproducing operation of the tape transport unit 14 is started, the tape transport unit 2 supplies the time code data LTC to the system controller 23. The time code reading means 118 shown in FIG. 4 reads the time code data LTC supplied from the tape transport unit 14 and supplies the read time code data LTC to the RAM 93. The inside memory controlling means 113 supplies the read/write control signal to the RAM 93 under the control of the time code reading means 118. Based on the read/write control signal, the time code data LTC are stored in the RAM 93. Then, the process proceeds to step S253.

In step S253, under the control of the time code comparing means 119, the inside memory control means 113 reads the reproduction time code data PLTC and the time code data LTC. The read reproduction time code data PLTC and the read time code data LTC are supplied to the time code comparing means 119. The time code comparing means 119 calculates difference between the reproduction time code data PLTC from the reproduction-side VCR 1 and the time code data LTC from the tape transport unit 14. The time code comparing means 119 determines whether or not the obtained difference is coincident difference between the time code Pin of the in-point on the magnetic tape 3 of the video tape cassette loaded into the reproduction-side VCR 1 and the time code Rin of the in-point on the magnetic tape 17 of the video tape cassette loaded into the recording-side VCR 10. The time code comparing means 119 supplies the result to the external VCR controlling means 108 and the tape transport unit controlling means 105. Based on the result of comparison, the external VCR controlling means 108 controls the reproduction-side VCR 1 and the tape transport unit controlling means 105 controls the tape transport unit 14, whereby the reproduction-side VCR 1 and the tape transport unit 14 are synchronized with each other.

In step S254, the time code reading means 118 shown in FIG. 4 reads the reproduction time code data PLTC supplied from the reproduction-side VCR 1 and supplies the read reproduction time code data PLTC to the RAM 93. The inside memory controlling means 112 supplies the read/write control signal to the RAM 93 under the control of the time code reading means 118. Based on the read/write control signal, the reproduction time code data PLTC are stored in RAM 93. Then, the process proceeds to step S255.

In step S255, under the control of the time code comparing means 119 shown in FIG. 4, the inside memory control means 113 reads the reproduction time code data PLTC and the time code data Pin of the in-point form the RAM 93. The time code comparing means 119 compares the reproduction time code data PLTC and the time code data Pin of the in-point and determines whether or not the position on time base of the reproduction time code data PLTC is the position on time base of the time code data Pin of the in-point. If it is determined as "YES", then the process proceeds to step S256.

In step S256, the decoding information generating means 114 shown in FIG. 4 supplies the decoding information EDa formed of the GOP head data and the inter/intra selection signal to the output coding circuit 68 of the video encoder 12v shown in FIG. 2. Then, the process proceeds to step S257.

In step S257, the tape transport unit controlling means 105 supplies the control signal commanding recording through the servo control circuit 24 to the tape transport unit 14, thereby controlling the tape transport unit 14 to start its recording operation. When the recording operation of the tape transport unit 14 is started, the output coding circuit 68 of the video encoder 12v shown in FIG. 2 supplies the video data, the audio data and the decoding information for output through the switching circuit 13 shown in FIG. 1 to the recording and reproducing head 15 which records the video data, the audio data and the decoding information on the magnetic tape 17 from the position of the in-point Rin on slant tracks formed thereon. Then, the process proceeds to step S258.

In step S258, the time code reading means 118 shown in FIG. 4 reads the reproduction time code data PLTC supplied from the reproduction-side VCR 1 and supplies the read reproduction time code data PLTC to the RAM 93. The inside memory controlling means 113 supplies the read/write control signal to the RAM 93 under the control of the time code reading means 118. Based on the read/write control signal, the reproduction time code data PLTC are stored in the RAM 93. Then, the process proceeds to step S259.

In step S259, under the control of the time code comparing means 119, the inside memory controlling means 113 reads the reproduction time code data PLTC and the code data Pout of the out-point from the RAM 93. The read reproduction time code data PLTC and the read code data Pout of the out-point are supplied to the time code comparing means 119. The time code comparing means 119 compares the reproduction time code data PLTC and the time code data Pout of the out-point and determines whether or not the position on time base of the reproduction time code data PLTC is the position on time base of the time code data Pout of out-point. If it is determined as "YES", then the process proceeds to step S260.

In step S260, the tape transport unit controlling means 105 supplies the control signal commanding cancellation of recording operation to the tape transport unit 14 through the servo control unit 24, thereby controlling the tape transport unit 14 to cancel its recording operation. Then, the process proceeds to step S261.

In step S261, the tape transport unit controlling means 105 shown in FIG. 4 supplies the control signal commanding stop through the servo control circuit 2 to the tape transport unit 14, thereby controlling the tape transport unit 14 to stop its operation. Then, the process proceeds to step S262.

In step S262, the external VCR controlling means 108 shown in FIG. 4 supplies the control signal CON commanding stop to the system controller 8 of the reproduction-side VCR 1. Based on the control signal, the system controller 8 of the reproduction side VCR 1 controls the tape transport unit 2 and the servo control circuit 6 to thereby stop the reproducing operation of the tape transport unit 2. The process proceeds from the insert edition processing routine and the processings in the main routine shown in FIG. 5 are ended.

FIG. 11 is a flowchart used to explain the control operation based on the reproduction processing routine in step S100 of the flowchart shown in FIG. 5.

In step S101, the tape transport unit controlling means 105 supplies the control signal commanding reproduction through the servo control circuit 24 to the tape transport unit 14 to control the tape transport unit 14 to start its reproducing operation. When the reproducing operation of the tape transport unit 14 is started, the reproduced data from the tape transport unit 14 are supplied to the input decoding circuit 71. The input decoding circuit 71 subjects the video data, the audio data and the decoding information DDa to decoding processing based on the channel decoding and the error correction processing and then supplies the video data to the variable-length coding circuit 73, the audio data to the audio decoder 21a shown in FIG. 1 and the decoding information DDa to the system controller 23. The decoding information extracting means 115 shown in FIG. 4 obtains the decoding information DDa and supplies the decoding information DDa to the RAM 93. The inside memory controlling means 113 supplies the read/write control signal to the RAM 93 under the control of the decoding information extracting means 115. Based on the read/write control signal, the decoding information DDa extracted by the decoding information extracting means 115 are stored in the RAM 93. Then, the process proceeds to step S102.

In step S102, under the GOP discriminating means 116 shown in FIG. 4, the inside memory controlling means 113 supplies the read/write control signal to the RAM 93. Based on the read/write control signal, the GOP head data stored in the RAM 93 are read therefrom. The GOP head data read from the RAM 93 are supplied to the GOP discriminating means 116. The GOP discriminating means 116 discriminates whether or not the GOP head data supplied from the RAM 93 has a value of "1". If it is determined as "YES", then the process proceeds to step S104. If it is determined as "NO", then the process proceeds to step S103.

In step S103, the GOP discriminating means 116 shown in FIG. 4 discriminates whether or not the GOP head data supplied form the RAM 93 has a value of "0". If it is determined as "YES", then the process proceeds to step S104. If it is determined as "NO", then the process proceeds to step S106.

In step S104, under the control of the inter/intra discriminating means 117 shown in FIG. 4, the inside memory controlling means 113 supplies the read/write control signal to the RAM 93. Based on the read/write control signal, the inter/intra selection signal SEL stored in the RAM 93 are read therefrom. The inter/intra selection signal SEL read from the RAM 93 are supplied to the inter/intra determining means 117. Then, the process proceeds to step S105.

In step S105, the inter/intra determining means 117 supplies the inter/intra selection signal SEL read from the RAM 93. Based on the inter/intra selection signal SEL, the movable contact c of the switch 84 is connected to the inter-side fixed contact a or the intra-side fixed contact b to carry out inter/intra switching. Then, the process proceeds to step S106.

In step S106, the external memory controlling means 112 shown in FIG. 4 controls the frame memories 76, 79 shown in FIG. 3 to read and write data from and in the frame memories 76, 79. Then, the motion compensation circuits 80, 81 and the adder circuits 82, 83 start the processings for restoring the original macro block data. Then, the process proceeds to step S107.

In step S107, under the control of the timing controlling means 109 shown in FIG. 4, the variable-length decoding circuit 73 shown in FIG. 3 supplies the motion vector data MV to the motion compensation circuits 80, 81. Then, the process proceeds to step S108.

In step S108, the key input discriminating means 111 shown in FIG. 4 determines whether or not the stop key 29 shown in FIG. 1 is pressed. If it is determined as "YES", the process proceeds from the reproduction processing routine to the main routine shown in FIG. 5 and then is ended.

In the reproduction processing routine, the inter/intra switching is carried out at the GOP head and the picture head and the control on decoding the data is carried out by a macro block unit.

However, the insert edition in the above-mentioned editing system is encountered with a problem which should be solved. This problem will be described with reference to FIG. 12.

FIG. 12 is a diagram used to explain disadvantages caused when the insert edition is carried out in the above-mentioned editing system described with reference to FIGS. 1 through 11.

FIG. 12A shows the in-point Pin and out-point Pout the user sets in the insert image in the reproduction-side setting processing routine in step S150 of the flowchart shown in FIG. 5. FIG. 12B shows the frame numbers of the frame data recorded on the magnetic tape 17 of the video tape cassette loaded into the recording-side VCR 10 shown in FIG. 1. FIG. 12C shows a picture type of the data, corresponding to the frame number shown in FIG. 12B, recorded on the magnetic tape 17. In FIG. 12C, left-side letters of reference symbols depict the frame types and right-side numerals thereof depict the frame numbers. For example, the recorded data of the frame number "0" are marked with reference symbols "B0". The reference symbol "B0" represent a B picture of the frame number "0". For example, reference symbols "I1" represents an I picture of the frame number "1". It is assumed similar to the above description that one GOP is formed of two frames and includes a B picture and an I picture.

Study of FIGS. 12A, 12B and 12C reveals assumption that, as shown in FIG. 12C, time code data recorded on a position where data of fifth frame on the magnetic tape 17 are set as the in-point (recording start point) Rin, an image on the magnetic tape 3 of the video tape cassette from the recording position of the time code data Pin of the in-point to a recording position of the time code data of the out-point Pout are recorded as the insert image on the magnetic tape 17 of the video tape cassette loaded into the recording-side VCR 10 from the position of the in-point Rin thereon.

FIG. 12E is a diagram showing an insertion state by using a level of the control signal. In FIG. 12E, a period when the control signal is at high "1" level is a period in which an image is inserted. Specifically, FIG. 12E shows which data-recorded portion on the magnetic tape 17 of the video tape cassette of the recording-side VCR 10 is to be over-written by the insert edition. FIG. 12F shows insert images I2', B3', I' and BS' which are reproduced by the reproduction-side VCR 1 and are to be recorded on the magnetic tape 17 of the recording-side VCR 10. As shown in FIG. 12J, an active period of the recording track signal supplied from the tape transport unit controlling means 105 shown in FIG. 4 to the tape transport unit 14 shown in FIG. 1, i.e., a recording period has the same length as the high "1"

level period of the insertion period shown in FIG. 12F. Therefore, as shown in FIG. 12J, the insert image shown in FIG. 12F is recorded on the magnetic tape 17 of the recording-side VCR 10 with slant tracks being formed only in the high "1" level period of the recording track signal.

FIG. 12K shows a track pattern on the magnetic tape 17. Study of FIG. 12K reveals that two tracks are formed on the magnetic tape 17 per one GOP, one of them being a recording region for the B picture and the I picture and the other thereof being a region for the I picture. In the GOP at the head position of the insertion region, there are inserted I picture I2' and a B picture B4 and an I picture I5 originally recorded on the magnetic tape 17. In the GOP at the last position of the insertion region, there are inserted B and I pictures B5' and I6' and an originally recorded I picture I9. The I picture I6' is the I picture I6' of the inserted image and is recorded on an upper portion of the track as shown in FIG. 12. FIG. 12L shows the time code data which are recorded on the magnetic tape 17 with longitudinal tracks being formed.

As described above, the I picture is the picture generated by the intraframe coding so that the I picture is restored by the decoding processings carried out at a stage from the input decoding circuit 71 to the IDCT circuit 75. On the other hand, the B picture is the picture generated by the interframe coding so that the B picture must be subjected to the decoding processings and then subjected to restoring processings using the motion compensation circuits 80, 81 and the adder circuits 82, 83. Hereinafter, only the B pictures marked with arrows in FIG. 12 will be described.

Initially, the B picture B4 will be described. When the B picture B4 originally recorded on the magnetic tape 17 of the recording-side VCR 10 is restored, as shown by arrows in FIG. 12G, the I picture I3 originally recorded on the magnetic tape 17 of the recording-side VCR 10 and the I picture I2' newly recorded by the insert edition are used. Specifically, the B picture B4 is restored by using the I picture I3 used when the B picture B4 is coded and the I picture I2' as the insert image having no relation to the B picture B4.

Subsequently, a B picture B3' newly recorded by the insert edition will be described. When the B picture B3' newly recorded by the insert edition is restored, as shown by arrows in FIG. 12, the I picture I2' newly recorded by the insert edition and the I picture I4' newly recorded by the insert edition are used. Specifically, the B picture B3' is restored by using the I picture I2' used when the B picture B3' is coded and the I picture I4' used when the B picture B3' is coded.

A B picture B5' newly recorded by the insert edition will be described. When the B picture B5' newly recorded by the insert edition is restored, as shown by arrows in FIG. 12G, the I picture I4' newly recorded by the insert edition and the I picture I9 originally recorded on the recording tape 17 of the recording-side VCR 10 are used. Specifically, the B picture B5' is restored by using the I picture I4' used when the B picture B5' is coded and the I picture I9 which is originally recorded on the recording tape 17 of the recording-side VCR 10 and has no relation to the B picture B5'.

As understood from the above description, when the interframe-coded insert images recorded on the magnetic tape 17, interframe-coded image data at an insert start point and interframe-coded image data at an insert end point are restored by using images which are not used when the interframe-coded image data are interframe-coded. In FIG. 12G, such interframe-coded image data are the B picture B4 originally recorded on the magnetic tape 17 of the recording-side VCR 10 and the B picture B5' newly recorded by the insert edition on the magnetic tape 17 of the recording-side VCR 10.

Accordingly, as shown in FIG. 12I, of restored reproduced images V0B to V11I, a reproduced image V4B based on the B picture B4 originally recorded on the magnetic tape 17 of the recording-side VCR 10 and a reproduced image V5B' based on the B picture B5' newly recorded by the insert edition on the magnetic tape 17 of the recording-side VCR 10 are images whose picture qualities are remarkably deteriorated since the images are decoded by using two images having no relation with each other.

For example, if image data originally recorded on the magnetic tape 17 of the recording-side VCR 10 are image data indicating a mountain and image data newly recorded by the insert edition are image data indicative of sea, then the "image whose picture quality is remarkably deteriorated" is an image restored by using the image data indicating a mountain and the image data indicating sea. The image may be referred to as "an image which cannot be visually identified by wrong processing" rather than "an image whose picture quality is remarkably deteriorated".

While such disadvantage is caused in the bidirectionally predictive coding as described above, such disadvantage is similarly caused in one-direction predictive coding. For example, although the B picture B4 shown in FIG. 12G is coded by using an I picture I4 (which is not shown in FIG. 12G because of overwriting due to the insert edition), the B picture B4 is restored by using the I picture I2' newly recorded by the insert edition on the magnetic tape 17 of the recording-side VCR 10. Although the B picture B5' shown in FIG. 12G is coded by using an I picture I6' (which is used upon the coding and only a small amount of data of which is recorded on the magnetic tape 17 of the recording-side VCR 10), the B picture B5' is restored by using the I picture I9 originally recorded on the magnetic tape 17 of the recording-side VCR 10 as shown in FIG. 12G. Specifically, even when the one-direction predictive coding is carried out, it is inevitable to reproduce the image whose picture quality is remarkably deteriorated.

A word "frame" will be defined. When an image is a picture object picked up by a video camera, the "frame" is formed of odd and even fields in television systems such as NTSC system, PAL system or the like. When an image generated by a processing of computer graphics, the "frame" is an image generated by using one frame. While the problem caused when a "frame" image is handled is described above, the problem is, strictly speaking, not a problem caused when the "frame" image is handled but a problem when a coding processing is effected on images at different positions on time base. Thus, when the coding processing is effected on an image obtained by image pickup using a video camera, the above-mentioned problem is similarly caused. When the coding processing is effected on the image generated by the processing of the computer graphics, the image is generally generated by a frame unit in the processing of the computer graphics so that the interframe coding processing is used as the coding processing. Accordingly, when the coding processing is effected on the image generated by the processing of the computer graphics, the above-mentioned problem is caused in the interframe coding processing.

SUMMARY OF THE INVENTION

It is an object of the present invention to provide a method of and an apparatus for recording image information, a method of and an apparatus for reproducing image information, and a method of and a system for editing image information to recover an image at a boundary between an inserted image and an originally recorded image for thereby providing a reproduced image of high quality even when interframe-coded image data is recorded by an insert editing process on a recording medium on which interframe-coded image data has been recorded.

According to an aspect of the present invention, there is provided a method of recording image information, comprising the steps of intraframe-coding at least one frame of image information of each recording unit composed of a plurality of frames, and interframe-coding remaining frames of image information to output coded image information, dividing the coded image information into first and second groups in the same frame, adding decoding information to the divided coded image information of the first and second groups, recording the first group of divided coded image information with the decoding information added in the recording unit, in a first recording area of a recording medium, recording the second group of divided coded image information with the decoding information added in the recording unit, in a second recording area of the recording medium, determining whether a start-of-record frame or end-of-record frame of coded image information to be recorded agrees with an intermediate frame in the recording unit of coded image information recorded on the recording medium, in an editing recording mode in which the coded image information is recorded in superimposed relation to the areas of the recording medium in which the first group of divided coded image information and the second group of divided coded image information are recorded, and recording one of the first and second groups of divided coded image information in one of the first and second areas of the recording medium among recording areas which correspond to the intermediate frame, when the start-of-record frame or end-of-record frame of coded image information to be recorded is determined as agreeing with the intermediate frame in the recording unit of coded image information recorded on the recording medium.

According to another aspect of the present invention, there is also provided a method of recording image information, comprising the steps of intraframe-coding at least one frame of image information of each recording unit composed of a plurality of frames, and interframe-coding remaining frames of image information to output coded image information, determining whether the coded image information is to be divided into first and second groups in the same frame, dividing the coded image information into first and second groups in the same frame based on the result of the step of determining whether the coded image information is to be divided, adding decoding information to the divided coded image information of the first and second groups or undivided coded image information which is not divided into the first and second groups in the step of dividing the coded image information, recording the first group of divided coded image information with the decoding information added in the recording unit, in a first recording area of a recording medium, recording the second group of divided coded image information with the decoding information added in the recording unit, in a second recording area of the recording medium, recording the undivided coded image information with the decoding information added in the recording unit, in the first recording area or the second recording area of the recording medium, determining whether a start-of-record frame or end-of-record frame of coded image information to be recorded agrees with an intermediate frame in the recording unit of coded image information recorded on the recording medium, in an editing recording mode in which the coded image information is recorded in superimposed relation to the areas of the recording medium in which the first group of divided coded image information and the second group of divided coded image information are recorded, and recording one of the first and second groups of divided coded image information or the undivided coded image information in one of the first and second areas of the recording medium among recording areas which correspond to the intermediate frame, when the start-of-record frame or end-of-record frame of coded image information to be recorded is determined as agreeing with the intermediate frame in the recording unit of coded image information recorded on the recording medium.

According to still another aspect of the present invention, there is provided an apparatus for coding image information in recording units each composed of a plurality of frames to generate coded image information and recording the coded image information on a recording medium, comprising coding means for intraframe-coding at least one frame of image information of each recording unit, and interframe-coding remaining frames of image information to output coded image information, dividing means for dividing the coded image information into at least first and second groups in the same frame, recording means for recording output information from the dividing means on the recording medium, and control means for controlling the recording means to record the first and second groups of divided coded image information from the dividing means in first and second areas located in different positions from each other on the recording medium in a normal recording mode, and to rewrite only one of the first and second areas of the recording medium among recording areas which correspond to the intermediate frame, with one of the first and second groups of divided coded image information, when a start-of-record frame or end-of-record frame of coded image information to be recorded agrees with an intermediate frame in the recording unit of coded image information recorded on the recording medium in an editing recording mode in which the coded image information is recorded in superimposed relation to the areas of the recording medium in which the coded image information is recorded.

According to yet still another aspect of the present invention, there is provided an apparatus for coding image information in recording units each composed of a plurality of frames to generate coded image information and recording the coded image information on a recording medium, comprising coding means for intraframe-coding at least one frame of image information of each recording unit, and interframe-coding remaining frames of image information to output coded image information, dividing means for outputting at least first and second groups of coded image information divided from the coded image information in the same frame or undivided coded image information, recording means for recording output information from the dividing means on the recording medium, and control means for controlling the recording means to record the first and second groups of divided coded image information from the dividing means in first and second areas located in different positions from each other on the recording medium in a normal recording mode, and to rewrite only one of the first and second areas of the recording medium among recording areas which correspond to the intermediate frame, with one of the first and second groups of divided coded image information or the undivided coded image information, when a start-of-record frame or end-of-record frame of coded image information to be recorded agrees with an intermediate frame in the recording unit of coded image information recorded on the recording medium in an editing recording mode in which the coded image information is recorded in superimposed relation to the areas of the recording medium in which the coded image information is recorded.

According to a further aspect of the present invention, there is provided a method of reproducing image information from a recording medium in which at least one frame of image information in recording units each composed of a plurality of frames is intraframe-coded and remaining frames of image information are interframe-coded to produce coded image information, the coded image information is divided into first and second groups in the same frame, decoding information comprising information indicative of a start of each recording unit and information indicative of whether the decoded image information is intraframe-coded or interframe-coded is added to the decoded image information, the first group of divided coded image information with the decoding information added in the recording unit is recorded in a first recording area of a recording medium, the second group of divided coded image information with the decoding information added in the recording unit is recorded in a second recording area of a recording medium, and when a start-of-record frame or end-of-record frame of coded image information to be recorded agrees with an intermediate frame in the recording unit of coded image information recorded on the recording medium in an editing recording mode in which the coded image information is recorded in superimposed relation to the areas of the recording medium in which the coded image information is recorded, only one of the first and second areas of the recording medium among recording areas which correspond to the intermediate frame is rewritten with one of the first and second groups of divided coded image information, the method comprising the steps of reproducing the first and second groups of divided coded image information recorded on the recording medium to produce first and second groups of reproduced coded image information, decoding the first and second groups of reproduced coded image information to produce first reproduced image information and second reproduced image information, constructing single image information from the first reproduced image information and the second reproduced image information, detecting, based on the decoding information, that the first or second area corresponding to the intermediate frame in the recording unit has been rewritten with one of the first and second groups of divided coded image information to be recorded, interpolating the first or second group of reproduced image information, which has been intraframe-coded when recorded, reproduced from one of the first and second areas, to produce interpolated image information, and recovering the first or second group of reproduced image information, which has been interframe-coded when recorded, reproduced from one of the first and second areas, based on the interpolated image information and the image information, which has been intraframe-coded when recorded, in a recording unit adjacent to the recording unit, and recovering the second or first group of reproduced image information, which has been intraframe-coded when recorded, reproduced from the other of the first and second areas.

According to a still further aspect of the present invention, there is provided a method of reproducing image information from a recording medium in which at least one frame of image information in recording units each composed of a plurality of frames is intraframe-coded and remaining frames of image information are interframe-coded to produce coded image information, decoding information comprising information indicative of a start of each recording unit, information indicative of whether the decoded image information is intraframe-coded or interframe-coded, and dividing information indicative of whether the coded image information has been divided or not, is added to the coded image information or first and second groups of divided coded image information divided in the same frame from the coded image information, the first group of divided coded image information with the decoding information added in the recording unit or the coded image information is recorded in a first recording area of a recording medium, the second group of divided coded image information with the decoding information added in the recording unit or the coded information is recorded in a second recording area of a recording medium, and when a start-of-record frame or end-of-record frame of coded image information to be recorded agrees with an intermediate frame in the recording unit of coded image information recorded on the recording medium in an editing recording mode in which the coded image information is recorded in superimposed relation to the areas of the recording medium in which the coded image information is recorded, only one of the first and second areas of the recording medium among recording areas which correspond to the intermediate frame is rewritten with one of the first and second groups of divided coded image information or the coded image information, the method comprising the steps of reproducing the first and second groups of divided coded image information or the coded image information recorded on the recording medium to produce first and second groups of reproduced coded image information or coded image information, decoding the first and second groups of reproduced coded image information or the coded image information to produce first reproduced image information and second reproduced image information or coded image information, constructing single image information from the first reproduced image information and the second reproduced image information, detecting, based on the decoding information, that the first or second area corresponding to the intermediate frame in the recording unit has been rewritten with one of the first and second groups of divided coded image information or the coded image information to be recorded, interpolating the first or second group of reproduced image information, which has been intraframe-coded when recorded, reproduced from one of the first and second areas, to produce interpolated image information, and recovering the first or second group of reproduced image information, which has been interframe-coded when recorded, reproduced from one of the first and second areas, based on the interpolated image information and the image information, which has been intraframe-coded when recorded, in a recording unit adjacent to the recording unit, and recovering the second or first group of reproduced image information or the coded image information, which has been intraframe-coded when recorded, reproduced from the other of the first and second areas.

According to a yet still further aspect of the present invention, there is provided an apparatus for reproducing image information from a recording medium in which at least one frame of image information in recording units each composed of a plurality of frames is intraframe-coded and remaining frames of image information are interframe-coded to produce coded image information, the coded image information is divided into first and second groups in the same frame, decoding information comprising information indicative of a start of each recording unit and information indicative of whether the decoded image information is intraframe-coded or interframe-coded is added to the decoded image information, the first group of divided coded image information with the decoding information added in the recording unit is recorded in a first recording area of a recording medium, the second group of divided coded image information with the decoding information added in the recording unit is recorded in a second recording area of a recording medium, and when a start-of-record frame or end-of-record frame of coded image information to be recorded agrees with an intermediate frame in the recording unit of coded image information recorded on the recording medium in an editing recording mode in which the coded image information is recorded in superimposed relation to the areas of the recording medium in which the coded image information is recorded, only one of the first and second areas of the recording medium among recording areas which correspond to the intermediate frame is rewritten with one of the first and second groups of divided coded image information, the apparatus comprising reproducing means for reproducing recorded information recorded on the recording medium, decoding means for decoding reproduced output information from the reproducing means to produce reproduced image information, combining means for obtaining single image information from first and second groups of reproduced image information from the decoding means, detecting means for detecting, based on the decoding information, that the first or second area corresponding to the intermediate frame in the recording unit has been rewritten with one of the first and second groups of divided coded image information to be recorded, interpolating means for interpolating the first or second group of reproduced image information, which has been intraframe-coded when recorded, reproduced from one of the first and second areas, to produce interpolated image information, and recovering means for recovering the first or second group of reproduced image information, which has been interframe-coded when recorded, reproduced from one of the first and second areas, based on the interpolated image information and the image information, which has been intraframe-coded when recorded, in a recording unit adjacent to the recording unit, and recovering the second or first group of reproduced image information, which has been intraframe-coded when recorded, reproduced from the other of the first and second areas.

According to another aspect of the present invention, there is provided an apparatus for reproducing image information from a recording medium in which at least one frame of image information in recording units each composed of a plurality of frames is intraframe-coded and remaining frames of image information are interframe-coded to produce coded image information, decoding information comprising information indicative of a start of each recording unit, information indicative of whether the decoded image information is intraframe-coded or interframe-coded, and dividing information indicative of whether the coded image information has been divided or not, is added to the coded image information or first and second groups of divided coded image information divided in the same frame from the coded image information, the first group of divided coded image information with the decoding information added in the recording unit or the coded image information is recorded in a first recording area of a recording medium, the second group of divided coded image information with the decoding information added in the recording unit or the coded information is recorded in a second recording area of a recording medium, and when a start-of-record frame or end-of-record frame of coded image information to be recorded agrees with an intermediate frame in the recording unit of coded image information recorded on the recording medium in an editing recording mode in which the coded image information is recorded in superimposed relation to the areas of the recording medium in which the coded image information is recorded, only one of the first and second areas of the recording medium among recording areas which correspond to the intermediate frame is rewritten with one of the first and second groups of divided coded image information or the coded image information, the method comprising the steps of reproducing means for reproducing recorded information recorded on the recording medium, decoding means for decoding reproduced output information from the reproducing means to produce reproduced image information, combining means for obtaining single image information from first and second groups of reproduced image information from the decoding means, detecting means for detecting, based on the decoding information, that the first or second area corresponding to the intermediate frame in the recording unit has been rewritten with one of the first and second groups of divided coded image information or the coded image information to be recorded, interpolating means for interpolating the first or second group of reproduced image information, which has been intraframe-coded when recorded, reproduced from one of the first and second areas, to produce interpolated image information, and recovering means for recovering the first or second group of reproduced image information, which has been interframe-coded when recorded, reproduced from one of the first and second areas, based on the interpolated image information and the image information, which has been intraframe-coded when recorded, in a recording unit adjacent to the recording unit, and recovering the second or first group of reproduced image information or the coded image information, which has been intraframe-coded when recorded, reproduced from the other of the first and second areas.

According to still another aspect of the present invention, there is provided a method of editing image information to record input image information from a desired position on a recording medium in which at least one frame of image information in recording units each composed of a plurality of frames is intraframe-coded and remaining frames of image information are interframe-coded to produce coded image information, a first group of divided coded image information in the recording unit is recorded in a first recording area on the recording medium, and a second group of divided coded image information in the recording unit is recorded in a second recording area on the recording medium, the method comprising the steps of indicating a start-of-record point as the desired position on the recording medium, determining whether the position indicated in the step of indicating a start-of-record point is an intermediate frame in the recording unit of the coded image information recorded on the recording medium, adding decoding information to each of the first and second groups of divided coded image information of the input image information, and recording one of the first and second groups of divided coded image information in the coded image information at a start of the input image information in one of the first and second recording areas in the recording unit which correspond to start-of-record and end-of-record points on the recording medium, and recording, in a period between the start-of-record and end-of-record points, the first group of divided coded image information in the recording unit in the first recording area on the recording medium, and the second group of divided coded image information in the recording unit in the second recording area on the recording medium.

According to yet still another aspect of the present invention, there is provided a method of editing image information to record input image information from a desired position on a recording medium in which at least one frame of image information in recording units each composed of a plurality of frames is intraframe-coded and remaining frames of image information are interframe-coded to produce coded image information, a first group of divided coded image information or undivided coded image information in the recording unit is recorded in a first recording area on the recording medium, and a second group of divided coded image information or undivided coded image information in the recording unit is recorded in a second recording area on the recording medium, the method comprising the steps of indicating a start-of-record point as the desired position on the recording medium, determining whether the position indicated in the step of indicating a start-of-record point is an intermediate frame in the recording unit of the coded image information recorded on the recording medium, adding decoding information to each of the first and second groups of divided coded image information of the input image information, and recording one of the first and second groups of divided coded image information or undivided coded image information in the coded image information at a start of the input image information in one of the first and second recording areas in the recording unit which correspond to start-of-record and end-of-record points on the recording medium, and recording, in a period between the start-of-record and end-of-record points, the first group of divided coded image information in the recording unit in the first recording area on the recording medium, and the second group of divided coded image information in the recording unit in the second recording area on the recording medium.

According to a further aspect of the present invention, there is provided an apparatus for editing image information to record input image information from a desired position on a recording medium in which at least one frame of image information in recording units each composed of a plurality of frames is intraframe-coded and remaining frames of image information are interframe-coded to produce coded image information, a first group of divided coded image information in the recording unit is recorded in a first recording area on the recording medium, and a second group of divided coded image information in the recording unit is recorded in a second recording area on the recording medium, the apparatus comprising output means for outputting the input image information, recording means for recording output image information from the output means on the recording medium, indicating means for indicating a start-of-record point as the desired position on the recording medium which is set in the recording means, determining means for determining whether the position indicated by the indicating means is an intermediate frame in the recording unit of the coded image information recorded on the recording medium, adding means for adding decoding information to each of the first and second groups of divided coded image information of the input image information, and control means for controlling the recording means to record one of the first and second groups of divided coded image information in the coded image information at a start of the input image information in one of the first and second recording areas in the recording unit which correspond to start-of-record and end-of-record points on the recording medium, and recording, in a period between the start-of-record and end-of-record points, the first group of divided coded image information in the recording unit in the first recording area on the recording medium, and the second group of divided coded image information in the recording unit in the second recording area on the recording medium.

According to a still further aspect of the present invention, there is provided an apparatus for editing image information to record input image information from a desired position on a recording medium in which at least one frame of image information in recording units each composed of a plurality of frames is intraframe-coded and remaining frames of image information are interframe-coded to produce coded image information, a first group of divided coded image information or undivided coded image information in the recording unit is recorded in a first recording area on the recording medium, and a second group of divided coded image information or undivided coded image information in the recording unit is recorded in a second recording area on the recording medium, the apparatus comprising output means for outputting the input image information, recording means for recording output image information from the output means on the recording medium, indicating means for indicating a start-of-record point as the desired position on the recording medium which is set in the recording means, determining means for determining whether the position indicated by the indicating means is an intermediate frame in the recording unit of the coded image information recorded on the recording medium, adding means for adding decoding information to each of the first and second groups of divided coded image information and the undivided coded image information of the input image information, and control means for controlling the recording means to record one of the first and second groups of divided coded image information or undivided coded image information in the coded image information at a start of the input image information in one of the first and second recording areas in the recording unit which correspond to start-of-record and end-of-record points on the recording medium, and recording, in a period between the start-of-record and end-of-record points, the first group of divided coded image information in the recording unit in the first recording area on the recording medium, and the second group of divided coded image information in the recording unit in the second recording area on the recording medium.

BRIEF DESCRIPTION OF THE DRAWINGS

FIG. 12 collectively contains a series of explanatory diagrams for explaining inconvenience in the conventional editing system in which FIG. 12A is an explanatory diagram for showing an insert period designated in the playback side.

FIG. 12B is an explanatory diagram showing a frame number.

FIG. 12C is an explanatory diagram showing image data before recording.

FIG. 12E is an explanatory diagram showing a signal processing period for carrying out insert as a signal in a phantom manner.

FIG. 12F is an explanatory diagram showing an inserted image.

FIG. 12G is an explanatory diagram showing image data after recording.

FIG. 12I is an explanatory diagram showing a reproduced image.

FIG. 12J is a timing chart showing a recording track signal.

FIG. 12K is an explanatory diagram showing a pattern of a oblique track after recording.

FIG. 12L is an explanatory diagram showing a recording pattern of a time code after recording.

FIG. 13 collectively contains a series of explanatory diagrams for explaining an outline of an insert edit to which reference is made for explaining one embodiment of the present invention in which FIG. 13A is an explanatory diagram for showing an insert period designated in a playback side.

FIG. 13B is an explanatory diagram showing frame numbers.

FIG. 13C is an explanatory diagram showing image data of a subsample a before recording.

FIG. 13D is an explanatory diagram showing image data of a subsample b before recording.

FIG. 13E is an explanatory diagram showing a signal processing period for insert as a signal in a phantom manner.

FIG. 13F is an explanatory diagram showing an insert image.

FIG. 13G is an explanatory diagram showing image data of a subsample after recording.

FIG. 13H is an explanatory diagram showing image data of a subsample b before recording.

FIG. 13I is an explanatory diagram showing a reproduced image.

FIG. 13J is a timing chart showing a recording track signal.

FIG. 13K is an explanatory diagram showing a pattern of oblique tracks after recording.

FIG. 13L is an explanatory diagram showing a recording pattern of a time code after recording.

FIG. 14 collectively contains a series of explanatory diagrams for explaining a subsampling and coding processing upon recording when the insert edit shown in FIG. 13 is carried out in which

FIG. 14D is a diagram of data arrangement showing a recording data format of the subsample a.

FIG. 15 collectively contains a series of explanatory diagrams for explaining interpolation and decoding processing upon reproduction after the insert edit shown in FIG. 13 is carried out in which FIG. 15A is a conceptual diagram for explaining reproduced data of the subsample a.

FIG. 15B is a diagram of data arrangement of reproduced data of the subsample a.

FIG. 15C is a diagram of data arrangement of reproduced data of the subsample b.

FIG. 15D is a conceptual diagram for explaining image data of the reproduced subsample a and image data of the subsample b and three process patterns effected on them.

FIG. 15E is a conceptual diagram showing macroblock data rearranged in accordance with any process pattern out of the three process patterns.

FIG. 18 collectively contains a series of explanatory diagrams for explaining an example of the inner arrangement of a dividing circuit shown in FIG. 17 and its operation in which FIG. 18A is a structural diagram showing an example of construction of the dividing circuit.

FIG. 18B is a timing chart showing a dividing control signal Dcon.

FIG. 18C is a timing chart showing a read enable signal WE for reading an odd-numbered pixel data.

FIG. 18D is a timing chart showing the read enable signal WE for reading an even-numbered pixel data.

FIG. 18E is a conceptual diagram showing output pixel data series.

FIG. 20 collectively contains a series of structural diagrams showing an example of an inner arrangement of an integrating circuit shown in FIG. 19 in which FIG. 20A is a structural diagram showing an example of an arrangement of the integrating circuit.

FIG. 20B1 is a timing chart showing a lower bit of a integrating control signal Mcon.

FIG. 20B2 is a timing chart showing an upper bit of the integrating control signal Mcon.

FIG. 20C is a timing chart showing a read enable signal WE for reading an odd-numbered pixel data.

FIG. 20D is a timing chart showing the read enable signal WE for reading an even-numbered pixel data.

FIG. 20E is a conceptual diagram showing an output pixel data series.

FIG. 31 collectively contains a series of explanatory diagrams for explaining the outline of the insert edit to which reference is made for explaining a second embodiment according to the present invention in which FIG. 31A is an explanatory diagram for showing an insert period designated in the playback side.

FIG. 31B is an explanatory diagram showing frame numbers.

FIG. 31C is an explanatory diagram showing image data of a subsample a before recording.

FIG. 31D is an explanatory diagram showing image data of a subsample b before recording.

FIG. 31E is an explanatory diagram showing a signal processing period for insert as a signal in a phantom manner.

FIG. 31F is an explanatory diagram showing an insert image.

FIG. 31G is an explanatory diagram showing image data of a subsample after recording.

FIG. 31H is an explanatory diagram showing image data of a subsample b before recording.

FIG. 31I is an explanatory diagram showing a reproduced image.

FIG. 31J is a timing chart showing a recording track signal.

FIG. 31K is an explanatory diagram showing a pattern of oblique tracks after recording.

FIG. 31L is an explanatory diagram showing a recording pattern of a time code after recording.

FIG. 32 collectively contains a series of explanatory drawings for explaining the subsampling and the coding processing upon the recording when the insert edit shown in FIG. 31 is carried out and the interpolation and the decoding process upon reproduction after the insert edit has been carried out in which FIG. 32A is a conceptual diagram for explaining the process effected on the image data upon recording.

FIG. 32B is a diagram of a data arrangement showing a recording data format of the subsample a.

FIG. 32C is a diagram of a data arrangement showing a recording data format of the subsample b.

FIG. 32D is a conceptual diagram for explaining the processing effected on the image data up on reproduction.

FIG. 32E is a diagram of a data arrangement of reproduced data of the subsample a.

FIG. 32F is a diagram of a data arrangement of reproduced data of the subsample b.

FIG. 34 collectively contains a series of explanatory diagrams for explaining an example of the inner arrangement of the dividing circuit (of the second embodiment) shown in FIG. 33 and the operation thereof in which FIG. 34A is a structural diagram showing an example of arrangement of the dividing circuit.

FIG. 34B1 is a timing chart showing a lower bit of a integrating control signal Mcon.

FIG. 34B2 is a timing chart showing an upper bit of the integrating control signal Mcon.

FIG. 34C is a timing chart showing a read enable signal WE for reading an odd-numbered pixel data.

FIG. 34D is a timing chart showing the read enable signal WE for reading an even-numbered pixel data.

FIG. 34E is a conceptual diagram showing an output pixel data series.

FIG. 36 collectively contains a series of explanatory diagrams for explaining an example of the inner arrangement of the integrating circuit (of the second embodiment) shown in FIG. 35 and the operation thereof in which FIG. 36A is a structural diagram showing an example of arrangement of the dividing circuit.

FIG. 36B1 is a timing chart showing a lower bit of a integrating control signal Mcon.

FIG. 36B2 is a timing chart showing an upper bit of the integrating control signal Mcon.

FIG. 36C is a timing chart showing a read enable signal WE for reading an odd-numbered pixel data.

FIG. 36D is a timing chart showing the read enable signal WE for reading an even-numbered pixel data.

FIG. 36E is a conceptual diagram showing an output pixel data series.

DESCRIPTION OF THE PREFERRED EMBODIMENTS

Figure 1:
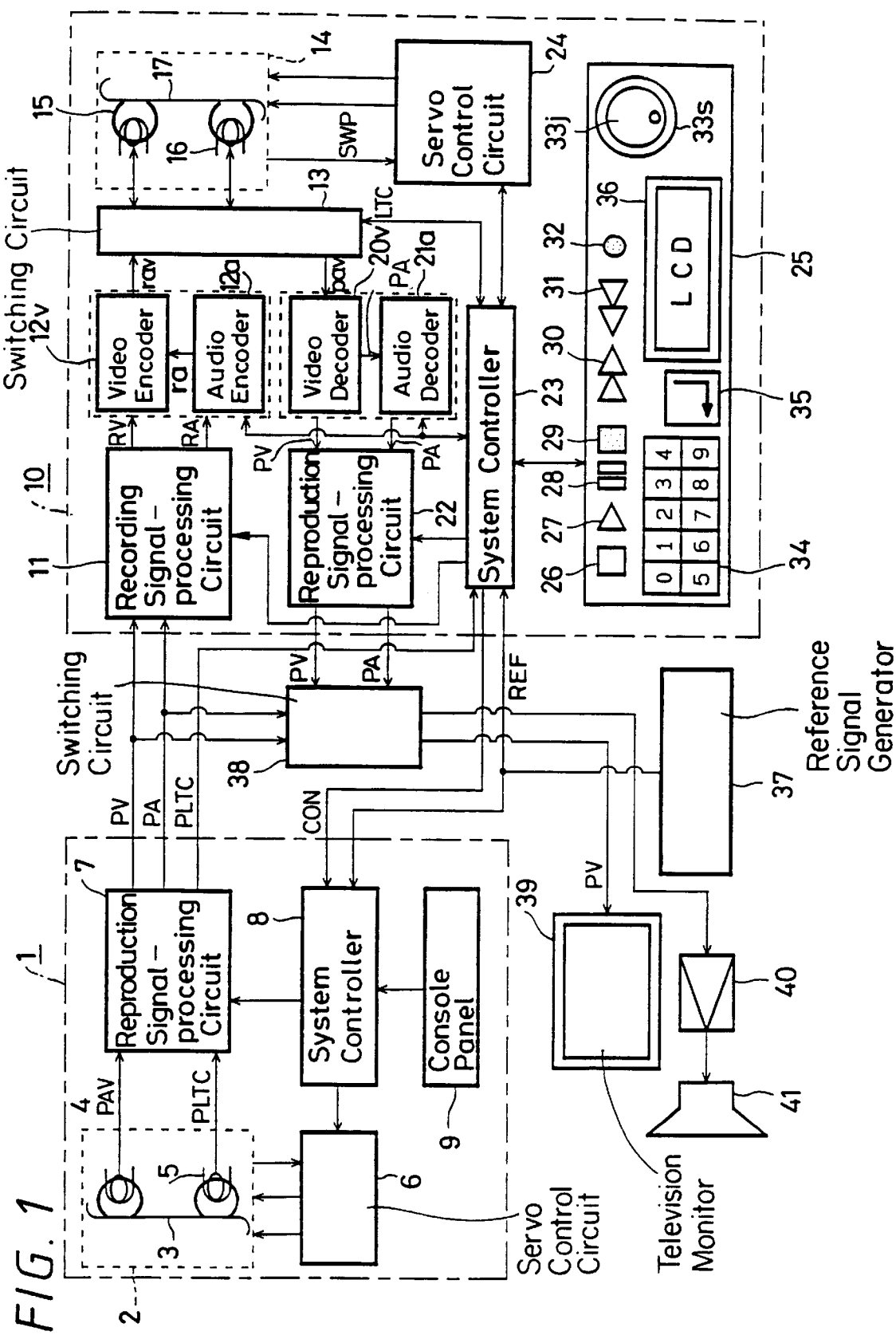
FIG. 1 is a structural diagram showing one example of a conventional editing system.

Embodiments of the present invention will hereinafter be described with reference to FIGS. 13 to 39.

Image information recording method and apparatus, image information reproducing method and apparatus and editing method and system according to the present invention will now be described below.

FIGS. 13A through 13L are diagrams used to explain an outline of insert edit according to an embodiment of the present invention. In FIGS. 13A through 13L, like elements and parts corresponding to those of FIGS. 12A to 12L are marked with the same references. Although the processing is carried out at the macroblock unit in actual practice, in order to understand the present invention more clearly, the processing is carried out at the frame or subsample unit which will be described later on.

FIGS. 13C and 13D show the states of data on the magnetic tape of the video tape cassette set on the recording-side VCR. As is clear from FIGS. 13C and 13D, in this embodiment, when one frame image data is processed by subsampling and frame image data that is encoded by a proper method, such as a DCT is divided by odd-numbered data and even-numbered data, there can be obtained image data as subsample a and subsample b. Frame image data of 0th frame shown in FIG. 13B, for example, is composed of encoded image data B0a in which image data as a B picture of subsample a is encoded and recorded and encoded image data B0b in which B picture image data which is subsample b is encoded and recorded. Frame image data of 1st frame is composed of encoded imaged data I1a in which image data as I picture of subsample a and encoded image data I1b in which image data as I picture which is subsample b is encoded and recorded.

FIG. 13K shows a track pattern on the magnetic tape of the video tape cassette set on the recording-side VCR. As shown in FIG. 13K, The B picture image data B0a as subsample a of 0th frame is recorded on the magnetic tape together with I picture image data I1a of subsample a of 1st frame so as to form one track. The B picture image data B0b of the subsample b of 0th frame is recorded on the magnetic tape together with the I picture image data I1b of the subsample b of 1st frame so as to form one track.

Next is the case of an insert image recorded on the subsample image data on the magnetic tape on which image data encoded by DCT or the like is recorded.

As shown in FIG. 13A, time code data recorded on the magnetic tape of the video tape cassette set on the reproducing side VCR is set as in-point Pin and out-point Pout of the insert period. FIG. 13E shows the insert processing carried out on the recording-side VCR in the quasi-form of signals. When the insert processing is designated as shown in FIG. 13A, the processing for insert processing is carried out during the period of high level "1" as shown by a dotted line according to the prior art. This was already described with reference to FIG. 12. However, according to this embodiment, as shown by a dotted line in FIG. 13E, the inserting processing period shown by the period of high level "1" is made longer than the period of high level "1" shown in FIG. 13A. That is, the in-point Pin and the out-point Pout on the reproducing side actually designated are displaced back and forth so that the positions of the reproducing-side in point Pin and out-point Pout fall within the border of GOP.

Accordingly, as shown in FIG. 13F, insert images become B1', I2', B3', I4', B5' and I6'. In this connection, the insert images shown in FIG. 12F are I2', B3', I4' and B5'.

The above insert images B1', I2', B3', I4', B5' and I6' are subsampled and encoded by DCT or the like when they are recorded on the magnetic tape of the recording-side VCR by the insert edit.

FIGS. 13G and 13H show the recorded states of image data after the insert images were recorded by the insert edit. As shown in FIGS. 13G and 13H, the insert image B1' serving as the B picture is divided into image data B1a' of subsample a and image data B1b' of subsample b and then only the image data B1b' of the subsample b is recorded on the magnetic tape of the recording side VCR. The insert image I2' serving as the I picture is divided into image data I2a' of subsample a and image data I2b' of subsample b and then only the image data I2b' of subsample b is recorded on the magnetic tape of the recording-side VCR. The insert image B3' serving as the B picture is divided into image data B3a' of subsample a and image data B3b' of subsample b and are then both recorded on the magnetic tape of the recording-side VCR. The insert image B5' serving as the B picture is divided into image data B5a' of subsample a and image data B5b' of subsample b and then only the image data B5b' of subsample b is recorded on the magnetic tape of the recording-side VCR. The insert image I6' serving as the I picture is divided into image data I6a' of subsample a and image data I6b' of subsample b and then only the image data I6b' of subsample b is recorded on the magnetic tape of the recording-side VCR.

A recording track signal shown in FIG. 13J is used in order to effect the above-mentioned recording. When the level of the recording track signal shown in FIG. 13J is at high level "1", the above insert images are recorded on the magnetic tape. This recording track signal is generated by a drum switching pulse SWP.

A track pattern obtained after insert image were recorded on the magnetic tape by the recording track signal shown in FIG. 13J becomes as shown in FIG. 13K. Incidentally, only the insert portion will be described below.

As shown in FIG. 13K, the image data B1b' of the subsample b of the insert image B1' serving as the B picture is recorded on the magnetic tape together with the image data I2b' of the subsample b of the insert image I2' serving as the I picture so as to form one track. The image data B3a' of the subsample a of the insert image B3' serving as the B picture is recorded on the magnetic tape together with the image data I4a' of the subsample a of the insert image I4' serving as the I picture so as to form one track.

The image data B3b' of subsample b of the insert image B3' serving as the B picture is recorded on the magnetic tape together with the image data I4b' of subsample b of the insert image I4' serving as the I picture so as to form one track.

The next track is composed of the image data B8a of subsample a of the image B8 serving as the originally recorded B picture and image data I9a of subsample a of image I9 serving as the originally recorded I picture. No insert image can be overwritten on this track because the recording track signal shown in FIG. 13J goes to low level "0" only during the period corresponding to the recording on this track.

Image data B5b' of subsample b of the insert image B5' serving as the B picture is recorded on the magnetic tape together with image data I6b' of subsample b of insert image I6' serving as the I picture so as to form one track.

FIG. 13I shows a reproduced image which results from reproducing the magnetic tape of the recording-side VCR after the insert edit. In FIG. 13I, numerals indicating the order of frames are made continuous. It is to be noted that reproduced image V4B serving as the B picture and reproduced image V9I which are the border portions of the images recorded on the magnetic tape of the recording-side VCR and the insert image newly recorded by the insert edit are encircled by dotted lines. These images are obtained by reproducing the image originally recorded on the magnetic tape of the recording-side VCR. Reproduced images V5I', V6B', V7I' and V8B' encircled by dotted lines at the central portion are all insert images.

When the reproduced image V4B is restored, there are an interpolated image B4a of subsample a originally recorded on the magnetic tape of the recording-side VCR, the reproduced image V3I obtained from the image I3a of subsample a the image I3b of subsample b and an interpolated image of the image I5a of subsample a.

The reproduced image V5I' which is the insert image is an interpolated image of the image I2b' of subsample b serving as the insert image. The reproduced image V6B' which is the insert image is composed of the image B3a' of subsample a serving as the insert image, an image obtained from the image B3b' of subsample b, the reproduced image V5I' which is the interpolated image of the image I2b' of subsample b serving as the insert image, and the reproduced image V7I' obtained from the image I4a' of subsample a and the image I4b' of subsample b serving as the insert image.

The reproduced image V7I' which is the insert image is the reproduced image obtained from the image I4a' of subsample a and the image I4b' of subsample b serving as the insert image. The reproduced image V8B' which is the insert image is composed of the interpolated image of the image B5b' of subsample b serving as the insert image, the reproduced image V7I' obtained from the image I4a' of subsample a and the image I4b' of subsample b serving as the insert image and the interpolated image of the image I6b' of subsample b serving as the insert image.

The reproduced image V9I is the interpolated image of subsample a originally recorded on the magnetic tape of the recording-side VCR.

As clear from the above description, according to this embodiment, upon recording, image data to be recorded is divided into image data of subsamples a and b. At the border portion of the insert images, image of one of subsamples a and b is previously recorded and the image data of both subsamples a and b are recorded on other insert portions. Accordingly, as described above, upon reproducing, when the image data that was originally recorded on the magnetic tape of the recording-side VCR is reproduced, if the image data is decoded, the image data that was originally recorded on the magnetic tape of the recording-side VCR is always used. When the insert image data is reproduced, it is possible to use image data that is newly recorded on the magnetic tape of the recording-side VCR by the insert edit.

Therefore, individual reproduced images are always decoded by using the same image data as the image data used when image data is encoded. Thus, the reproduced images can be prevented from being decoded erroneously.

The processing executed upon recording and reproducing will be described more fully with reference to FIGS. 14A to 14E and FIGS. 15A to 15E.

FIGS. 14A to 14E are diagrams used to explain the subsampling and encoding used upon recording of the insert edit shown in FIGS. 13A to 13L.

Figure 14A:
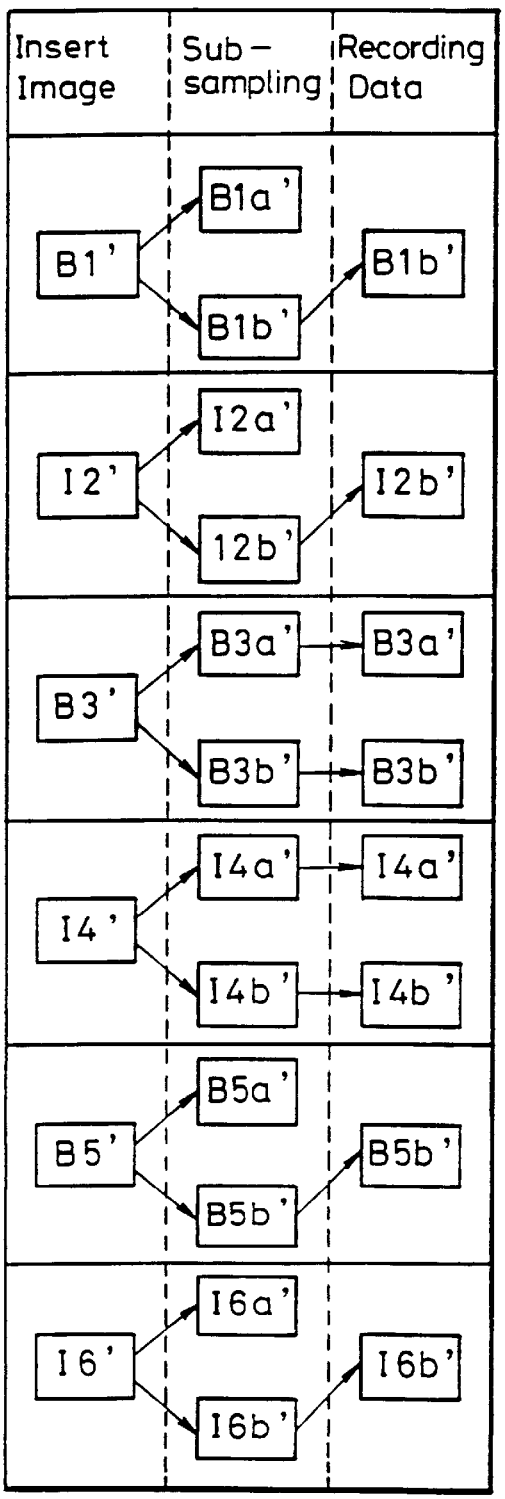
FIG. 14A is a conceptual diagram for explaining a process effected on the image data upon recording.
Figure 14B:
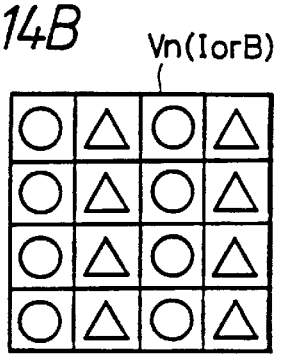
FIG. 14B is a conceptual diagram showing pixel data within a macroblock before subsampling.
Figure 14C:
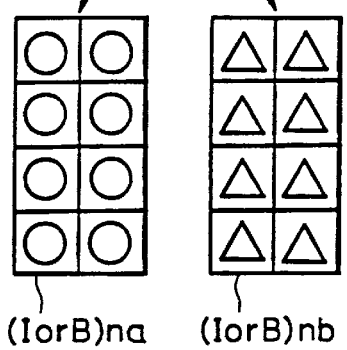
FIG. 14C is a conceptual diagram showing image data formed of an odd-numbered pixel data after subsampling and image data formed of an even-numbered pixel data after subsampling.
Figure 14D:
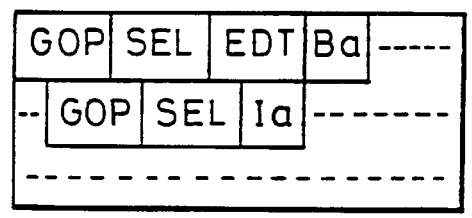
Figure 14E:
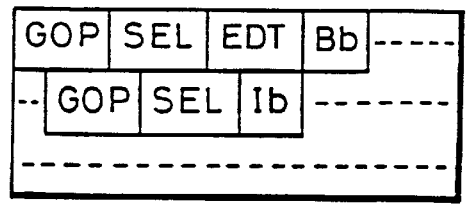
FIG. 14E is a diagram of data arrangement showing a recording data format of the subsample b.

FIG. 14A shows clearly how the insert images B1', I2', B3', I4', B5' and I6' shown in FIG. 13F are subsampled and recorded. FIGS. 14B and 14C are diagrams used to explain a concept of subsampling. FIGS. 14D and 14E are diagrams conceptually showing the states that decode information is added to each of image data of subsamples a and b obtained from the subsampling.

FIG. 14A will be described initially. The insert image B1' is divided into image data B1a' of subsample a and image data B1b' of subsample b by the subsampling. Then, only the image data B1b' of subsample b is recorded on the magnetic tape of the recording-side VCR.

The insert image I2' is divided into image data I2a' of subsample a and image data I2b' of subsample b by subsampling. Then, only the image data I2b' of subsample b is recorded on the magnetic tape of the recording-side VCR.

The insert image B3' is divided into image data I4a' of subsample a and image data I4b' of subsample b by subsampling. Then, the image data B3a' of subsample a and the image data B3b' of subsample b are both recorded on the magnetic tape of the recording-side VCR.

The insert image data I4' is divided into image data I4a' of subsample a and image data I4b' of subsample b by subsampling. Then, the image data I4a' of subsample a and the image data I4b' of subsample b are both recorded on the magnetic tape of the recording-side VCR.

The insert image data B5' is divided into image data B5a' of subsample a and image data B5b' of subsample b by subsampling. Then, only the image data B5b' of subsample b is recorded on the magnetic tape of the recording-side VCR.

The insert image I6' is divided into image data I6a' of subsample a and image data I6b' of subsample b by subsampling. Then, only the image data I6b' of subsample b is recorded on the magnetic tape of the recording-side VCR.

The above subsamples will be described with reference to FIGS. 14B and 14C. Open circles designate odd-numbered pixel data within the macroblock and open triangles designate even-numbered pixel data within the macroblock.

FIG. 14B shows by way of example the odd-numbered pixel data and the even-numbered pixel data within the macroblock of 4 lines×4 pixels. The pixel data is depicted by symbol Vn (I or B) where n means the number of macroblocks provided within one frame and "I or B" depicts the I picture or the B picture. The macroblock data Vn (I or B) shown in FIG. 14B is divided into image data (I or B) na formed of even-numbered image data and image data (I or B) nb formed of odd-numbered image data.

A data format used when the image data of subsample a and the image data of subsample b shown in FIGS. 14B and 14C are output for recording or transmission will be described with reference to FIGS. 14D and 14E. In this case, inner parity and outer parity are not shown for simplicity.

The image data (I or B) na of subsample a formed of odd-numbered image data shown in FIG. 14C has the data format shown in FIG. 14D upon recording or transmission. As shown in FIG. 14D, one data arrangement is formed of n tracks (n is an integer) upon recording. As earlier noted with reference to FIG. 13K, one data arrangement is composed of image data Ba and Ia of B picture and I picture of subsample a and decode information added to these image data Ba and Ia. As shown in FIG. 14D, GOP header data GOP, inter/intra selection signal SEL and edit state flag data EDT are added to the image data Ba of a number of B pictures as subsamples a. GOP header data GOP and inter/intra selection signal SEL are added to image data Ia of a number of I pictures as subsamples a.

When the value of the GOP header data GOP is "1", the GOP header data GOP represents the starting portion of the GOP and also the starting portion of the picture. When the value is "0", the GOP header data GOP represents that the portion is not the starting portion of the GOP, i.e., represents that the portion is the starting portion of the picture. The inter/intra selection signal SEL represents, when its value is "1", that the added image data is the intraframe coded image data. When its value is "0", the inter/intra selection signal SEL represents that the added image data is the interframe coded image data. This inter/intra selection signal SEL is used to switch the signal line when image data is restored. The edit state flag data EDT represents, when its value is "1", that image data is image data recorded by the insert edit. When its value is "0", the edit state flag data EDT represents that the image data is the originally recorded image data. Upon insert edit, this edit state flag data is recorded on the magnetic tape together with the insert image, thereby making it possible to select image data used in decoding upon reproduction.

The image data (I or B) nb of subsample b formed of the even-numbered pixel data shown in FIG. 14C has a data arrangement shown in FIG. 14E upon recording or transmission. As shown in FIG. 14D, upon recording, one data arrangement is composed of 1 or n tracks at the unit. As earlier noted with reference to FIG. 13K, one data arrangement is composed of image data Bb and Ib of B picture and I picture of subsample b and decode information added to each of the image data Bb and Ib. As shown in FIG. 14E, GOP header data GOP, an inter/intra selection signal SEL and edit state flag data EDT are added to the image data Bb of a number of B pictures as subsample b. GOP header data GOP and an inter/intra selection signal SEL are added to the image data Ib of a number of I pictures as subsample b. Each decode information is similar to that used by the image data (I or B) na as subsample a and therefore need not be described herein.

FIGS. 15A through 15E are diagrams used to explain interpolation and decoding used upon reproduction after insert edit shown in FIGS. 13A to 13L.

FIG. 13A shows clearly how the reproduced images V4B, V5I', V6B', V7I', V8B' and V9I of the reproduced images shown in FIG. 13I are reproduced. FIGS. 15C and 15B conceptually show reproduced data series. FIGS. 15D and 15E are diagrams used to explain how to obtain original image data from the image data serving as subsamples a and b.

FIG. 15A will be described initially. In FIG. 15A, "reproduced image" means image reproduced from the magnetic tape of the recording-side VCR and which is used to decode other image or its own image. A "decoding" means image to be restored. A "output image" means image output as a reproduced image in actual practice. The output images V4B, V5I', V6B', V7I', V8B', V9I and V10B shown in FIG. 15A are the same as those shown in FIG. 13I.

A decoding of the output image V4B will be described below.

As shown in FIG. 15A, a reproduced image V3I is obtained from a reproduced image I3a of subsample a and a reproduced image I3b of subsample b. On the other hand, an image I5a of subsample a is obtained and an image I5b of subsample b shown hatched is obtained by interpolation. An interpolated image is obtained by the reproduced image I5a and the image I5b. A reproduced image B4a of subsample a is decoded by using the reproduced image V3I and an interpolated image of the reproduced image I5a and the image I5b. Then, an image B4b of subsample b is obtained by using the decoded reproduced image B4a by interpolation. An interpolated image of the reproduced image B4a and the image B4b becomes the output V4B.

A decoding of the output image V5I' will be described below.

As shown in FIG. 15A, an image I2a' of subsample a shown hatched is obtained by using a reproduced image I2b' of subsample b and a reproduced image I2b by interpolation. An interpolated image is obtained by the reproduced image I2b; and the image I2a'. Then, the interpolated image is decoded to provide an image V2I' and this image V2I' becomes the output image V5I'.

A decoding of the output image V6B' will be described below.

As shown in FIG. 15A, an image I2a' of subsample a shown hatched is obtained by using a reproduced image I2b' of subsample b and a reproduced image I2b by interpolation. An interpolated image is obtained from the reproduced image I2b' and the image I2a'. On the other hand, a reproduced image I4' is obtained from a reproduced image I4a' of subsample a and a reproduced image I4b' of subsample b. Further, a reproduced image B3' is obtained from a reproduced image B3a' of subsample a and a reproduced image B3b' of subsample b. Then, the above reproduced image B3' is decoded by using the interpolated image of the reproduced image I2b' and the image I2a' and the reproduced image I4'. The thus decoded reproduced image B3' becomes the output image V6B'.

A decoding of the output image V7I' will be described.

As shown in FIG. 15A, an image V4I' that is obtained from a reproduced image I4a' of subsample a and a reproduced image I4b' of subsample b becomes the output image V7I'.

A decoding of the output image V8B' will be described.

As shown in FIG. 15A, a reproduced image I4' is obtained from a reproduced image I4a' of subsample a and a reproduced image I4b of subsample b. On the other hand, an image I6b' of subsample b is obtained by using a reproduced image I6b' of subsample b and the reproduced image I6b' by interpolation. An interpolated image is obtained from the reproduced image I6b' and the image I6a'. A reproduced image B5b' of subsample b is decoded by using the reproduced image I4' and the interpolated image of the reproduced image I6b' and the image I6a' Then, an image B5a' of subsample a is obtained by using the thus decoded reproduced image B5b' by interpolation. An interpolated image obtained from the reproduced image B5b' and the image B5a' becomes the output image V8B'.

A decoding of the output image V9I will be described

As shown in FIG. 15A, a reproduced image I9a of subsample a is obtained and an image I9b of subsample b shown hatched is obtained by using the reproduced image I9a by interpolation. An interpolated image is obtained from the reproduced image I9a and the image I9b. This interpolated image is decoded to provide an image V9I and this image V9I becomes the output image V9I.

A decoding of the output image V10B will be described.

As shown in FIG. 15A, a reproduced image 19a of subsample a is obtained and an image I9b of subsample b shown hatched is obtained by using the reproduced image I9a by interpolation. An interpolated image is obtained from the reproduced image I9a and the image I9b. On the other hand, a reproduced image I11 is obtained from a reproduced image I11a of subsample a and a reproduced image I11b of subsample b. Further, a reproduced image B10 is obtained from a reproduced image B10a of subsample a and a reproduced image B10b of subsample b. Then, the reproduced image B10 is decoded by using the interpolated image of the reproduced image I9a and the image I9b and the reproduced image I11. The thus decoded reproduced image B10 becomes the output image V10B.

FIG. 15B shows a data series of subsample a used upon reproduction. As shown in FIG. 15B, the data arrangement of the subsample a used upon reproduction is composed of the GOP header data GOP, the inter/intra selection signal SEL, the edit state flag data EDT, image data Ba of subsample a, the GOP header data GOP, the inter/intra selection signal SEL and image data Ia of subsample a in that order.

FIG. 15C shows a data series of subsample b used upon reproduction. As shown in FIG. 15C, the data arrangement of the subsample b used upon reproduction is composed of the GOP header data GOP, the inter/intra selection signal SEL, the edit state flag data EDT, image data Bb of subsample b, the GOP header data GOP, the inter/intra selection signal SEL and image data Ib of subsample b.

FIGS. 15D and 15E show how and under which condition the image data (I or B) na formed of odd-numbered pixel data and the image data (I or B) nb formed of even-numbered pixel data separated by subsampling are returned to macroblock data composed of even-numbered pixel data and odd-numbered pixel data. There are three patterns shown by arrows P1, P2 and P3.

The pattern shown by the arrow P1 corresponds to the case that, as shown in FIG. 15A, original reproduced image I4' is obtained from the reproduced image I4a' of subsample a and the reproduced image I4b' of subsample b. Specifically, the pattern shown by the arrow P1 indicates the case that the image data (I or B) na and the image data (I or B) nb of subsamples a and b are both recorded on the magnetic tape. Therefore, in the case of the pattern shown by the arrow P1, the original macroblock data Vn (I or B) is obtained from the image data (I or B) na of subsample a and the image data (I or B) nb of subsample b.

The pattern shown by the arrow P2 corresponds to the case that, as shown in FIG. 15A, image I5b of subsample b is generated from the reproduced image I5a of subsample a by interpolation. Therefore, in the case of the pattern shown by the arrow P2, the image data (I or B) nb of subsample b is generated from the image data (I or B) na of subsample a and the macroblock data Vn (I or B) is obtained from the image data (I or B) na of subsample a and the image data (I or B) nb of subsample b.

The pattern shown by the arrow P3 corresponds to the case that, as shown in FIG. 15A, image I2a' of subsample a is generated from the reproduced image I2b' of subsample b. Therefore, in the case of the pattern shown by the arrow P3, the image data (I or B) na of subsample a is generated from the image data (I or B) nb of subsample b and the macroblock data Vn (I or B) is obtained from the image data (I or B) nb of subsample b and the image data (I or B) na of subsample a as interpolated image data.

As described above, when the subsampled and coded insert edition image data are recorded on the magnetic tape where subsampled and coded image data have been previously recorded, if the once designated insertion start and end points are not positioned on the boundary between GOPs, then the reproduction-side in-point and out-point are changed to the boundary positions between GOPs and the insert edition is carried out. Moreover, when the image data are recorded, in accordance with the recording track signal RT, one of the insert subsample images is recorded on one track of the two tracks corresponding to the GOPs of the insert start and end points and the recording data include not only the GOP header data indicating the head of the GOP and the inter/intra selection signal SEL but also data indicating whether or not data are inserted image. Therefore, when the image data are reproduced, it is possible to restore the image data originally recorded on the magnetic tape of the recording-side VCR by using only another image data originally recorded on the magnetic tape of the recording-side VCR. When the inserted image data are restored, it is possible to use another inserted image data. Accordingly, it is possible to exclude the above-mentioned problems, i.e., deterioration of the picture quality caused by in inadequate restoration of the reproduced image. Moreover, it is possible to provide the satisfactory reproduced image constantly. Hereinafter, the first embodiment will be described specifically.

An arrangement and an operation of the edit system according to an embodiment of the present invention will now be described with reference to FIG. 16.

Figure 16:
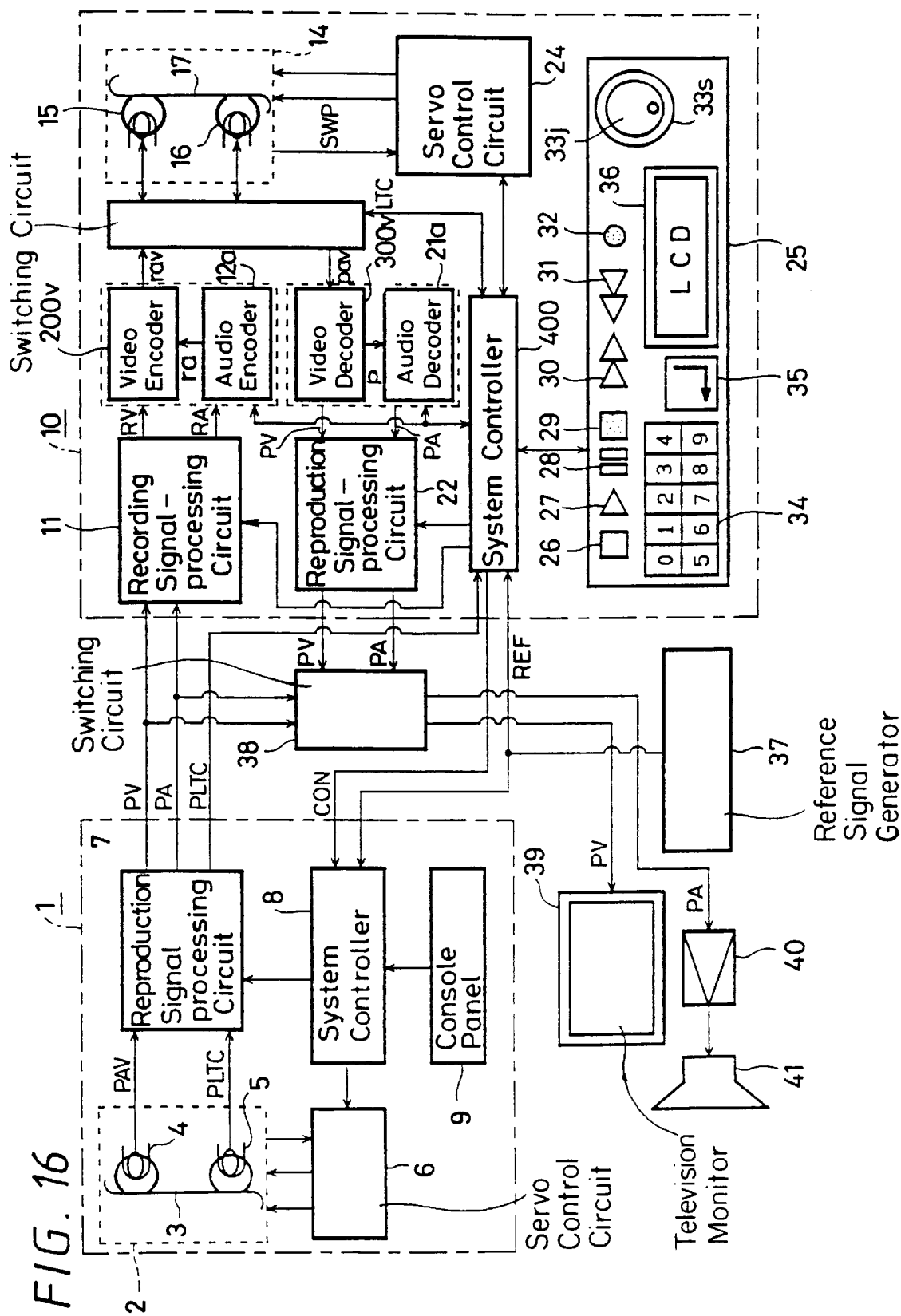
FIG. 16 is a structural diagram showing one example of the edit system of one embodiment of the present invention.

FIG. 16 is a block diagram showing an edit system according to the embodiment of the present invention. In FIG. 16, like parts corresponding to those of FIG. 1 are marked with the same references and therefore need not be described in detail.

FIG. 16 differs from FIG. 1 in a video encoder 200v, a video decoder 300v and a system controller 400.

A difference between operations of the video encoder 200v, the video decoder 300v and the system controller 400 and operations of the corresponding portions shown in FIG. 1 will be described below.

The video encoder 200v divides image data to be encoded into image data formed of odd-numbered pixel data and image data formed of even-numbered pixel data by subsampling. Then, the video encoder 200v encodes these data by DCT or the like and adds the above-mentioned decode information.

The video decoder 300v synthesizes image data by using the three patterns shown in FIGS. 15D and 15E and decodes original image data by using the synthesized image data.

The system controller 400 controls the above processing in the video encoder 200v and the above processing in the video decoder 300v.

Figure 17:
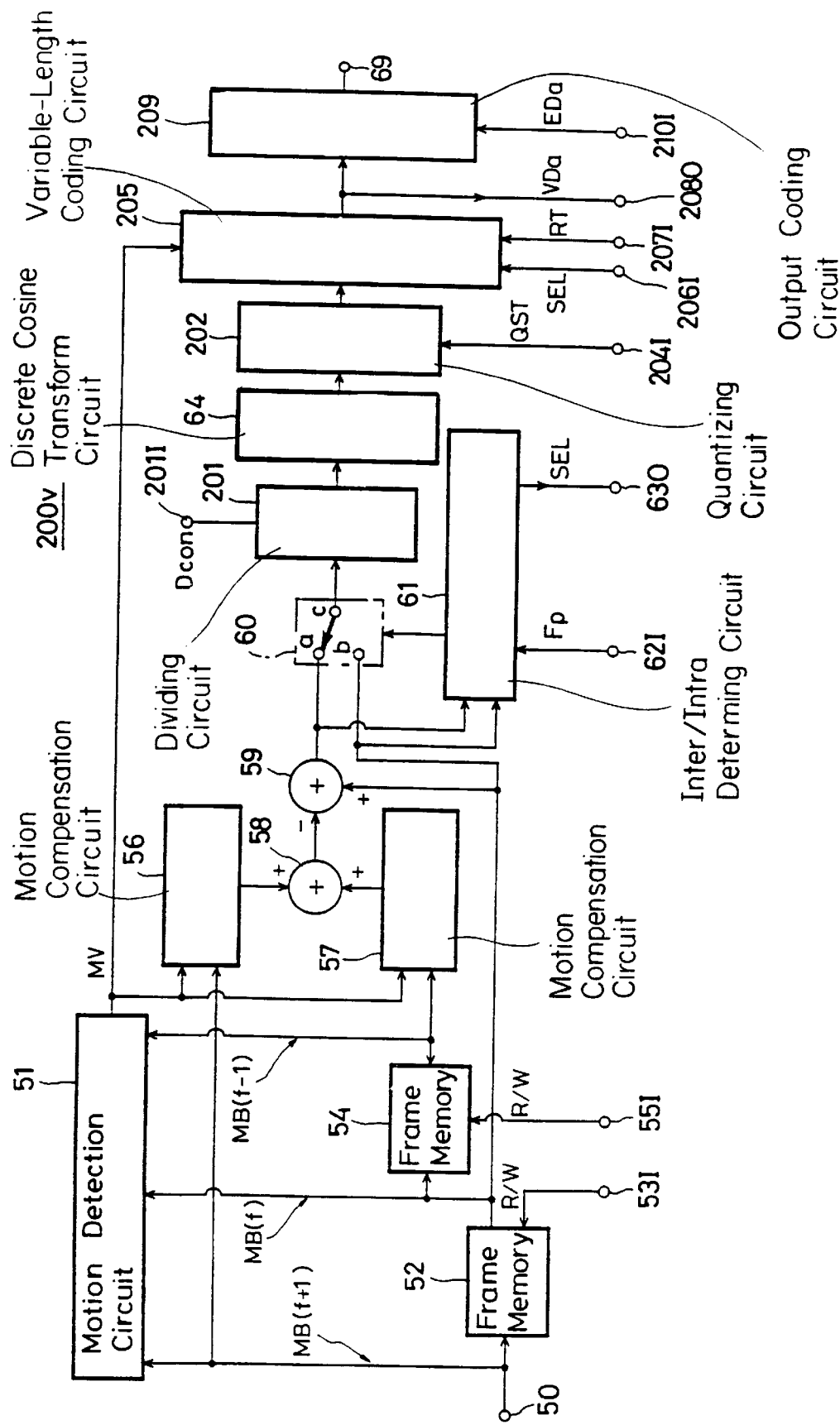
FIG. 17 is a structural diagram showing an example of an inner construction of the image encoder shown in FIG. 16.

FIG. 17 is a block diagram showing an inside arrangement of the video encoder 200v shown in FIG. 16. In FIG. 17, like parts corresponding to those of FIG. 2 are marked with the same references and therefore need not be described in detail.

Figure 2:
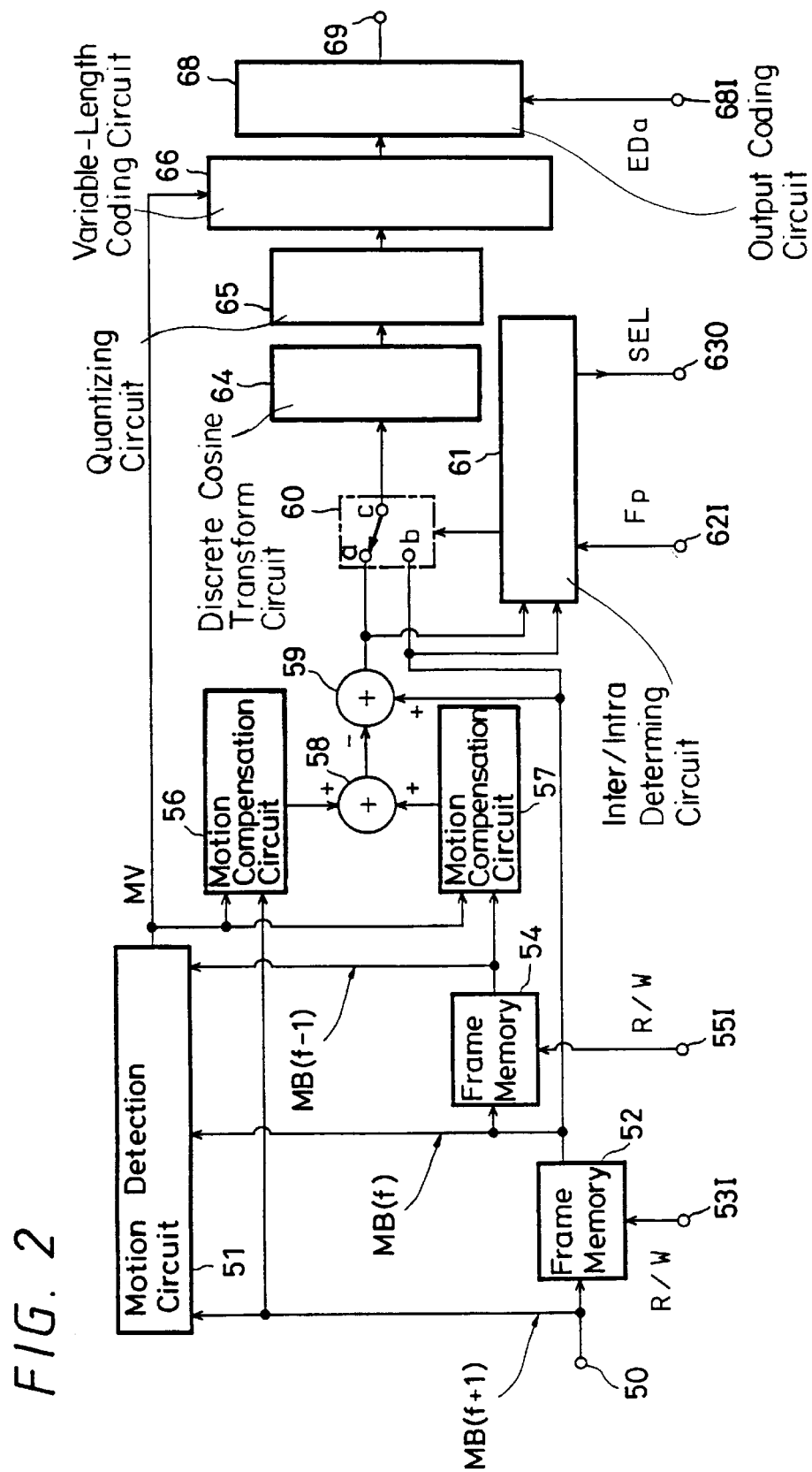
FIG. 2 is a structural diagram showing an internal arrangement of an image encoder shown in FIG. 1.

FIG. 17 differs from FIG. 2 in a dividing circuit 201, a quantizing circuit 202, a variable length coding circuit 205 and an output coding circuit 209. The dividing circuit 201 carries out the above subsampling on the basis of a divide control signal Dcon supplied thereto from the system controller 400 shown in FIG. 16 through an input terminal 201I.

The quantizing circuit 202 quantizes coefficient data supplied from the DCT circuit 64 on the basis of quantization step data QST supplied thereto from the system controller 400 shown in FIG. 16 through an input terminal 204I.

The variable length coding circuit 205 processes image data of subsample a or b of one GOP including motion vector data MV on the basis of a recording track signal RT and an inter/intra selection signal SEL supplied thereto from the system controller 400 shown in FIG. 16 through input terminals 207I and 206I. Then, the variable length coding circuit 205 outputs these data in the following track format. Specifically, when one GOP is composed of one B picture and one I picture, first output track data is image data of subsample a of the B picture and image data of subsample a of the I picture. The next output track data is image data of subsample b of the B picture and image data of subsample b of the I picture. The above recording track signal RT is used to obtain a timing at which image data is output as track data and to control the tape transport unit 14. The inter/intra selection signal SEL is used to discriminate the image data of subsample a or b of the B picture and image data of subsample a or b of the I picture contained in one track from each other.

The variable length coding circuit 205 supplies variable length coded data VDa obtained by variable length coding through an output terminal 2080 to the system controller 400 shown in FIG. 16 so that the system controller 400 can generate the quantization step data QST supplied to the quantizing circuit 202 on the basis of the variable length coded data VDa.

The output coding circuit 209 adds decode information EDa supplied thereto from the system controller 400 shown in FIG. 16 through an input terminal 210I to the image data from the variable length coding circuit 205. Then, the output coding circuit 209 adds inner parity, outer parity and a synchronizing code or the like to the resulting image data and outputs the same.

The DCT circuit 64 processes image data at the block unit which is half of that of the DCT circuit shown in FIG. 2 because pixel data provided within one macroblock is divided by half by subsampling.

An operation of the video encoder 200v will be described below. The dividing circuit 201 subsamples difference data supplied through the switch 60 from the adding circuit 59 as the B picture on the basis of the divide control signal Dcon supplied thereto from the system controller 400 shown in FIG. 16 through the input terminal 201I.

The image data of subsamples a and b obtained as the B picture by subsampling is converted into coefficient data from a DC component to a high-order AC component by the DCT circuit 64 and then supplied to the quantizing circuit 202. The image data of subsamples a and b of the B picture supplied to the quantizing circuit 202 is quantized on the basis of the quantization step data QST supplied thereto from the system controller 400 shown in FIG. 16 through the input terminal 204I. The quantized image data of the subsamples a and b as the B picture are supplied to the variable length coding circuit 205. The image data of subsample a as the B picture supplied to the variable length coding circuit 205 is supplied to the output coding circuit 209 together with the image data of subsample a as the I picture supplied next as recorded data of one track by the recording track signal RT and the inter/intra selection signal SEL supplied thereto from the system controller 400 shown in FIG. 16 through the input terminals 207I and 206I.

The image data of subsample b as the B picture supplied to the variable length coding circuit 205 is supplied to the output coding circuit 209 together with image data of subsample b as the I picture supplied next as recorded data of one track by the recording track signal RT and the inter/intra selection signal SEL supplied thereto from the system controller 400 shown in FIG. 16 through the input terminals 207I and 206I.

The image data of subsample a of the B and I pictures and the image data of subsample b as the B and I pictures supplied to the output coding circuit 209 are added with the decode information EDa supplied from the system controller 400 shown in FIG. 16 through the input terminal 210c, further added with inner parity, outer parity and a synchronizing code or the like and then output the image data of subsample a as the B and I pictures and the image data of subsample b as the B and I pictures in that order. Then, the recorded data output from the output coding circuit 209 is sequentially supplied through the switching circuit 13 shown in FIG. 16 to the recording and reproducing head 15, thereby being recorded on the magnetic tape 14 so as to form slant tracks.

FIGS. 18A to 18E are diagrams used to explain the inside arrangement and an operation of the dividing circuit shown in FIG. 16.

The dividing circuit 201 shown in FIG. 18A is composed of memories 201b and 201e which store image data Da supplied thereto from the switch 60 shown in FIG. 16 through an input terminal 201a on the basis of a write enable signal WE and an address signal AD of a memory controller 201f, and the memory controller 201f which supplies the write enable signal WE, the read enable signal RE and the address signal AD to the memories 201b and 201e on the basis of the divide control signal Dcon supplied thereto from the system controller 400 shown in FIG. 16 through an input terminal 201d.

An operation of the dividing circuit 201 will be described below with reference to FIGS. 18B, 18C, 18D and 18E.

FIG. 18B shows the divide control signal Dcon, FIGS. 18C and 18D show the read enable signals RE respectively supplied from the memory controller 201f to the memory 201b and 201e, and FIG. 18E shows image data Da respectively read out from the memories 201b and 201e and which is output through the output terminal 201c. Open circles in FIG. 18E show pixel data of subsample a and open triangles in FIG. 18E show pixel data of subsample b.

The image data Da supplied from the memory controller 201f through the input terminal 201a by the write enable signal WE and the address signal AD is initially memorized in the memory 201b. After the image data Da was stored in the memory 201b, the next image data Da supplied through the input terminal 201a is memorized in the memory 201e in response to the write enable signal WE and the address signal AD from the memory controller 201f.

When the image data Da is memorized in the memory 201e, the divide control signal Dcon shown in FIG. 18B goes to high "1" level. The memory controller 201f supplies the read enable signal RE and the address signal AD to the memory 201b during the divide control signal Dcon being at high "1" level. The read enable signal RE is held at high "1" level when it is active. The address signal AD increments its value at every half period of the read enable signal. Accordingly, as shown in FIG. 18E, of image data stored in the memory 201b, only the pixel data of subsample a of the odd-numbered data is output.

After the odd-numbered pixel data of the image data Da stored in the memory 201b was ended, the divide control signal Dcon shown in FIG. 18B goes to low "0" level. The memory controller 201f supplies the read enable signal and the address signal shown in FIG. 18D to the memory 201b during the divide control signal Dcon is held at low "0" level. This read address signal RE is held at high "1" level when active. The address signal AD increments its value at every half period of the read enable signal RE. Accordingly, as shown in FIG. 18E, of the image data stored in the memory 201b, only the pixel data of subsample b of the even-numbered image data is output.

When the reading of the image data Da stored in the memory 201b is finished and the storing of the image data Da in the memory 201e is finished, the memory controller 201f starts reading the image data Da stored in the memory 201e. The similar processing is carried out in the memory 201e. The storage capacity of the memories 201b and 201e might be one macroblock or one frame.

Figure 19:
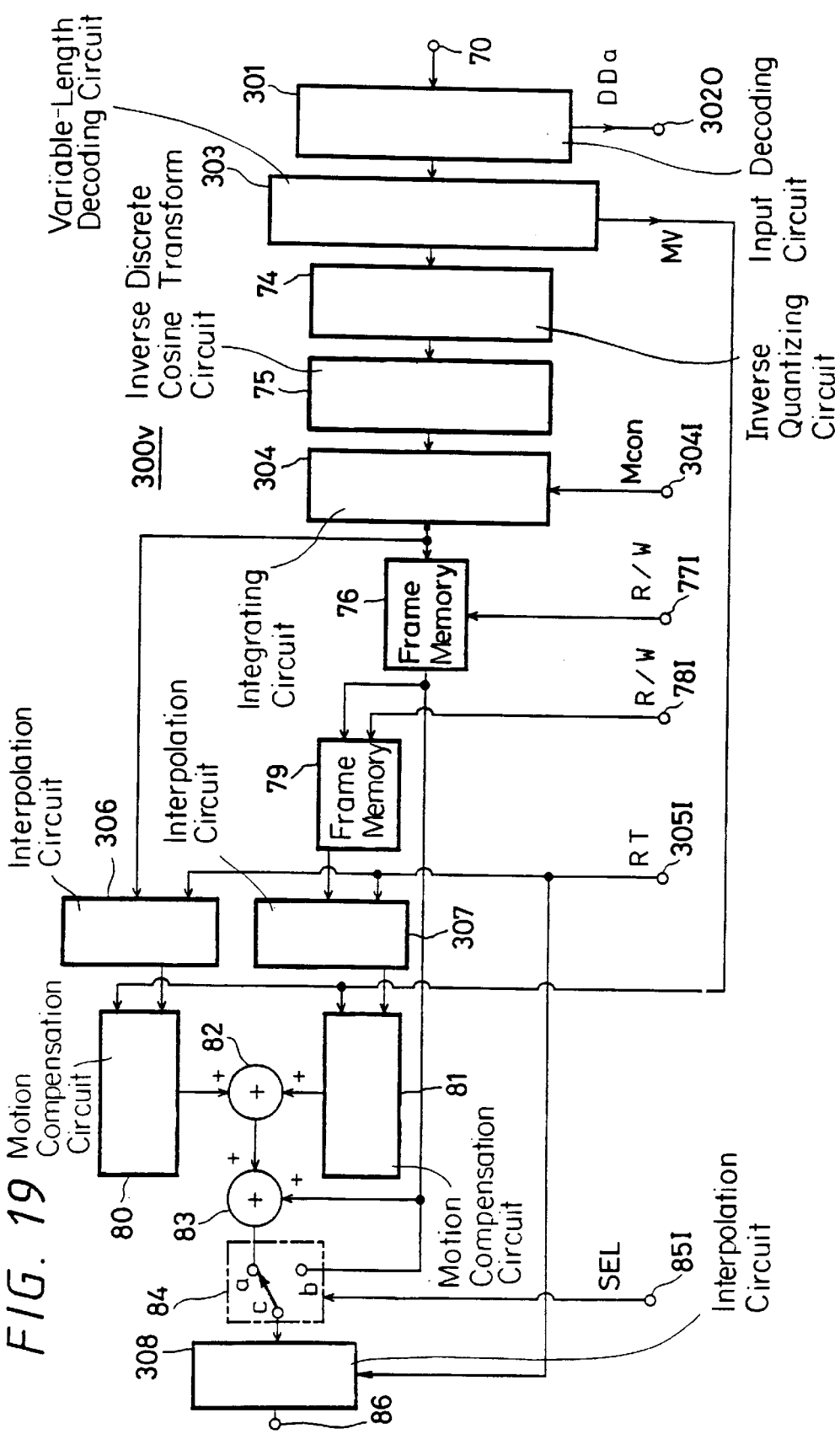
FIG. 19 is a structural diagram showing an example of an inner arrangement of the image decoder shown in FIG. 16.

FIG. 19 is a block diagram showing an inside arrangement of the video decoder 300v shown in FIG. 16. In FIG. 19, like parts corresponding to those of FIG. 3 are marked with the same references and therefore need not be described in detail.

Figure 3:
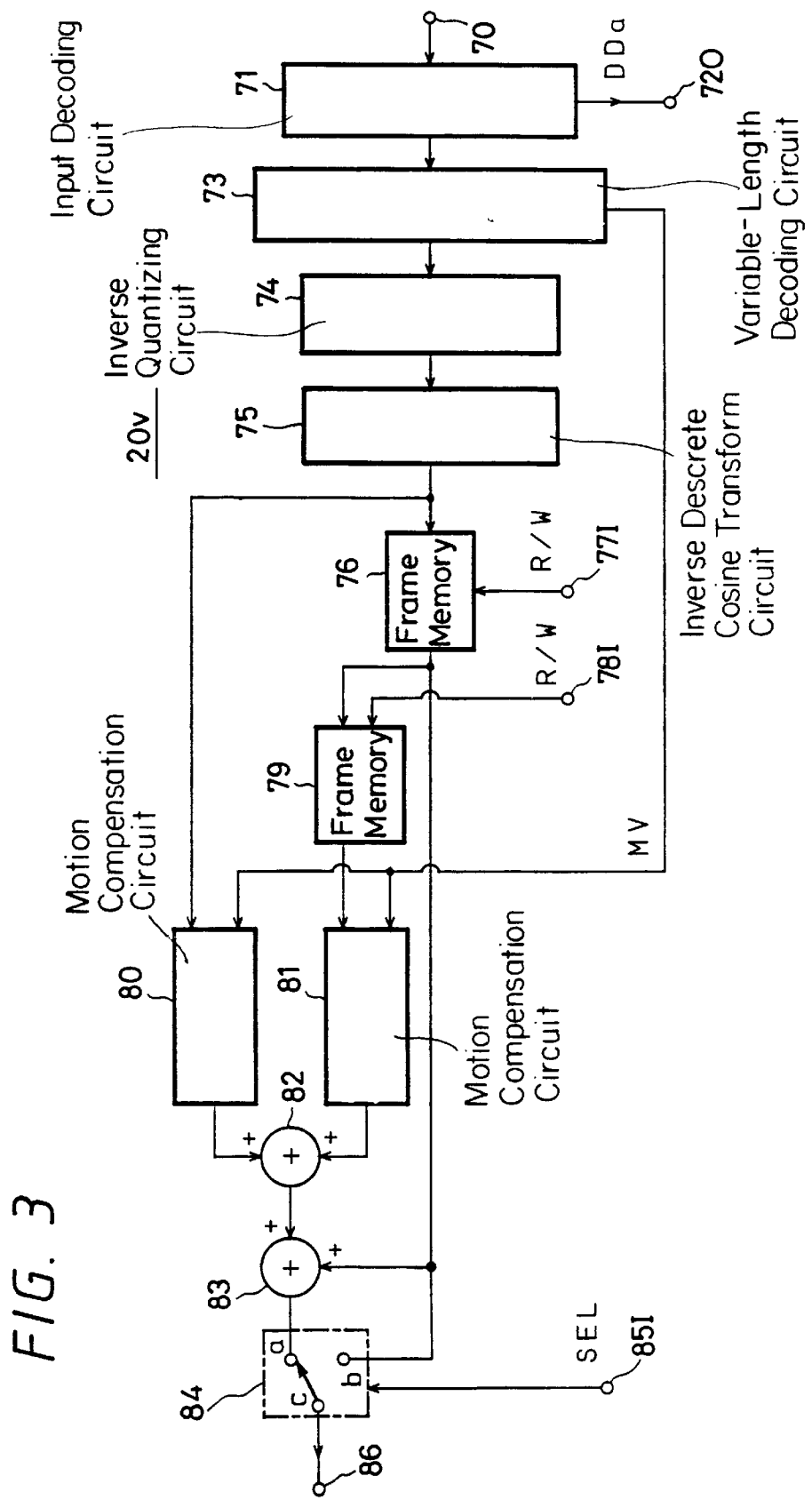
FIG. 3 is a structural diagram showing an internal arrangement of the image decoder shown in FIG. 1.

FIG. 19 differs from FIGS. 3 in an input decoding circuit 301, a variable length decoding circuit 303, a integrating circuit 304 and interpolation circuits 306, 307 and 308.

The input decoding circuit 301 channel-decodes reproduced data supplied thereto from the tape transport portion 14 shown in FIG. 16 through the switching circuit 13 and the input terminal 70 and error-corrects the reproduced data by using the inner parity and the outer parity. Then, the input decoding circuit 301 supplies image data to the variable length decoding circuit 303, decode information DDa to the audio decoder 21a shown in FIG. 16 and supplies the decode information DDa through an output terminal 3020 to the system controller 400 shown in FIG. 16.

The variable length decoding circuit 303 decodes image data including the motion vector data supplied thereto from the input decoding circuit 301 and supplies quantized coefficient data obtained by decoding to the inverse quantizing circuit 74. Then, the variable length decoding circuit 303 supplied the motion vector data MV, obtained by decoding, to motion compensation circuits 80 and 81.

The integrating circuit 304 synthesizes image data of subsamples a and b supplied thereto from the IDCT circuit 75 on the basis of a synthesize control signal Mcon supplied thereto from the system controller 400, shown in FIG. 16, through an input terminal 304I.

The interpolation circuit 306 interpolates the synthesized image data supplied thereto from the integrating circuit 304 on the basis of the recording track signal RT supplied thereto from the system controller 400 shown in FIG. 16 through an input terminal 305I. The interpolating circuit 307 interpolates the image data supplied thereto from the frame memory 79 on the basis of the recording track signal RT supplied thereto from the system controller 400 shown in FIG. 16 through the input terminal 305I. The interpolation circuit 308 interpolates the image data supplied thereto from the adding circuit 83 or the frame memory 76 through the switch 84 on the basis of the recording track signal RT supplied thereto from the system controller 400 shown in FIG. 16 through the input terminal 305I.

Roles of the interpolation circuits 306, 307 and 308 will be described below. Assuming now that image data stored in the frame memory 76 when the synthesized image data from the integrating circuit 304 is stored in the frame memory 76 is image data of present frame, then image data stored in the frame memory 79 becomes image data of preceding frame and image data output from the integrating circuit 304 becomes image data of succeeding frame.

Therefore, if image data of succeeding frame output from the integrating circuit 304 is formed of only subsample a or b, or image data is image data that cannot be synthesized by the integrating circuit 304 because only one of the subsamples a and b is recorded on the recording medium, then the interpolation circuit 306 generates image data of dropped subsample a or b by interpolation based on the image data. Then, the interpolation circuit 306 generates the image data of succeeding frame by the image data and the image data of subsample a or b generated by interpolation.

Further, if the image data of the preceding frame supplied from the frame memory 79 contains only the subsample a or b, that is, the recording medium has recorded thereon only either one of the subsample a or b, if the image data was not successfully integrated by the integrating circuit 30, the above-mentioned interpolation circuit 307 generates image data of the subsample a or subsample b which the image data lacks in, by means of the interpolation processing on the basis of the image data. Then, the interpolation circuit 307 creates the image data of the preceding frame with that image data and the image data of the subsample or the subsample b resulting from the above interpolation processing.

Further, if the image data of the current-frame restored from the adding circuit 83 contains only the subsample a or b, that is, the recording medium has recorded thereon only either one of the subsample a or b, if the image data was not successfully integrated by the integrating circuit 304, the above-mentioned interpolation circuit 308 generates image data of the subsample a or subsample b which the image data lacks in by means of the interpolation processing on the basis of the image data. Then, the interpolation circuit 308 creates the image data of the preceding frame with that image data and the image data of the subsample or the subsample b resulting from the interpolation processing.

The interpolation processing of the above interpolating circuits 306, 307 and 308 can be executed by calculating a mean value of the data of the upper and lower pixels of the existing subsample a or b, a mean value of the data of the upper, lower, right and left pixels and a mean value of data of surrounding pixels. Further, that there is only one of the subsample a or the subsample b can be detected by determining whether there is input data or not, through the control signal from the system controller 400 or the integrating circuit 304, or alternatively, through the integrating control signal Mcon from the system controller 400.

Now, the operation of the image decoder shown in FIG. 19 will be described. The data reproduced by the transport unit 14 shown in FIG. 16 is fed through the switching circuit 13 and the input terminal 70 to the input decoding circuit 301 shown in FIG. 19. The reproduced data is decoded by the input decoding circuit 301 in accordance with the channel decoding processing. Successively, the reproduced data is subjected to an error correction processing on the basis of inner parity and outer parity. Then, the image data is fed to the variable length decoding circuit 303, the audio data is fed to the audio decoder which is shown in FIG. 16, and the decoded information DDa is fed through the output terminal 3020 to the system controller 400 shown in FIG. 16.

The image data containing the motion vector data supplied to the variable length decoder circuit 303 is decoded. The image data formed of coefficient series data having been subjected to the quantization is fed to the inverse quantization circuit 74 and the motion vector data MV are supplied to the motion compensation circuits 80 and 81, respectively. The decoded image data are fed to the inverse quantization circuit 74 and the IDCT circuit 75, sequentially, in which they are decoded, then supplied to the integrating circuit 304. If the image data supplied to the integrating circuit 304 is an image data that contains both the data of the subsample a and the data of the subsample b, they are mixed together through the reading and output while if the image data contains only one of the subsample a or the subsample b, it is directly output, under the control of the integrating circuit 304 on the basis of the integrating circuit Mcon fed from the system controller 400 shown in FIG. 16 through the input terminal 304I. The image data from the integrating circuit 304 is fed to the frame memory 76 and the interpolation circuit 306.

When the image data is stored in the frame memories 76 and 79, if the image data stored in the frame memory 76 is supposed to be the image data of the current-frame, the image data stored in the frame memory 79 is assumed to be image data of preceding frame while the image data output from the integrating circuit 304 is assumed to be a following frame.

Now, a process for restoring the image data of the current-frame as a B-picture will be described. In this case, the switch 84 connects its movable contact c to the fixed contact a in the "inter" side on the basis of the inter/intra control signal SEL fed from the system controller 400 through the input terminal 85I thereto. If the image data of the following frame output from the integrating circuit 304 contains only either one of the subsample a or the subsample b, the interpolation circuit 306 creates the subsample a or the subsample b which the image data lacks in, on the basis of the image data by means of the interpolation processing, thus producing an interpolated image data formed of that image data and the image data generated by the interpolation processing. The interpolated image data is fed to the motion compensation circuit 80.

On the other hand, the image data of the preceding frame read from the frame memory 79 is fed to the interpolation circuit 307. If the image data read from the frame memory 79 contains only either one of the subsample a or the subsample b, the interpolation circuit 307 creates the subsample a or the subsample b which the image data lacks in, on the basis of the image data by means of the interpolation processing, thus producing an interpolated image data formed of that image data and the image data generated by the interpolation processing. The interpolated image data is fed to the motion compensation circuit 81.

The motion compensating circuit 80 extracts macroblock data indicated by the motion vector data MV from the image data of the following frame fed from the interpolation circuit 306, and supplies the extracted macroblock data to the adding circuit 82. The motion compensating circuit 81 extracts macroblock data indicated by the motion vector data MV from the image data of the preceding frame fed from the interpolation circuit 307, and supplies the extracted macroblock data to the adding circuit 82. The adding circuit 82 adds the macroblock data of the following frame from the motion compensating circuit 80 and the macroblock data of the preceding frame from the motion compensating circuit 81 together. The output from the adding circuit 82 is multiplied with a coefficient of "½" by the inner ½ multiplier to produce a mean value of the following frame macroblock data and the preceding frame macroblock data. The mean value is fed to the adding circuit 83.

The adding circuit 83 adds the image data of the current frame from the frame memory 76 (difference data) and the macroblock data as a added mean result fed from the above adding circuit 82 together to restore the original macroblock data. The restored original macroblock data is fed through the switch 84 to the interpolation circuit 308. If the restored image data supplied from the adding circuit 83 through the switch 84 contains only either one of the data of the subsample a or the data of subsample b, the interpolation circuit 308 generates the image data of the subsample a or the subsample b on the basis of the image data by interpo- lation processing. Then, the interpolation circuit 308 pro- duces interpolated image data composed of that image data and the image data of the subsample a or the subsample b generated by the interpolation and outputs the same as output image data through the output terminal 86 to the reproducing system signal processing circuit 22 shown in FIG. 16.

Next, description will be made on the restoration of the current frame image data as an I-picture. In this case, the switch 84 connects its movable contact c to the intra-side fixed contact b on the basis of the inter/intra control signal SEL which is supplied from the system controller 400 shown in FIG. 16 through the input terminal 85I. In this case, the signal path is established from the frame memory 76 through the switch 84 to the interpolation circuit 308. Therefore, an interpolation circuit utilized at that time is only the interpo- lation circuit 308. If the restored image data supplied from frame memory 76 through the switch 84 contains only either one of the data of the subsample a or the data of subsample b, the interpolation circuit 308 generates the image data of the subsample a or the subsample b on the basis of the image data by interpolation processing. Then, the interpolation circuit 308 produces interpolated image data composed of that image data and the image data of the subsample a or the subsample b generated by the interpolation and outputs the same as output image data through the output terminal 86 to the reproducing system signal processing circuit 22 shown in FIG. 16.

FIG. 20 is a structural diagram showing an example of inner arrangement of the integrating circuit shown in FIG. 19.

An integrating circuit 304 shown in FIG. 20 is composed of an odd-numbered memory 304b and an even-numbered memory 304e which store the image data Da as the sub- sample a and the subsample b supplied from the IDCT circuit 75 shown in FIG. 19 through the input terminal 304c in response to a write enable signal WE and an address signal AD supplied from a memory controller 304f, and the memory controller 304f which supplies the write enable signal WE, a read enable signal RE and the address signal AD to the odd-numbered memory 304b and even-numbered memory 304e on the basis of the integrating control signal Mcon supplied from the system controller 400 shown in FIG. 16 through the input terminal 304d.

The odd-numbered memory 304b is useful for storing therein image data of the subsample a while the even- numbered memory 304e is useful for storing image data of the subsample b.

The operation of the integrating circuit 304 will be described with reference to FIGS. 20B1, 20B2, 20C, 20D and 20E. FIGS. 20B1 and 20B2 depict the above integrating control signal Mcon, FIG. 20C a read enable signal RE fed from the memory controller 304f to the odd-numbered memory 304b, FIG. 20D the read enable signal RE fed from the memory controller 304f to the even-numbered memory 304e, FIG. 20E the image data read from the odd-numbered memory 304b and the even-numbered memory 304e and output through the output terminal 304c. Further, in FIG. 20E, "0", represents pixel data of the subsample a while "Δ" represents pixel data of the subsample b.

The integrating control signal Mcon is a control signal of 2 bit. FIG. 20B1 depicts the lower bit of the integrating control signal Mcon while FIG. 20B2 depicts the upper bit of the integrating control signal Mcon. If the lower bit value of the integrating control signal Mcon shown in FIG. 20B1 is low level "0" while the upper bit value of the integrating control signal Mcon shown in FIG. 20B2 is low level "0", this fact means that there is only image data of the sub- sample a. If the lower bit value of the integrating control signal Mcon shown in FIG. 20B1 is a high level "1" while the upper bit value of the integrating control signal Mcon shown in FIG. 20B2 is low level "0", this fact means that there is only image data of the subsample b. If the lower bit value of the integrating control signal Mcon shown in FIG. 20B1 is a high level "1" while the upper bit value of the integrating control signal Mcon shown in FIG. 20B2 is a high level "1", this fact means that there are both of the image data of the subsamples a and b.

The memory controller 304f supplies the write enable signal WE and the address signal AD to control the memories 304b and 304e such that if the image data Da supplied through the input terminal 304a is the image data Da of the subsample a, this data is stored in the odd-numbered memory 304b while if the image data Da is the image data Da of the subsample b, this data is stored in the even-numbered memory 304e.

When the image data Da of the subsample a and the image data Da of the subsample b are completely stored in the odd-numbered memory 304b and the even-numbered memory 304e, then integrating processing is started. As shown in FIGS. 20B1 and 20B2, if both of the upper bit and the lower bit of the integrating control signal Mcon become the high "1", in this duration, the memory controller 304f supplies the read enable signal RE and the address signal AD shown in FIG. 20C to the odd-numbered memory 304b while supplies the read enable signal RE and the address signal AD shown in FIG. 20D to the even-numbered memory 304e.

The read enable signal RE is arranged to be active when its level is high "1". The address signal AD is incremented in its value at every half period of the read enable signal RE. Therefore, as shown in FIG. 20E, the pixel data of the image data of the subsample a stored in the odd-numbered memory 304b and the pixel data of the image data of the subsample b stored in the even-numbered memory 304e are read out alternately. As a result, the image data are integrated and output.

As shown in FIGS. 20B1 and 20B2, if both of the upper bit and the lower bit of the integrating control signal Mcon become the low level "0", in this duration, the memory controller 304f supplies the read enable signal RE and the address signal AD shown in FIG. 20C to the odd-numbered memory 304b. In this duration, as shown in FIG. 20D, the read enable signal RE supplied to the even-numbered memory 304e stays in the low level "0" which is set to an inactive level.

The read enable signal RE is set to be active when it is in the high "1" level. The address signal AD is incremented in its value at every half period of the read enable signal RE. Therefore, as shown in FIG. 20E, only the pixel data of the image data of the subsample a stored in the odd-numbered memory 304b is read and output with no integrating process effected thereon.

As shown in FIGS. 20B1 and 20B2, if the upper bit of the integrating control signal Mcon goes to the low "0" level and the lower bit of the same goes to the high "1" level, in this duration, the memory controller 304f supplies the read enable signal RE and the address signal AD shown in FIG. 20C to the even-numbered memory 304e. In this duration, as shown in FIG. 20C, the read enable signal RE supplied to the odd-numbered memory 304b stays in the low "0" level which is set to an inactive level.

The read enable signal RE is set to be active when it is in the high "1" level. The address signal AD is incremented in its value at every half period of the read enable signal RE. Therefore, as shown in FIG. 20E, only the pixel data of the image data of the subsample b stored in the even-numbered memory 304e is read and output with no integrating process effected thereon.

The odd-numbered memory 304b and the even-numbered memory 304e may have one macroblock amount or one frame amount.

Figure 21:
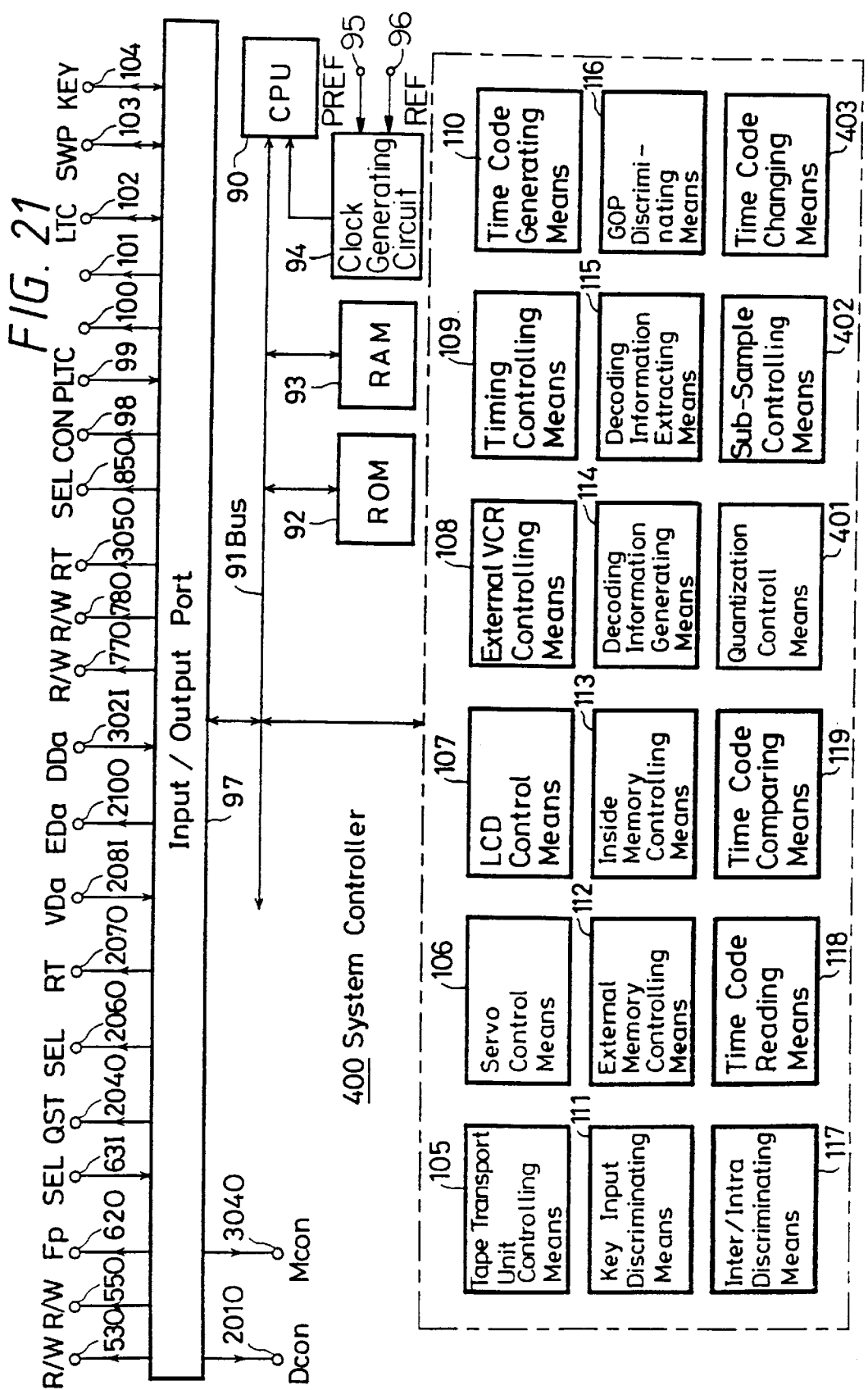
FIG. 21 is a structural diagram showing an example of an inner arrangement of the system controller shown in FIG. 16.

FIG. 21 is a structural diagram showing an example of the inner arrangement of the system controller shown in FIG. 16. In FIG. 21, parts corresponding to those in FIG. 4 are designated with the same reference numerals and they are not described in detail.

Figure 4:
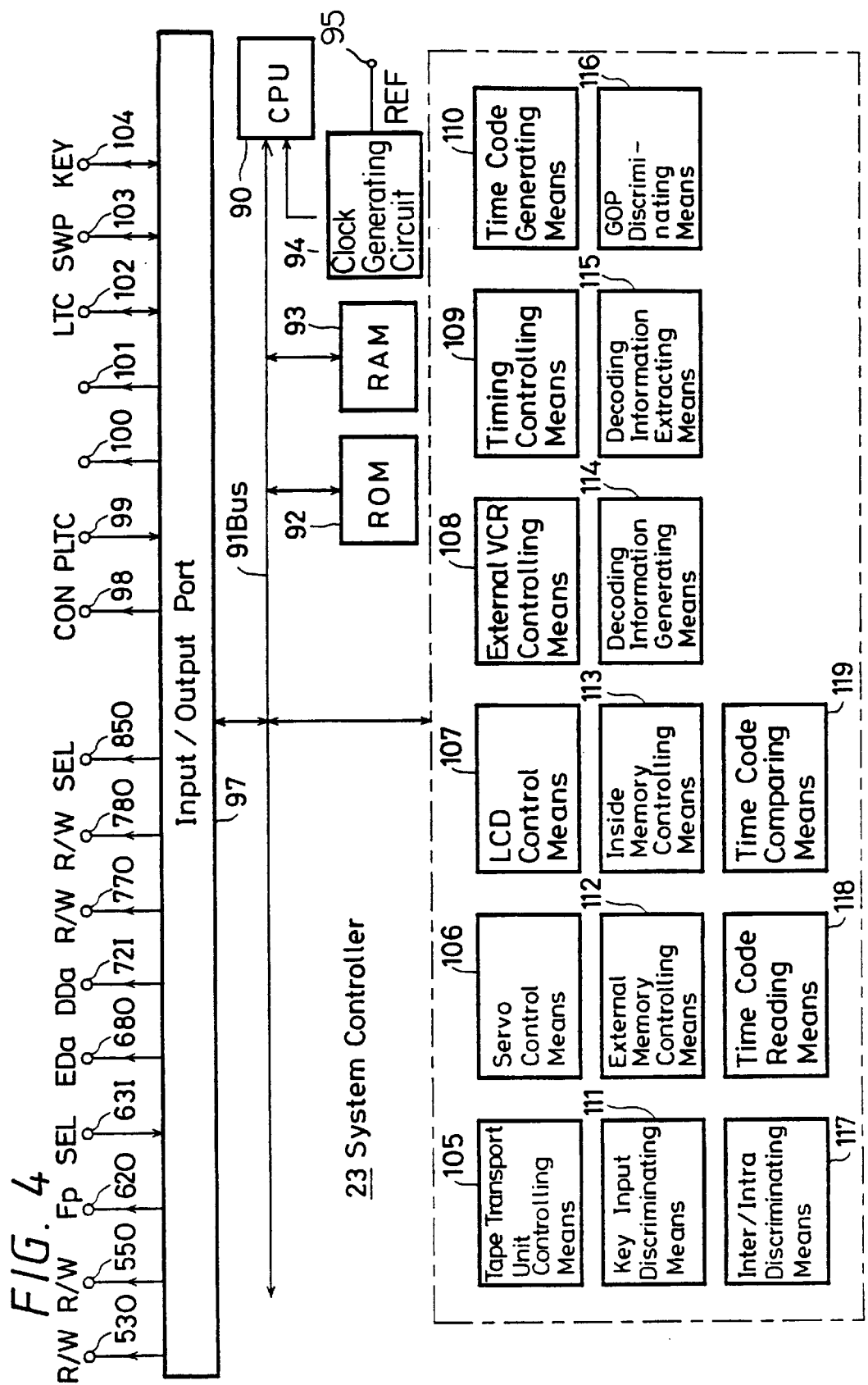
FIG. 4 is a structural diagram showing an internal arrangement of a system controller shown in FIG. 1.
Figure 5:
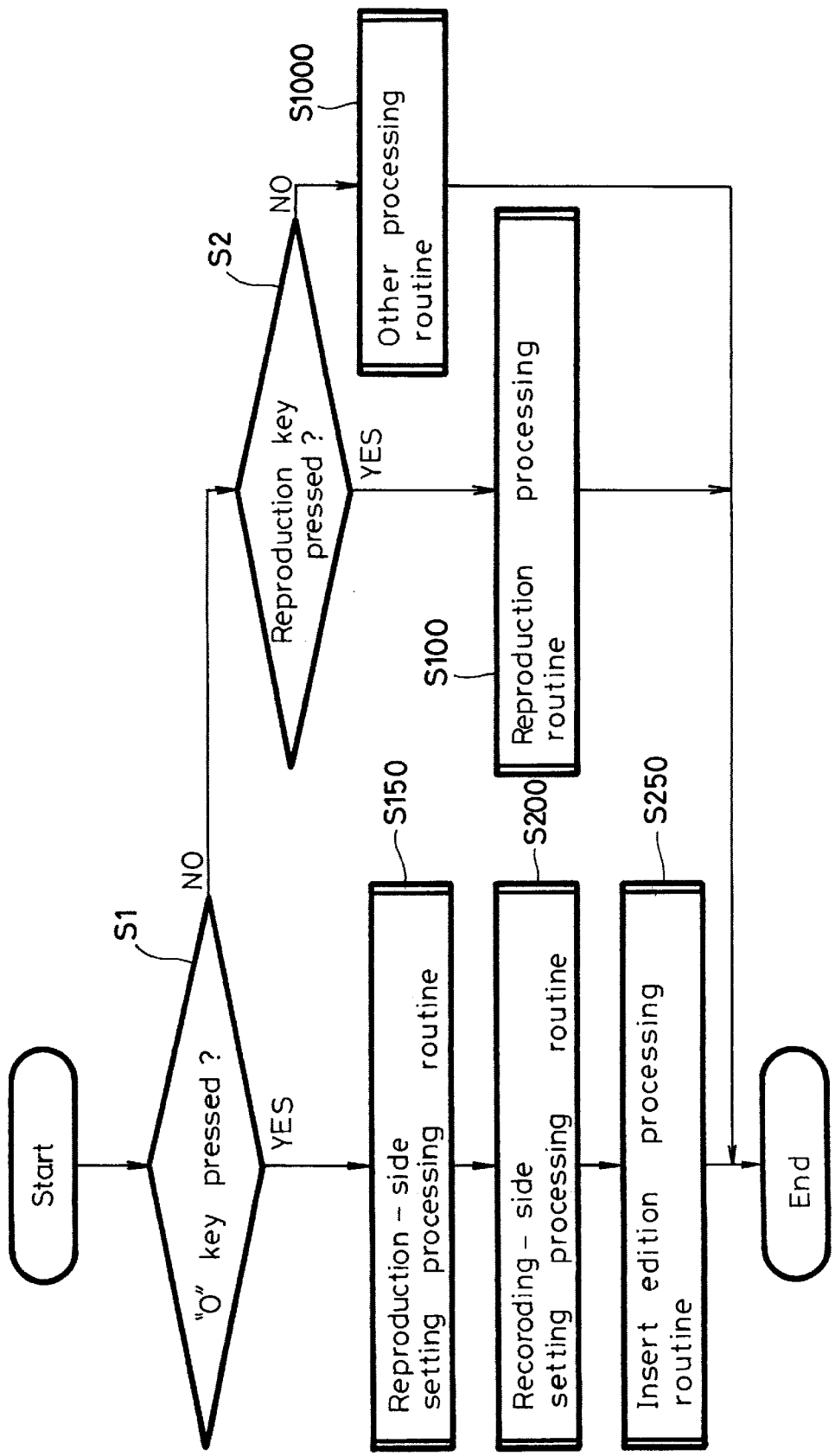
FIG. 5 is a flowchart of a main routine to which reference is made for explaining a processing operation of control of which subject is the system controller shown in FIG. 1.
Figure 6:
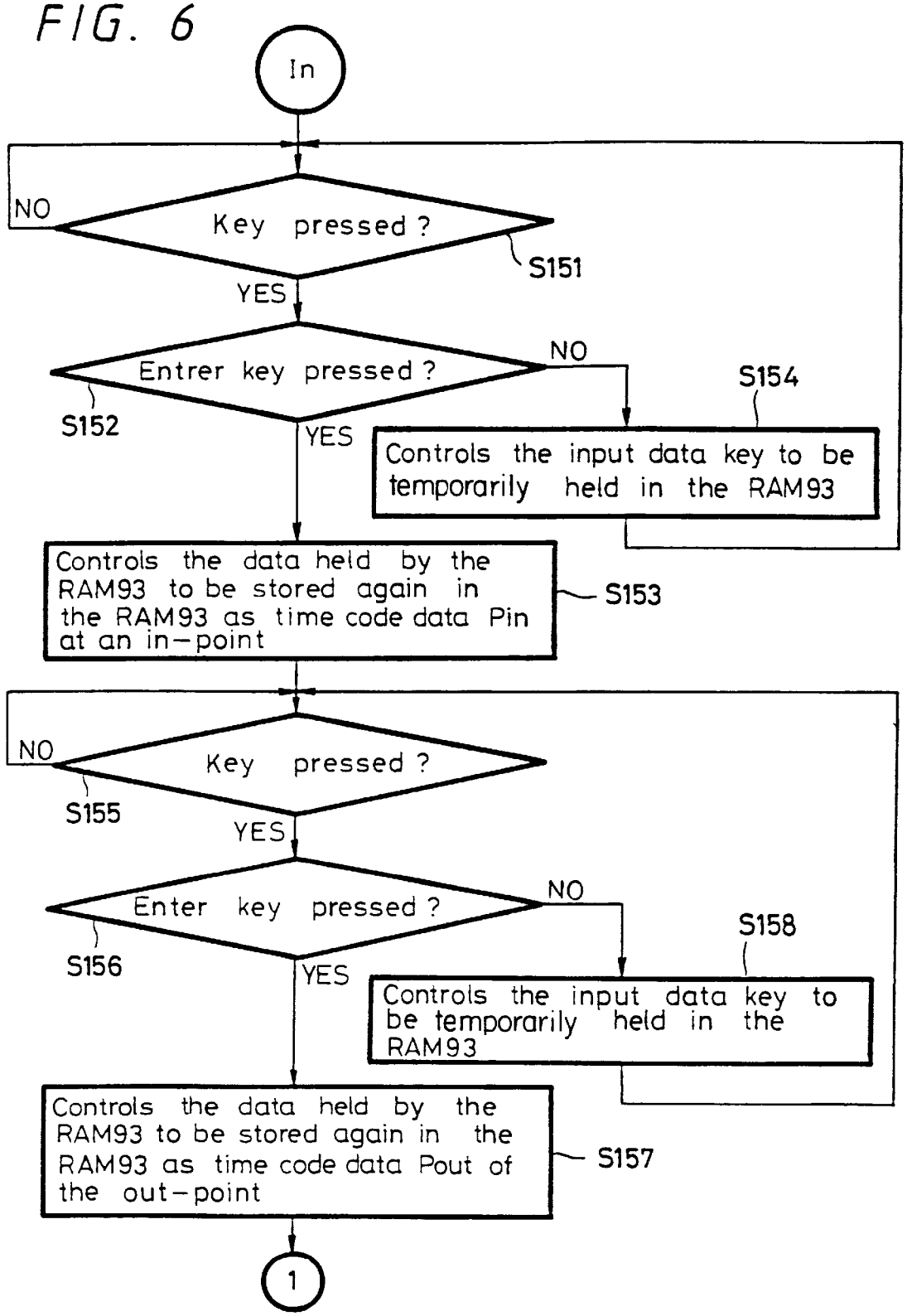
FIG. 6 is a flowchart for explaining the control operation carried out by a playback side setting process routine shown in FIG. 5.
Figure 7:
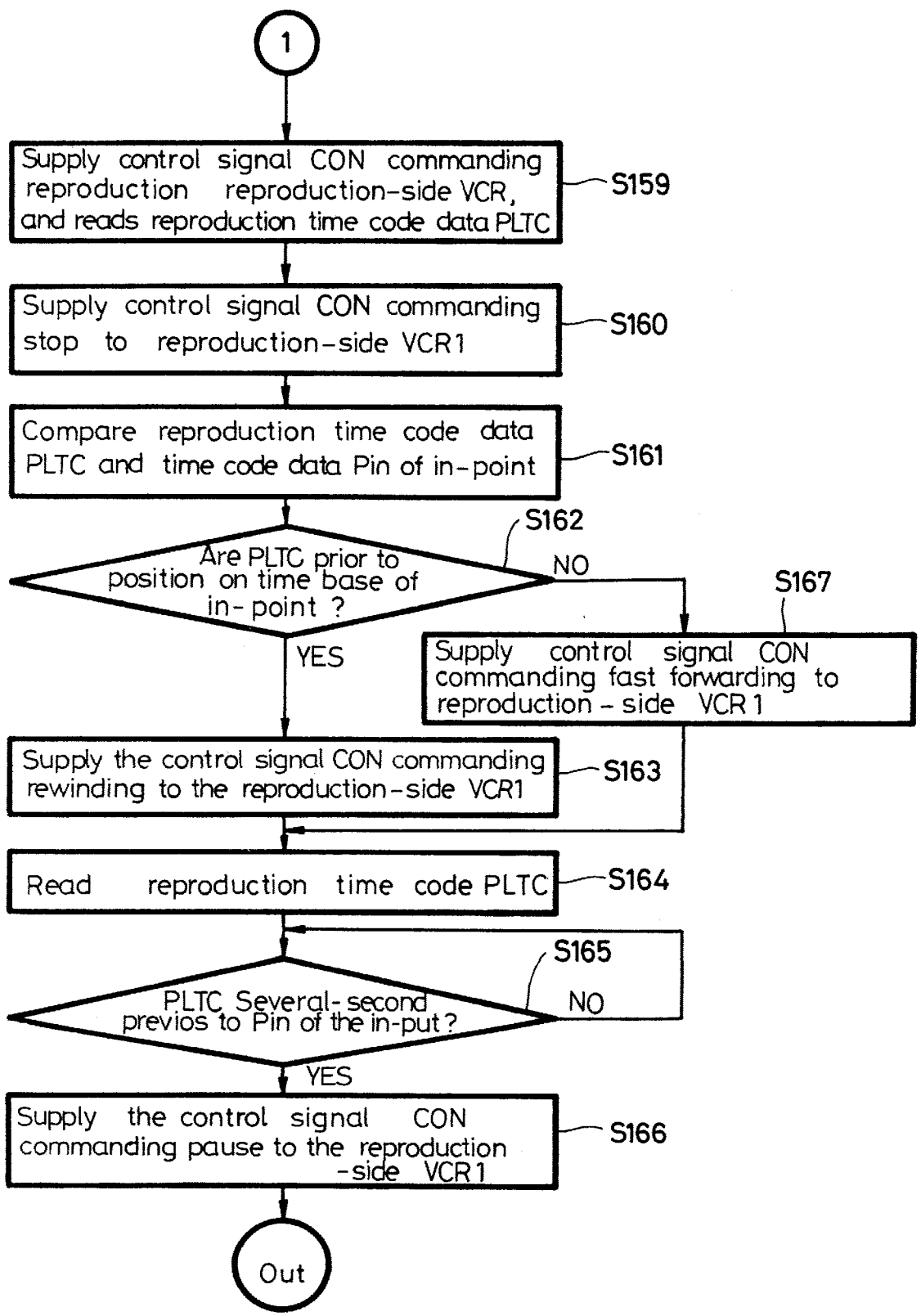
FIG. 7 is a flowchart for explaining the control operation carried out by the playback side setting process routine shown in FIG. 5.
Figure 8:
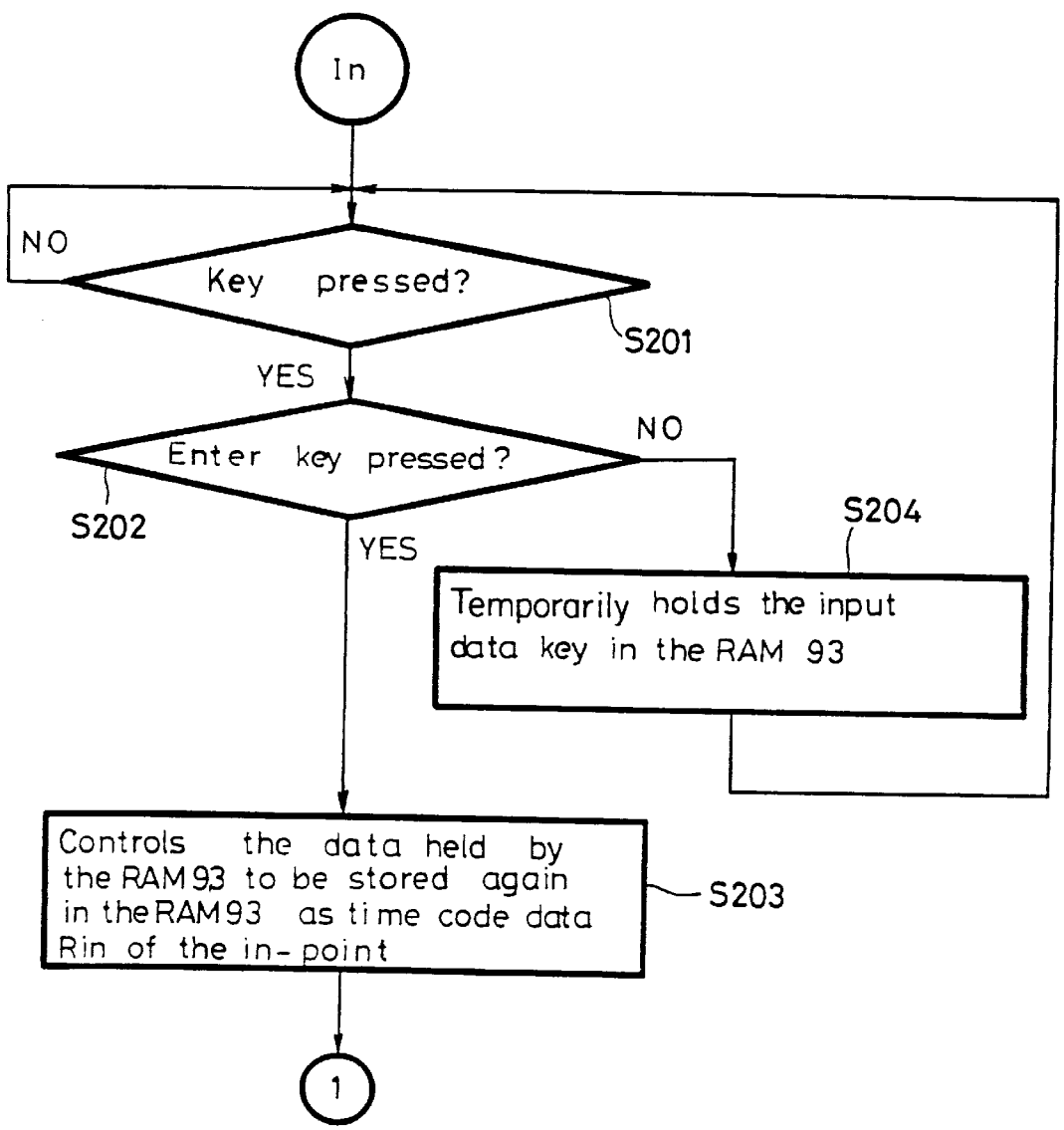
FIG. 8 is a flowchart for explaining the control operation carried out by a recording side setting process routine shown in FIG. 5.

In FIG. 21, parts different from those of FIG. 4 are as follows. In addition to the terminals that the prior art example shown in FIG. 4 has, the system controller 400 shown in FIG. 16 has the following terminals; an output terminals 204O from which a quantized step data QST is output, an output terminal 206O from which the inter/intra selecting signal SEL is output, an output terminal 207O from which a recording track signal RT is output, an input terminal 208I to which variable length encoded data VDa is input, an output terminal 210O from which decoded information EDa is output, an input terminal 302I to which decoded information DDa is input, an output terminal 305O from which the recording track signal RT is output, an output terminal 201O from which a dividing control signal Dcon is output and an output terminal 304O from which the integrating control signal Mcon is output.

Further, as for a block, a quantizing control means 401, a subsample control means 402 and a time code changing means 403 are added.

The quantizing control means 401 detects an amount of codes of the variable length encoded data VDa which is supplied from the variable length encoding circuit 205 through the input terminal 208I, and then on the basis of the detected result, supplies the quantizing step data QST through the output terminal 204O to the quantizing circuit 202 shown in FIG. 17. The quantizing step in the quantizing circuit 202 is controlled to arrange the track into a predetermined format.

When encoding is made, the subsample control means 402 generates the dividing control signal Dcon from the recording track signal RT generated from the tape transport unit control means 105 on the basis of the drum switching pulse SWP supplied thereto from the tape transport unit 14 shown in FIG. 16 through the switching circuit 13 and the output terminal 103, and then supplies the dividing control signal Dcon through the output terminal 201O to the dividing circuit 201 shown in FIG. 17. The dividing control signal Dcon contributes to the decision of a processing cycle carried out in the dividing circuit 201. The processing cycle means any one of the lengths, e.g., the half length of the macroblock amount, the length of the macroblock amount, the length of the subsample amount, the length of the track amount and the length determined by the capacity of the memories.

When decoding is made, the subsample control means 402 generates the integrating control signal Mcon shown in FIG. 20 from the recording track signal RT generated from the tape transport unit control means 105, GOP head data GOP within the decoded information DDa supplied from the input decoding circuit 301 through the input terminal 302I, edit condition flag data EDT and the inter/intra control signal SEL on the basis of the drum switching pulse SWP supplied thereto from the tape transport unit 14 shown in FIG. 16 through the switching circuit 13 and the output terminal 103, and then supplies the integrating control signal Mcon through the output terminal 304O to the integrating circuit 304 shown in FIG. 19.

Now, description will be made on how the subsampling control means 402 generates the integrating control signal Mcon shown in FIG. 20. When new image data is recorded by insert edit, a head image data within the all image data newly recorded is recorded together with GOP head data GOP indicative of the head of the above GOP, an edit condition flag data EDT and the inter/intra selecting signal SEL. Therefore, when reproduction is made, the subsample control means 402 identifies the input reproduced data for each of the track on the basis of the recording track signal RT, the head of the picture on the basis of the head GOP of the above-mentioned GOP, and then identifies that the data reproduced from the track is an image data of the subsample b newly recorded on the magnetic tape 17 of the recording side VTR 10 on the basis of the above edit condition flag data through the insert edit.

What has been described above will be more fully understood if reference is made on FIG. 13 and so on. As shown in FIG. 13, in the present example, the head GOP in the period of insertion is composed of the image data of the subsample a which has been originally recorded on the magnetic tape 17 of the recording side VTR 10 and the image data of the subsample b which is newly recorded by the insert edit. These pieces of the image data are recorded to form individual tracks. Thus, by means of the edit condition flag data EDT, it is possible to identify that the image data originally recorded on the magnetic tape 17 of the recording side is the image data of the subsample a while the image data newly recorded by the above-described insert edit is the image data of the subsample b.

In addition, the image data of the subsample a which has been originally recorded on the magnetic tape 17 of the above recording side VTR 10 and the image data of the subsample b which is newly recorded by the insert edit are also formed of image data of the B-picture and the I-picture. The subsample control means 402 identifies a boundary portion thereof on the basis of the inter/intra selecting signal SEL.

As shown in FIG. 13, the GOP of the finally ending portion in the period of insertion is composed of the image data of the subsample a which has been originally recorded on the magnetic tape 17 of the recording side VTR 10 and the image data of the subsample b which is newly recorded by the insert edit. These pieces of the image data are recorded to form individual tracks. Thus, by means of the edit condition flag data EDT, it is possible to identify that the image data originally recorded on the magnetic tape 17 of the recording side is the image data of the subsample a while the image data newly recorded by the above-described insert edit is the image data of the subsample b.

In addition, the image data of the subsample a which has been originally recorded on the magnetic tape 17 of the above recording side VTR 10 and the image data of the subsample b which is newly recorded by the insert edit are also formed of image data of the B-picture and the I-picture. The subsample control means 402 identifies a boundary portion thereof on the basis of the inter/intra selecting signal SEL.

Thus, the integrating control signal Mcon can be produced on the basis of the identification over the reproduced image data and the processing cycle upon the division.

The time code changing means 403 changes a time code Pin for the above in-point and a time code Pout for the above out-point on the basis of time codes which are input by an operator through a console panel 25 shown in FIG. 16, i.e., the time code Pin for the in-point and the time code Pout for the out-point recorded on the magnetic tape 3 of the video tape cassette loaded on the reproducing side the VTR 1, and also a time code Rin for the in-point recorded on the magnetic tape 17 of the video tape cassette loaded on the recording side VTR 10.

The difference between the system controller 400 shown in FIG. 21 and the system controller 23 shown in FIG. 4 is as described above.

Now, the control operation of the system controller 400 shown in FIG. 21 will be described with reference to flowcharts in FIGS. 22 through 30. A subject of the control operation is the aforesaid respective means which include a function provided by the above CPU 90. In the following explanation, description such as, for example, "by way of the input/output terminal and input/output port" or the like about the terminal and the input/output port 97 shown in FIG. 21 will be omitted. This is because the description of the input terminal and the input/output port 97 has been done and redundant sentences will prevent the contents of the control operation carried out by the respective means from being understood.

Figure 22:
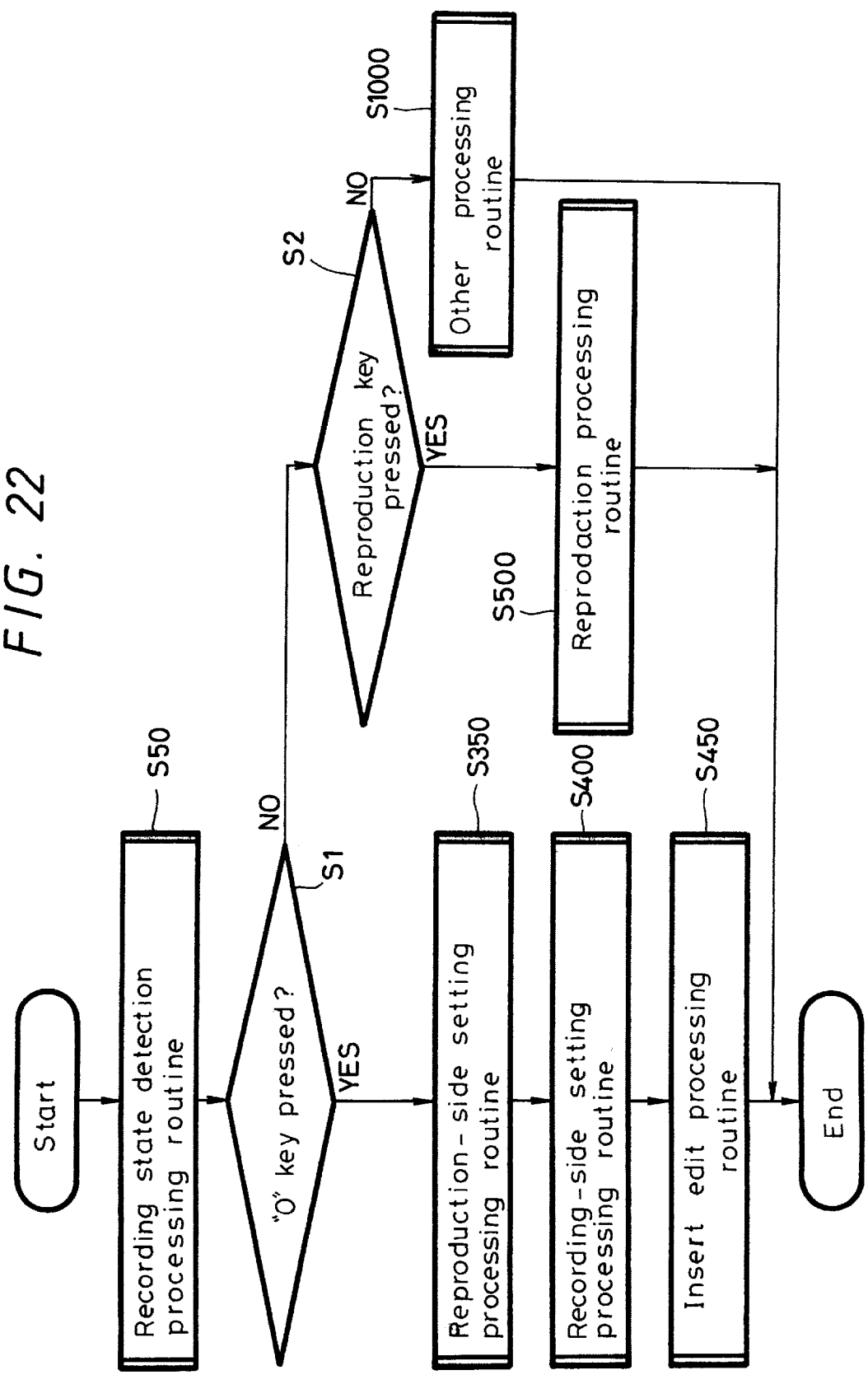
FIG. 22 is a flowchart showing a main routine to which reference is made for explaining a processing operation of control of which subject is the system controller shown in FIG. 21.

Further, in the flowcharts in FIGS. 22 through 30, if a process carried out in a step in the flowcharts in FIGS. 22 through 30 is almost the same as or little different from a corresponding process in a step in the flowchart in FIGS. 5 through 11, a reference numeral designating the step in FIGS. 22 through 30 is attached with a parenthesis, and in addition, a reference numeral of the corresponding step in the flowchart shown in FIGS. 5 to 11 is noted in the parenthesis, so that description of the step will be substituted with the description of the corresponding step in the flowchart shown in FIGS. 5 to 11. At this time, the subject of the control operation is shown in the blocks of FIG. 22.

In step S50, the CPU 90 shown in FIG. 21 carries out the processing on the basis of the recording condition detecting processing routine. Then, the process goes to step S1. This recording condition detecting process routine is a routine for carrying out a process to detect a structure of the GOP or the like of the magnetic tape 17 to be reproduced.

In step S350, the CPU shown in FIG. 21 performs a process of the reproducing side setting process routine. Then, the process goes to step S400. The reproducing side setting process routine is a process for determining from which position to which position the insert image extends on the magnetic tape 3 of the video tape cassette loaded on the reproducing side VTR 1 shown in FIG. 16.

In step S400, the CPU 90 shown in FIG. 21 carries out the process based on the recording side setting process routine. Then, the process goes to step S450. The recording side setting process is a process for determining from which position recording is started on the magnetic tape 17 of the video tape cassette set in the recording side VTR 10 shown in FIG. 16.

In step S450, the CPU 90 carries out a process on the basis of the insert edit process routine. Then, the process is terminated. The insert edit process is a process for recording an insert image to be inserted which is defined in step S350, on the magnetic tape 17 of the video tape cassette set in the recording side VTR 10 at a recording position which has been determined in step S400.

In step S500, the CPU 90 shown in FIG. 21 performs a process on the basis of the reproducing process routine, and then the process is ended. The reproducing process is a process for carrying out reproduction.

Figure 23:
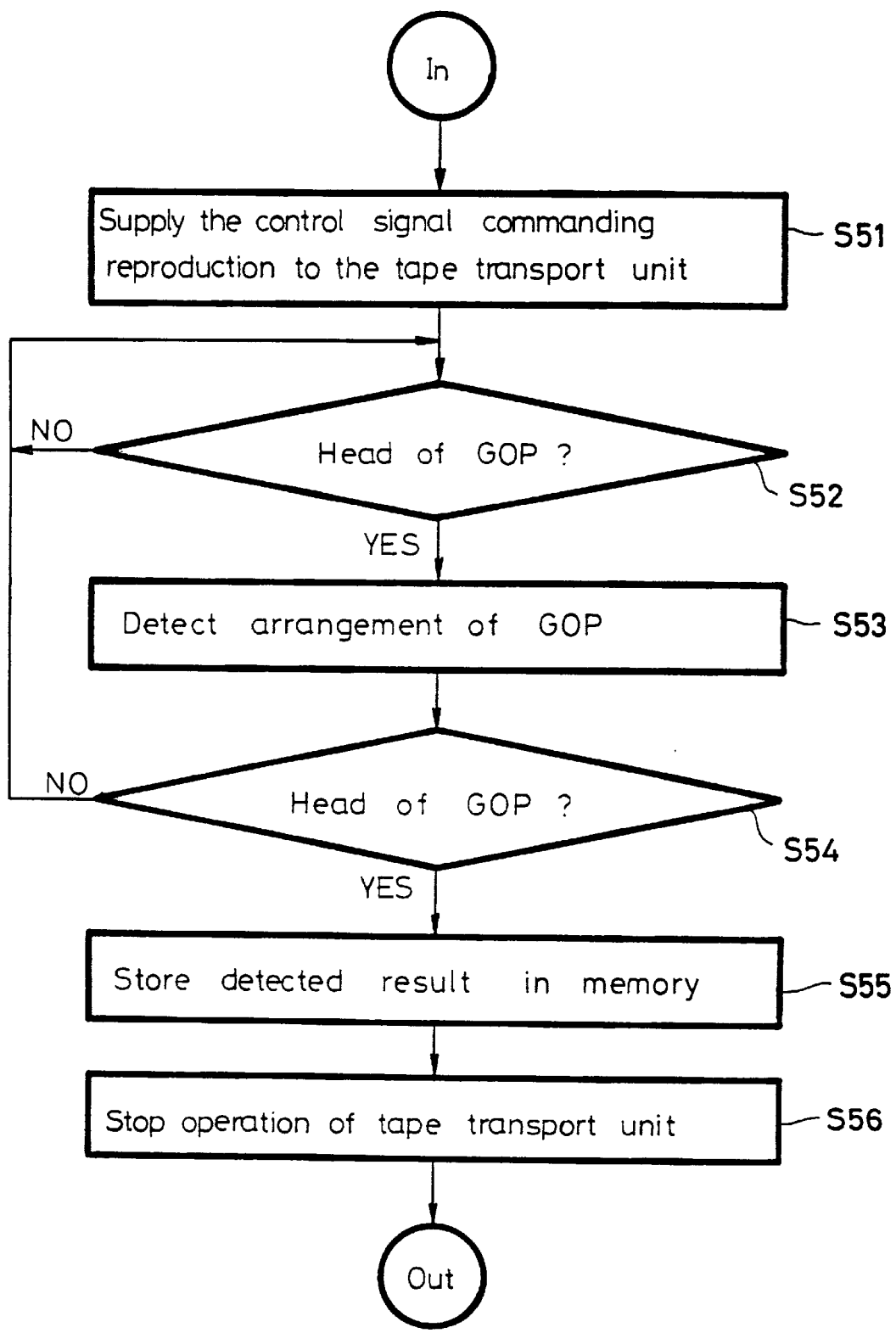
FIG. 23 is a flowchart for explaining the control operation carried out in accordance with the recording state detecting routine shown in FIG. 22.

FIG. 23 is a flowchart for explaining the control operation of the recording state detecting process routine shown in FIG. 22.

In step S51, the tape transport unit control means 105 shown in FIG. 21 supplies a control signal indicative of the initiation of reproduction to the tape transport unit 14 shown in FIG. 16 so that the tape transport unit 14 starts the reproducing operation. When the tape transport unit 14 starts the reproduction, decoding information is fed to the system controller 400. The decoding information is stored in a RAM 93 under the control of an inside memory control means 113 shown in FIG. 21. Then, the process goes to step S52.

In step S52, the inside memory control means 113 reads GOP head data GOP from the RAM 93 under the control of the GOP discriminating means 116 shown in FIG. 21. The GOP head data GOP read from the RAM 93 is fed to a GOP discriminating means 116. The GOP discriminating means 116 determines whether the GOP head data GOP is "1" or not, that is, the head of the GOP is identified or not. If the result of the determination is "YES", the process goes to step S53.

In step S53, the inside memory control means 113 reads the inter/intra selecting signal SEL from the RAM 93 under the control of the inter/intra discriminating means 117 shown in FIG. 21. The inter/intra selecting signal SEL read from the RAM 93 is fed to the inter/intra discriminating means 117. The inter/intra discriminating means 117 determines inter/intra, that is, it determines whether the picture is a B-picture or an I-picture on the basis of the inter/intra selecting signal SEL read from the RAM 93. Then, the process proceeds to step S54.

In step S54, the inside memory control means 113 reads GOP head data GOP from the RAM 93 under the control of the GOP discriminating means 116 shown in FIG. 21. The GOP head data GOP read from the RAM 93 is fed to a GOP discriminating means 116. The GOP discriminating means 116 determines whether the GOP head data GOP is "1" or not, that is, the head of the GOP is identified or not. If the result of the determination is "YES", the process goes to step S55.

Figure 9:
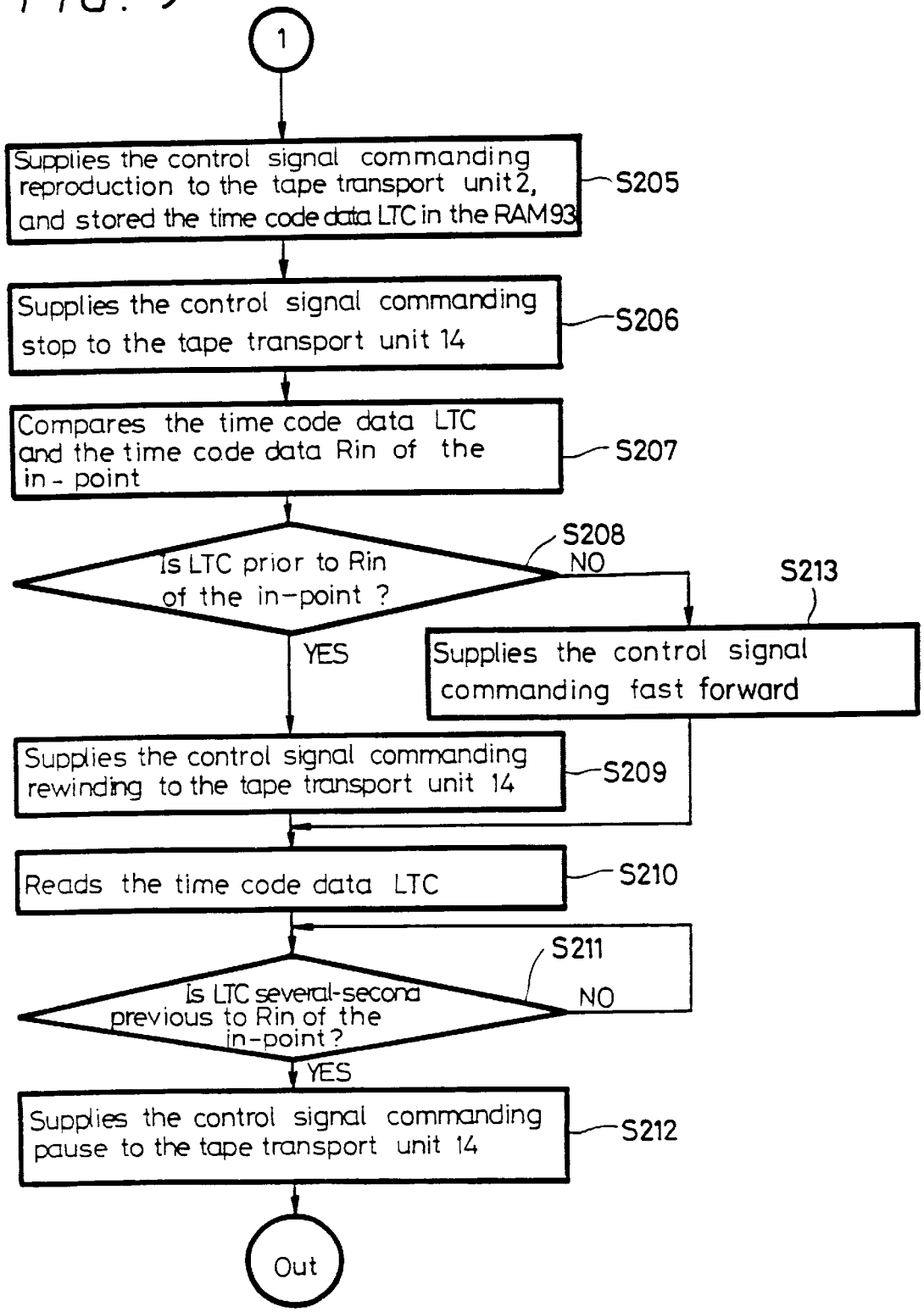
FIG. 9 is a flowchart for explaining the control operation carried out by the recording side setting process routine shown in FIG. 5.
Figure 10:
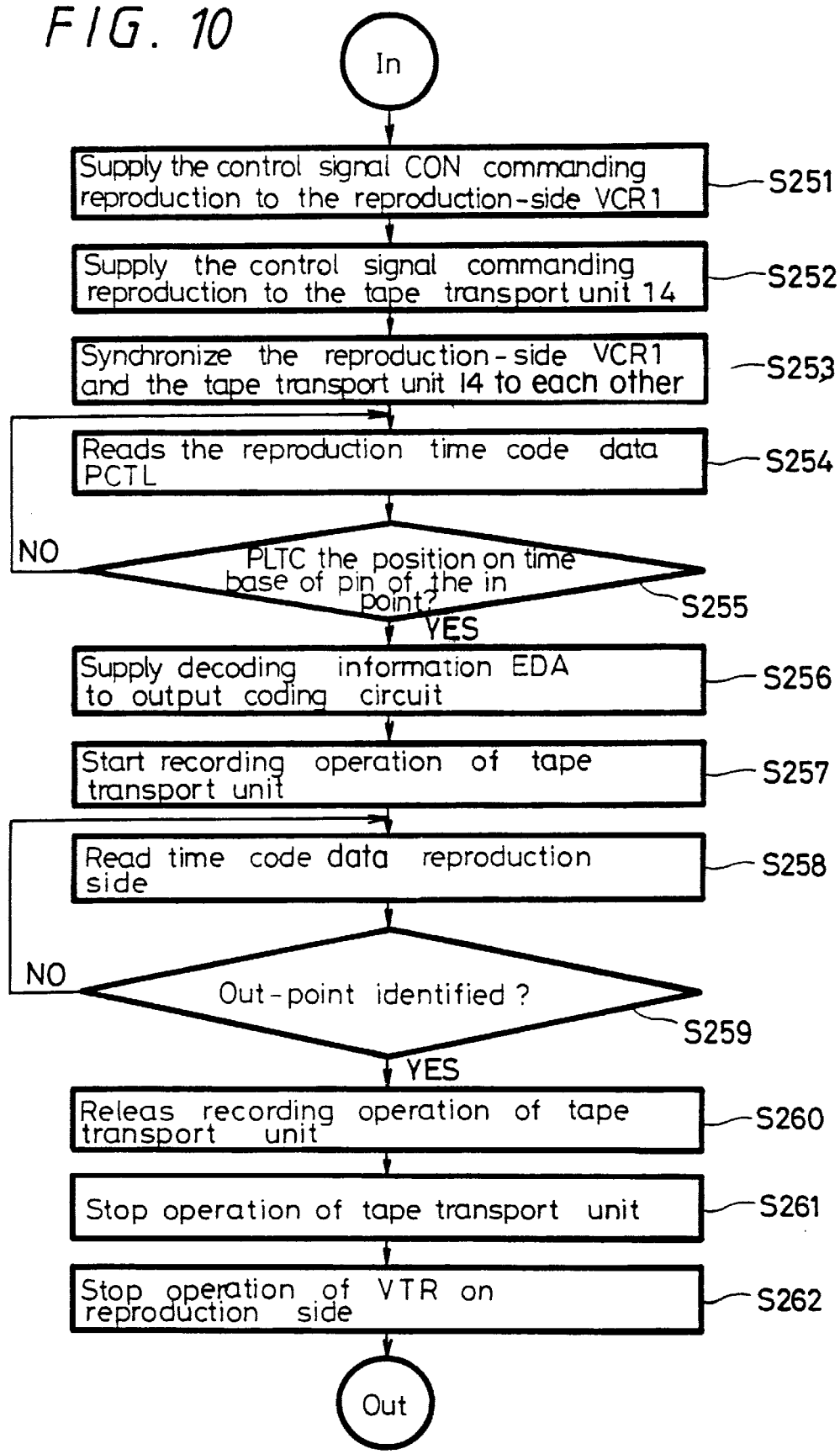
FIG. 10 is a flowchart for explaining the control operation carried out by an insert edition process routine shown in FIG. 5.
Figure 11:
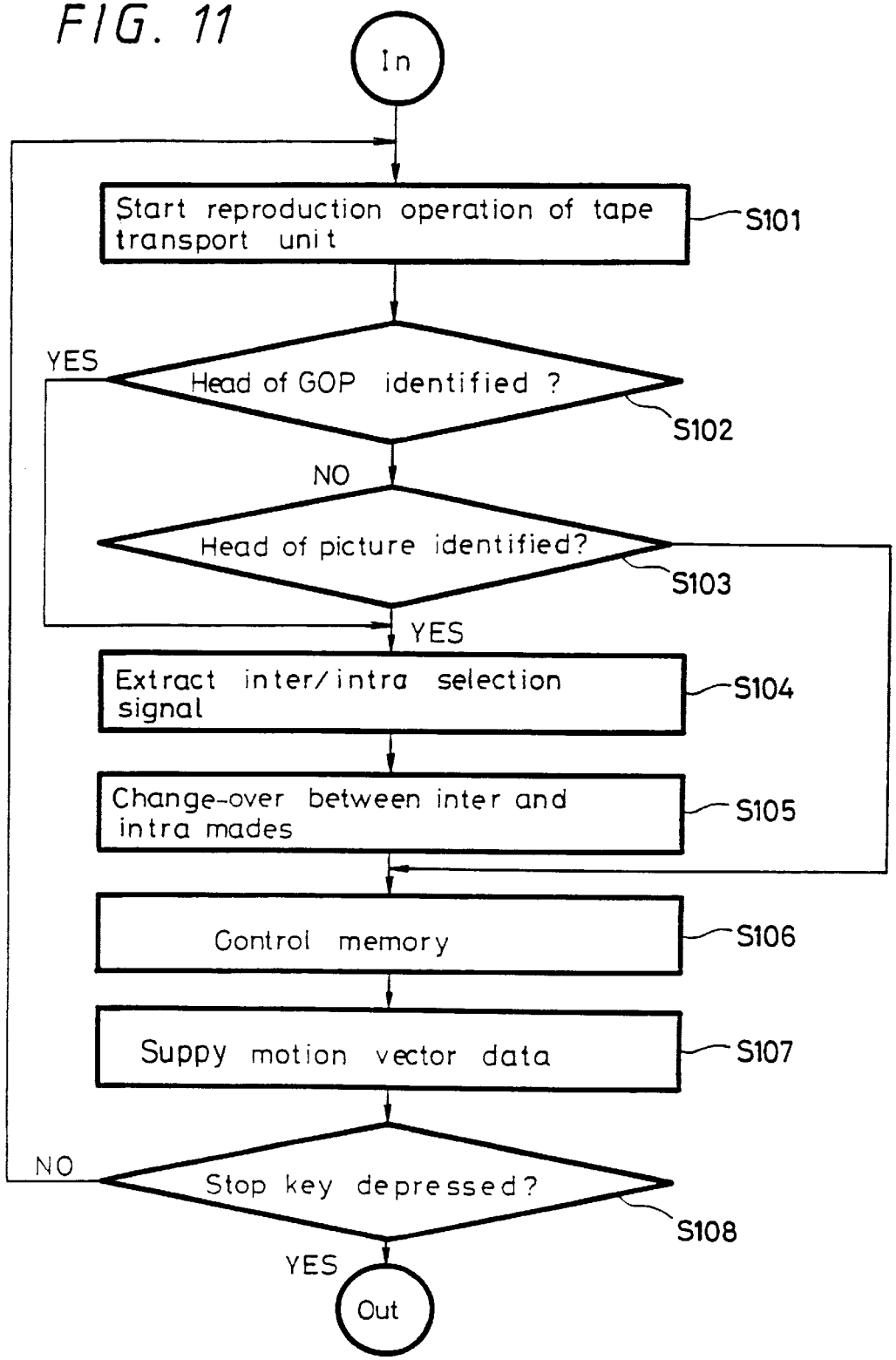
FIG. 11 is a flowchart for explaining the control operation carried out by the playback process routine shown in FIG. 5.

In step S55, the inter/intra discriminating means 117 shown in FIG. 9 supplies data indicative of the arrangement of the picture within one GOP detected in step S53 to the RAM 93. At this time, the inside memory control means 113 supplies a read/write control signal to the RAM 93 under the control of the inter/intra discriminating means 117. Thus, data indicative of the arrangement of the picture within the GOP is stored in the RAM 93. Then, the process proceeds to step S56.

In step S56, the tape transport unit control means 105 shown in FIG. 21 supplies a control signal indicative of a command for stopping reproduction to the tape transport unit 14 shown in FIG. 16 to make the tape transport unit 14 stop the reproduction. Then, the process goes out from the recording condition detecting process routine to proceed to step 1 in the flowchart of the main routine shown in FIG. 22.

Figure 24:
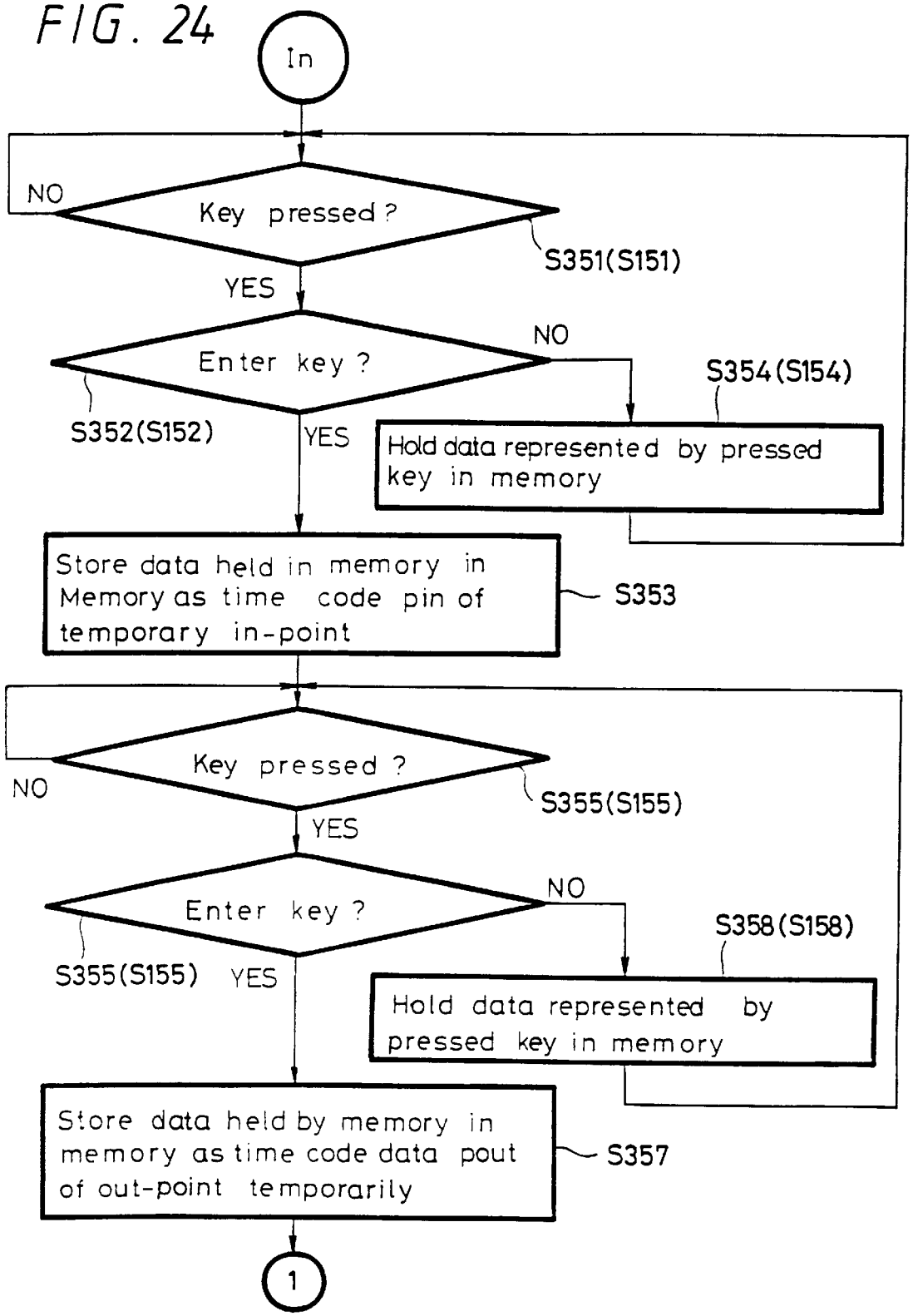
FIG. 24 is a flowchart for explaining the control operation carried out in accordance with the playback side setting process routine shown in FIG. 22.
Figure 25:
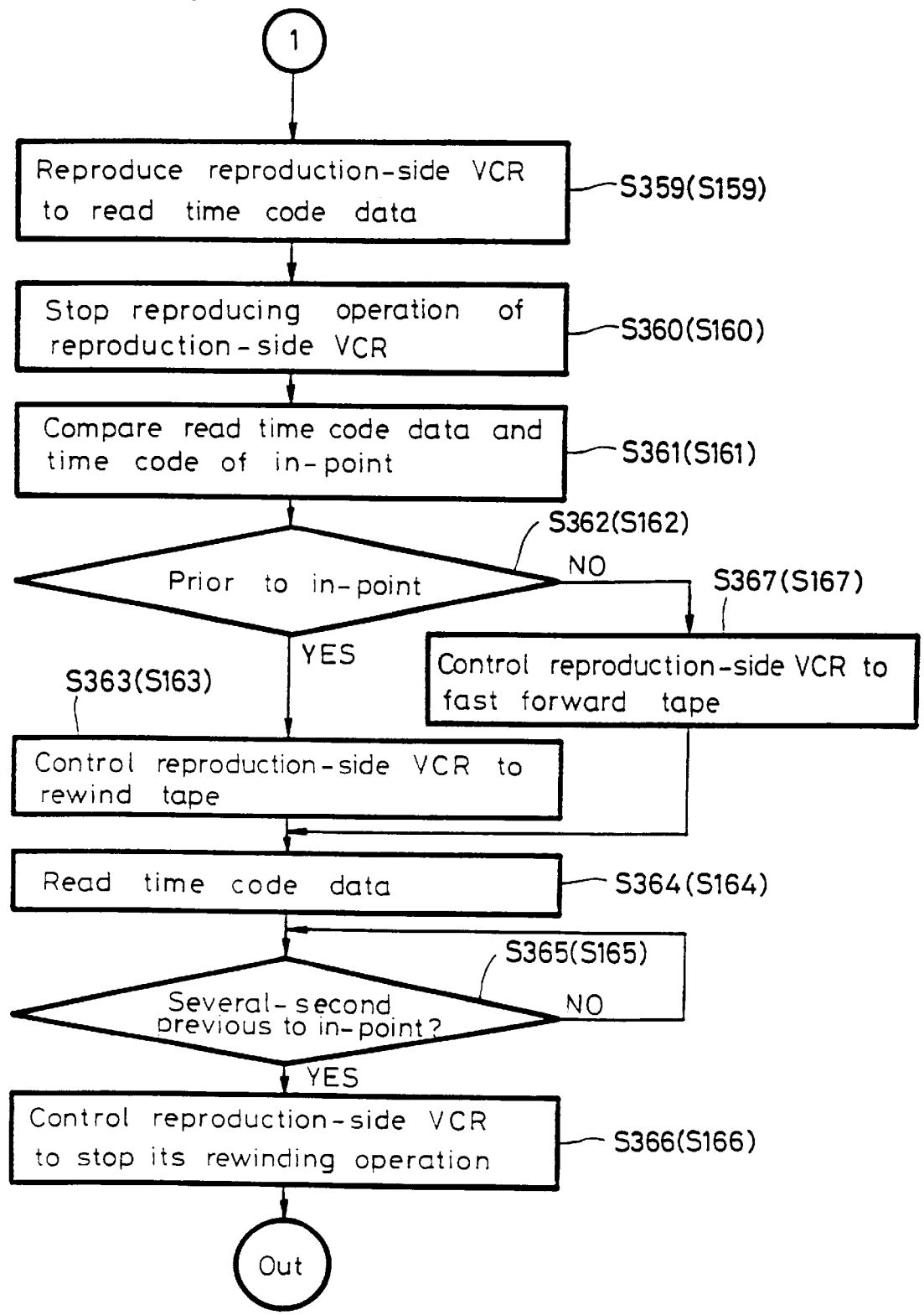
FIG. 25 is a flowchart for explaining the control operation carried out in accordance with the playback side setting process routine shown in FIG. 22.

FIGS. 24 and 25 show flowcharts for explaining the control operation on the basis of the reproducing side setting process routine shown in FIG. 22.

In step S353, the inside memory control means 113 responds to an instruction of the key input discriminating means 111 shown in FIG. 21 to again store the data held in the RAM 93 on the RAM 93 as the time code data pin for a provisional in-point. Then, the process proceeds to step S355.

In step S357, the inside memory control means 113 responds to an instruction of the key input discriminating means 111 shown in FIG. 21 to again store the data held in the RAM 93 on the RAM 93 as the time code data pout for a provisional out-point. Then, the process proceeds to step S358 in the flowchart shown in FIG. 13.

When the process on the basis of the reproducing side setting process routine is ended, the process proceeds to step S400 in the flowchart of the main routine shown in FIG. 22.

Figure 26:
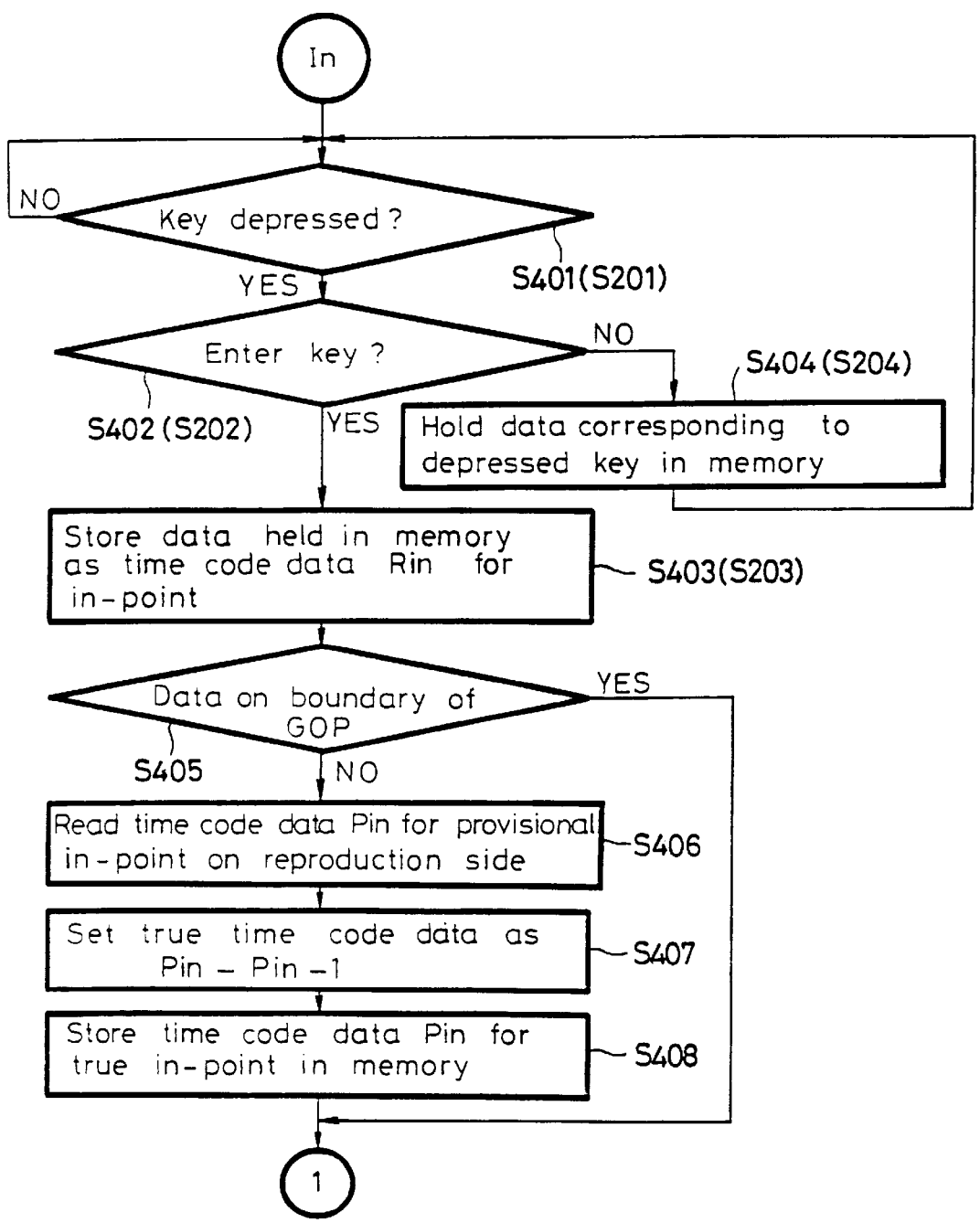
FIG. 26 is a flowchart for explaining the control operation carried out in accordance with the recording side setting process routine shown in FIG. 22.
Figure 27:
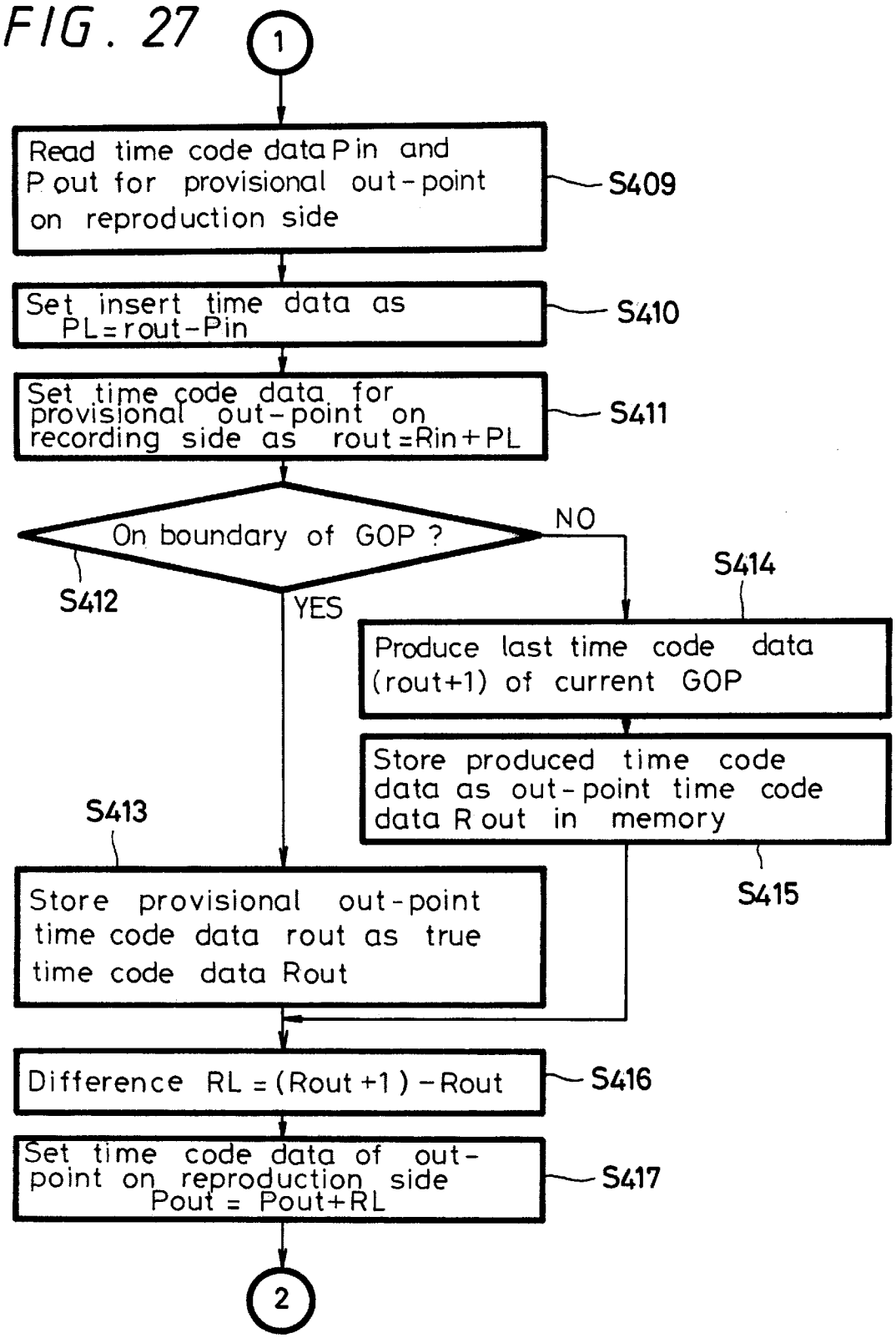
FIG. 27 is a flowchart for explaining the control operation carried out in accordance with the recording side setting process routine shown in FIG. 22.
Figure 28:
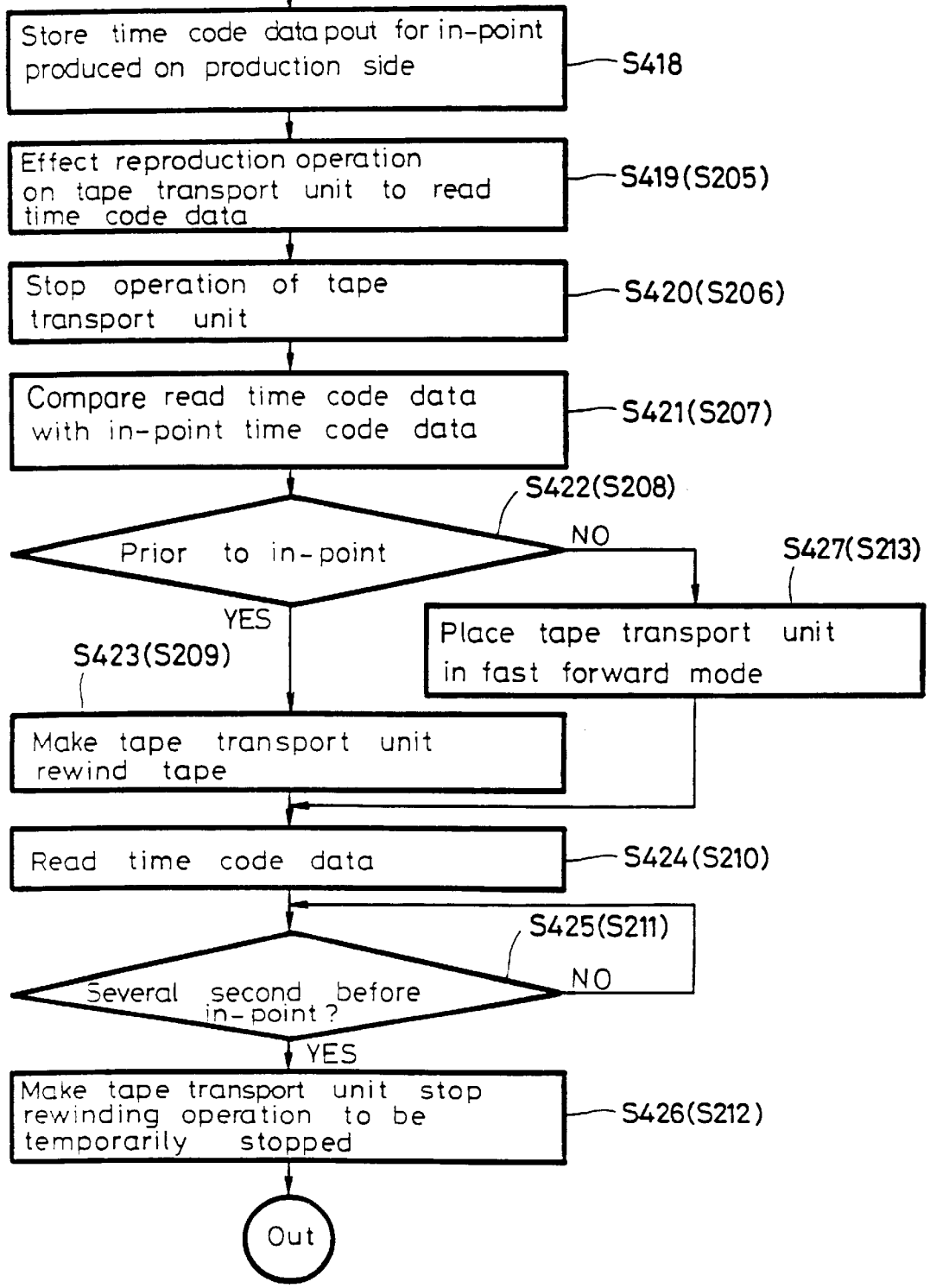
FIG. 28 is a flowchart for explaining the control operation carried out in accordance with the recording side setting process routine shown in FIG. 22.

FIGS. 26 through 28 are flowcharts for explaining the control operation on the basis of the recording side setting process routine shown in FIG. 22.

In step S405, the inside memory control means 113 reads GOP head data GOP from the RAM 93 under the control of the GOP discriminating means 116 shown in FIG. 21. The GOP head data GOP read from the RAM 93 is fed to a GOP discriminating means 116. The GOP discriminating means 116 determines whether the GOP head data GOP read from the RAM 93 is "1" or not, that is, the position of the reproduced data as an object of processing within the GOP is on the boundary of the GOP or not. If the result of the determination is "YES", the process goes to step S409 in the flowchart shown in FIG. 27. If the result of the determination is "NO", the process goes to step S406.

In step S406, the inside memory control means 113 reads the time code data pin for the provisional in-point in the reproducing side from the RAM 93 under the control of the time code changing means 403 shown in FIG. 21. The time code data pin for the provisional in-point read from the RAM 93 is fed to the time code changing means 403. Then, the process proceeds to step S407.

In step S407, the time code changing means 403 subtracts a fundamental time code data from the time code data pin of the provisional in-point read from the RAM 93. In this example, the fundamental time code data is referred to as "00h, 00m, 00s, 01f". That is, the time code changing means 403 produces a time code data ahead from the provisional in-point time code data pin for the provisional in-point by one frame amount, i.e., a time code data soon before the boundary of the GOP. Then, the process proceeds to step S408.

In this case, the fundamental time code data is set to be "00h, 00m, 00s, 01f". This is because, in the present example, the GOP is composed of image data of 2 frame amounts, recording is made so that two tracks are formed of all the image data of one GOP and a time code is allocated to each of the tracks.

In step S408, in accordance with the instruction of the time code changing means 403 shown in FIG. 9, the inside memory control means 113 stores a time code data (pin-1) produced in step S410 into the RAM 93 as a true in-point time code data Pin, instead of the time code data pin for the provisional in-point (reproduction starting point) which has been held in RAM 93. Then, the process proceeds to step S409 in the flowchart in FIG. 27.

In step S409, under the control of the time code changing means 403 shown in FIG. 21, the inside memory control means 113 reads the time code data pout for the provisional out-point in the reproduction side. The time code data pout of the provisional out-point read from the RAM 93 is fed to the time code changing means 403. Then, the process proceeds to step S410.

In step S410, the time code changing means 403 shown in FIG. 21 produces insert time data PL by subtracting the time code data Pin of the in-point in the reproduction side from the time code data pout of the provisional out-point in the reproduction side. Then, the process proceeds to step S411.

In step S411, under the control of the time code changing means 403 shown in FIG. 21, the inside memory control means 113 read the time code data Rin for the in-point in the recording side. The time code data Rin for the in-point in the recording side read out from the RAM 93 is supplied to the time code changing means 403. The time code changing means 403 produces a time code data rout for the provisional out-point in the recording side by adding the insert time data PL obtained in step S410 to the time code data Rin in the recording side read from the RAM 93. Then, the process proceeds to step S412.

In step S412, under the control of the GOP discriminating means 116 shown in FIG. 21, the inside memory control means 113 reads the GOP head data GOP from the RAM 93. The GOP head data GOP read from the RAM 93 is supplied to the GOP discriminating means 116. The GOP discriminating means 116 determines whether the GOP head data GOP read from the RAM 93 is "1" or not, that is, whether the position of the reproduced data as an object of the process within the GOP is located on the boundary of the GOP or not. If the result of the determination is "YES", the process proceeds to step S413 while if the same is "NO", the process proceeds to step S414.

In step S413, in accordance with the instruction of the time code changing means 403 shown in FIG. 21, the inside memory control means 113 stores the time code data rout for the provisional out-point produced in step S411 as the time code data Rout for the true out-point on the RAM 93. Then, the process proceeds to step S414.

In step S414, the time code changing means 403 shown in FIG. 21 adds the time code data rout for the provisional out-point produced in step S411 to the fundamental time code data. In this example, the fundamental time code data is referred to as "00h, 00m, 00s, 01f". That is, the time code changing means 403 produces a time code data ahead from the provisional in-point time code data rout for the provisional out-point by one frame amount, i.e., a time code data soon after the boundary of the GOP. Then, the process proceeds to step S415.

In step S415, in accordance with the instruction of the time code changing means 403 shown in FIG. 21, the inside memory control means 113 stores the time code data produced in step S414 on the RAM 93 as the time code data Rout as a true out-point. Then, the process proceeds to step S416.

In step S416, the time code changing means 403 shown in FIG. 21 subtracts the time code data Rout for the true out-point from the value produced by adding the time code data Rout for the true out-point and the fundamental time code data together, thus producing a difference RL. Then, the process proceeds to step S417.

In step S417, the time code changing means 403 shown in FIG. 21 adds the difference data RL produced in step S416 to the time code data Pout for the provisional out-point in the reproducing side, thus producing a time code data Pout for the true out-point. Then, the process proceeds to step S418 in the flowchart shown FIG. 28.

In step S418, in accordance with the instruction of the time code changing means 403 shown in FIG. 21, the inside memory control means 113 stores the time code data Pout for the out-point in the reproducing side produced in step S417 in the RAM 93. Then, the process proceeds to step S419.

Figure 29:
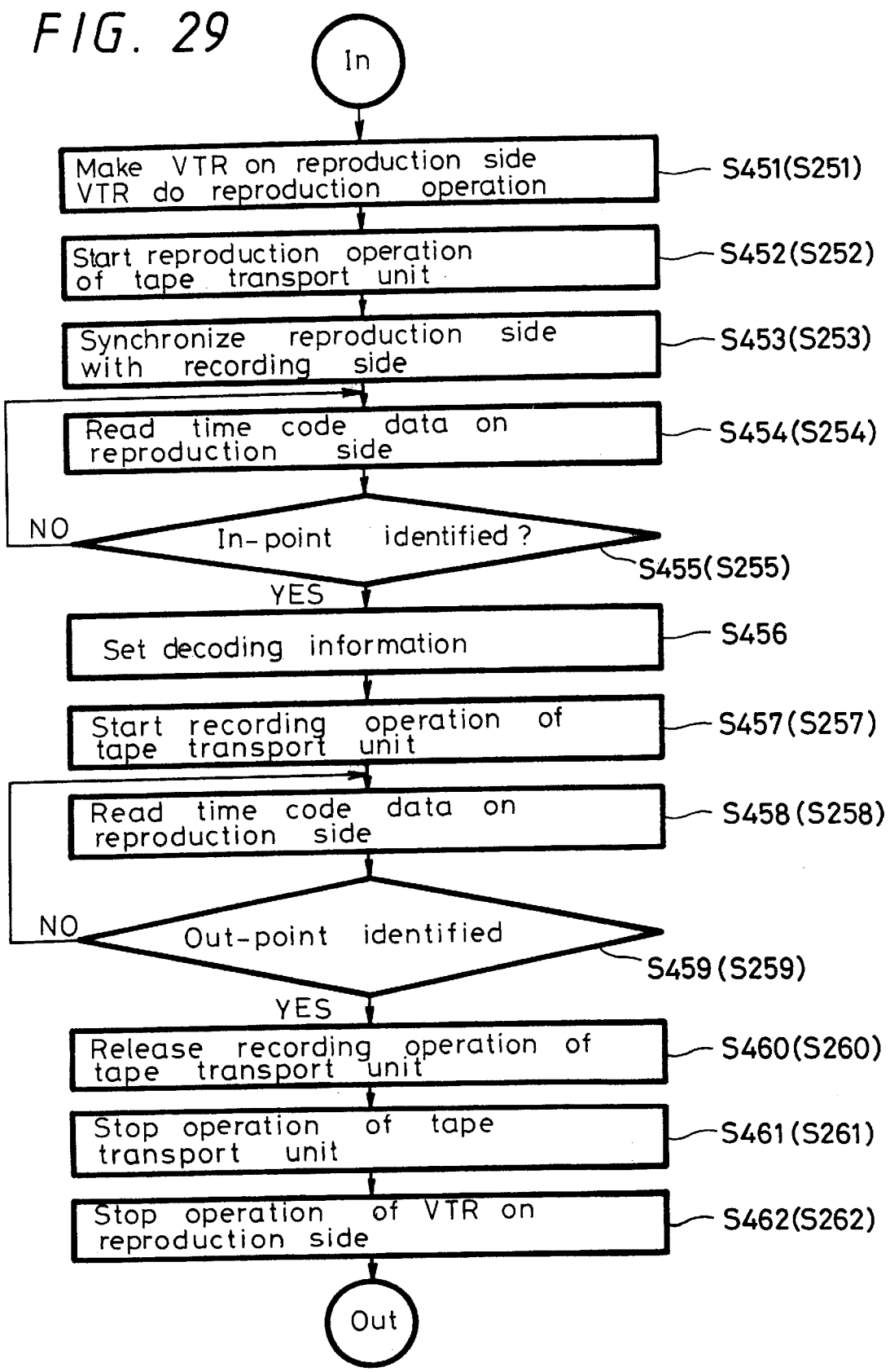
FIG. 29 is a flowchart for explaining the control operation carried out in accordance with the insert edit routine shown in FIG. 22.

FIG. 29 shows a flowchart for explaining the control operation on the basis of the insert edit routine shown in FIG. 22.

In step S456, the decoding information generating circuit 114 shown in FIG. 21 generates decoded information EDa composed of the GOP head data GOP, the inter/intra selecting signal and the edit condition flag data EDT for the image data as the B-picture of the subsample a of the head portion of the GOP, decoded information EDa composed of the GOP head data GOP and the inter/intra selecting signal SEL for the image data as the I-picture of the subsample a of the head of the GOP, the decoded information EDa composed of the GOP head data GOP, the inter/intra selecting signal SEL and the edit condition flag data EDT for the image data as the B-picture of the subsample b which is not a head of the GOP, and the decoded information EDa compose of the GOP head data GOP and the inter/intra selecting signal for the image data as the I-picture of the subsample b which is not the head of the GOP, and then supplies the decoded information EDa to the output encoding circuit 209 shown in FIG. 17. Then, the process proceeds to step S457.

Figure 30:
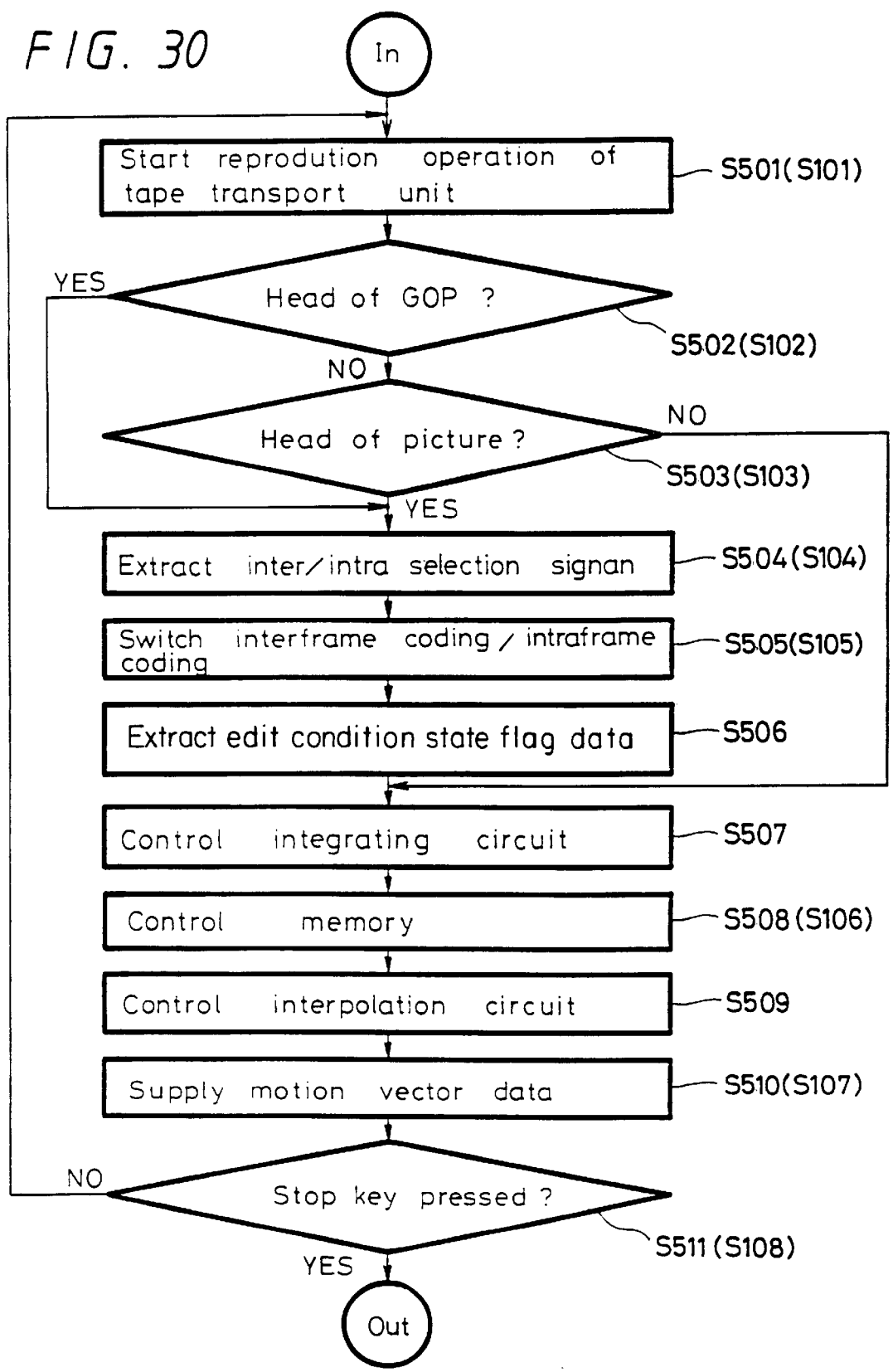
FIG. 30 is a flowchart for explaining the control operation carried out in accordance with the insert edit routine shown in FIG. 22.

FIG. 30 is a flowchart for explaining the control operation on the basis of the reproducing process routine shown in FIG. 22.

In step S506, under the control of the subsample control means 402 shown in FIG. 21, the inside memory control means 113 reads the edit condition flag data EDT from the RAM 93. The edit condition flag data EDT read from the RAM 93 is fed to the subsample control means 402. Then, the process proceeds to step S507.

In step S507, as a result of the determination made by the GOP discriminating means 116 whether the position is at the head of the GOP or not, in accordance with the edit condition flag data EDT read from the RAM 93, the inter/intra selecting signal SEL from the inter/intra discriminating means 117 and the recording track signal RT from the tape transport unit control means 105, the subsample control means 402 shown in FIG. 21 generates the integrating control signal Mcon, and supplies the integrating control signal Mcon to the integrating circuit 304 shown in FIG. 19. Then, the process proceeds to step S508.

In step 509, the tape transport unit control means 105 shown in FIG. 21 supplies the recording track signal RT to the interpolation circuits 306, 307 and 308 shown in FIG. 19. Then, the process proceeds to step S510.

As described above, in this embodiment, when the time code Rin of the in-point which is the recording start point on the magnetic tape of the recording-side VCR is designated, it is determined whether or not the image data recorded at the position of the in-point is at the head of the GOP. If it is determined that the image data are not at the head of the GOP, then the designated time code Pin of the in-point on the magnetic tape of the reproduction-side VCR is displaced and all the insert images are subjected to coding processings. Similarly, if the time code data Rout of the recording end point on the magnetic tape of the recording-side VCR are not at the end of the GOP, then the designated time code Pout of the out-point on the magnetic tape of the reproduction-side VCR is displaced and all the insert images are subjected to coding processings. When the image data are actually recorded on the magnetic tape, the image data as the B and I pictures of the subsample b at the head of the insert image are recorded on the second track of the two tracks corresponding to the GOP at the head of the insertion period. The image data as the B and I pictures of the subsample b at the end of the insert image are recorded on the second track of the two tracks corresponding to the GOP at the end of the insertion period. On all the tracks corresponding to the GOPs at the other portion of the insertion period, the B and I pictures of the subsamples a and subsamples b of the insert image data are recorded.

Accordingly, when the image data are reproduced, since the B and I pictures of the subsamples a originally recorded on the magnetic tape of the recording-side VCR remain on the first track of the two tracks corresponding to the GOP at the head of the insertion period, it is possible to restore the B picture of the subsample a recorded on the first track by using the I picture of the first track and the I picture originally recorded on the immediately preceding track. Since the B and I pictures of the subsample b as the insert image are recorded on the second track thereof, it is possible to restore the B picture of the subsample b recorded on the second track by using the I picture of the second track and the I picture originally recorded on the immediately succeeding track. Similarly, the image data on the portion corresponding to the GOP at the end of the insert period are restored to its original data.

When the image data originally recorded on the magnetic tape are restored, the inserted image data are not used. When the inserted image is restored, the image data originally recorded on the magnetic tape are not used. It is possible to completely prevent remarkable deterioration of the picture quality caused by inadequate restoration processing.

[2nd Embodiment]

FIGS. 31A through 31L are views schematically illustrative of an insert editing mode according to a second embodiment of the present invention. Those parts in FIGS. 31A through 31L which are identical to those shown in FIGS. 13A through 13L are denoted by identical reference characters, and will not be described in detail below.

According to the second embodiment of the present invention, FIGS. 31E, 31F, 31H, and 31K are of particular interest among FIGS. 31A through 31L. As shown in FIG. 31E, a signal which is quasi-representative of an inserting process is of a high level of "1" in a position corresponding to an IN point Pin indicated by the user, i.e., in a GOP, unlike the first embodiment. This is because an image at the start of insert images is an image I2' as an I picture as shown in FIG. 31F. Since the I picture is an image generated by an intraframe-coding process, images in a preceding frame are not required as is the case with the first embodiment.

In a recorded state shown in FIG. 31H, the I picture I2' is not subsampled. This state is a state in which the I picture I2' is not subsampled in the position of time code data LTC5, and image data I2' as the I picture is recorded as forming a track, as can be seen from a recorded track pattern shown in FIG. 31K.

The image data in a final portion of the insert period is processed in the same manner as with the first embodiment.

According to the second embodiment, at the start of the insert images, the I picture is generated from the corresponding image data, and the image data as the I picture is recorded in one of two tracks of the GOP. Therefore, it is not necessary to shift the IN point Pin on the playback side to process an insert image as a B picture as shown in FIGS. 13A through 13L.

FIGS. 32A through 32F are views illustrative of subsampling and coding processes upon recording in the insert editing process shown in FIGS. 31A through 31L and interpolating and decoding processes upon reproducing after the insert editing process. Those parts in FIGS. 32A through 32F which are identical to those shown in FIGS. 14A through 14E and 15A through 15E are neither shown nor described below.

A recording process will be described below with reference to FIGS. 32A, 32B, and 32C. FIG. 32A shows how the insert image I2' shown in FIG. 31F is recorded. FIGS. 32B and 32C are views schematically showing decoding information added to each of subsamples a, b that have been obtained by subsampling.

As shown in FIG. 32A, the insert image I2' is not subsampled, but directly coded and thereafter recorded on a magnetic tape in a recording VTR.

As already described with reference to FIGS. 14A through 14E, the image data of the subsamples a, b are of data structures respectively shown in FIGS. 32B and 32C when they are recorded or transmitted. According to the second embodiment, however, the insert image I2' which has been recorded without being subsampled is simply divided into the subsamples a, b as shown in FIGS. 32B and 32C.

The data structure of the subsample a shown in FIG. 32B is composed of GOP start data GOP at its start, an inter/intra selection signal SEL, edit status flag data EDT, subsample flag data SUB, and a remainder which is all image data of the insert image I2'. The data structure of the subsample b is composed of GOP start data GOP at its start, an inter/intra selection signal SEL, edit status flag data EDT, subsample flag data SUB, and a remainder which is a remaining insert image I2' other than the insert image I2' that is included in the data structure of the subsample a.

The subsampled data, i.e., the image data other than the insert image I2', is divided into subsamples a, b as with the first embodiment. The second embodiment differs from the first embodiment in that the subsample flag data SUB is used as decoding information. If the subsample flag data SUB is "1", then it signifies that the image data is subsampled. If the subsample flag data SUB is "2", then it signifies that the image data is not subsampled, i.e., it is the insert image I2'.

A reproducing process will be described below with reference to FIGS. 32D, 32E, and 32F. FIG. 32D shows how reproduced images V5I', V6B' of the reproduced images shown in FIG. 31I are reproduced. FIGS. 32E and 32F schematically illustrate a string of reproduced data.

* Recovery of an output image V5I'

As shown in FIG. 32D, a reproduced image I2' which has been recorded without being subsampled is recovered as an image V2I', which becomes an output image V5I'.

* Recovery of an output image V6B'

As shown in FIG. 32D, a reproduced image I2' which has been recorded without being subsampled is reproduced. A reproduced image I4' is produced from a reproduced image I4a' of the subsample a and a reproduced image I4b' of the subsample b. A reproduced image B3' is produced from a reproduced image B3a' of the subsample a and a reproduced image B3b' of the subsample b. Using the reproduced image I2' and the reproduced image I4', the reproduced image B3' is recovered and becomes an output image V6B'.

FIG. 32E shows a string of data of the subsample a when reproduced. As shown in FIG. 32E, the data structure of the subsample a when reproduced is composed of, from its start, GOP start data GOP, an inter/intra selection signal SEL, edit status flag data EDT, subsample flag data SUB, image data Ba of the subsample a, GOP start data GOP, an inter/intra selection signal SEL, and image data Ia of the subsample a.

With respect to the I picture I2' which has been recorded without being subsampled, the data structure of the subsample a when reproduced is composed of, from its start, GOP start data GOP, an inter/intra selection signal SEL, edit status flag data EDT, subsample flag data SUB, and image data I2' as the I picture.

FIG. 32F shows a string of data of the subsample b when reproduced. As shown in FIG. 32F, the data structure of the subsample b when reproduced is composed of, from its start, GOP start data GOP, an inter/intra selection signal SEL, edit status flag data EDT, subsample flag data SUB, image data Bb of the subsample b, GOP start data GOP, an inter/intra selection signal SEL, and image data Ib of the subsample b.

With respect to the I picture I2' which has been recorded without being subsampled, the data structure of the subsample b when reproduced is composed of, from its start, GOP start data GOP, an inter/intra selection signal SEL, edit status flag data EDT, subsample flag data SUB, and remaining image data I2' as the I picture other than the image data I2' that is included as the I picture in the data structure of the subsample a.

As described above, for subsampling, coding, and recording new image data in an insert editing process on a magnetic tape on which subsampled and coded image data has already been recorded, if start-of-insert and end-of-insert points that are indicated are not in the boundaries of a GOP, then the end-of-insert point is altered so as to be in a boundary of the GOP, and thereafter the insert editing process is carried out. To record the image data, an insert image as an I picture is recorded, without being subsampled, on one of two tracks corresponding to the GOP at the start-of-insert point, and one subsampled image to be inserted is recorded on one of two tracks corresponding to the GOP at the end-of-insert point. Since the recorded data includes data EDT indicative of whether the recorded image is an inserted image or not and data SUB indicative of whether the recorded image has been subsampled, as well as GOP start data indicative of the start of the GOP and an inter/intra selection signal SEL. Therefore, for recovering the image data recorded on a magnetic tape in a recording VTR upon reproduction, only other image data recorded on the magnetic tape in the recording VTR may be used, and for recovering the insert image data upon reproduction, other insert data may be used.

Consequently, the problem that has already been described, i.e., an image quality degradation due to an erroneous recovery of reproduced images, is completely eliminated, and good reproduced images can be provided at all times. The second embodiment is different from the first embodiment in that because image data as an I picture is recorded without being subsampled at a start-of-insert point, the image data is not generated by interpolation from one subsampled image, and hence the image quality according to the second embodiment is better than the image quality according to the first embodiment. Specific arrangements according to the second embodiment will be described below.

Figure 33:
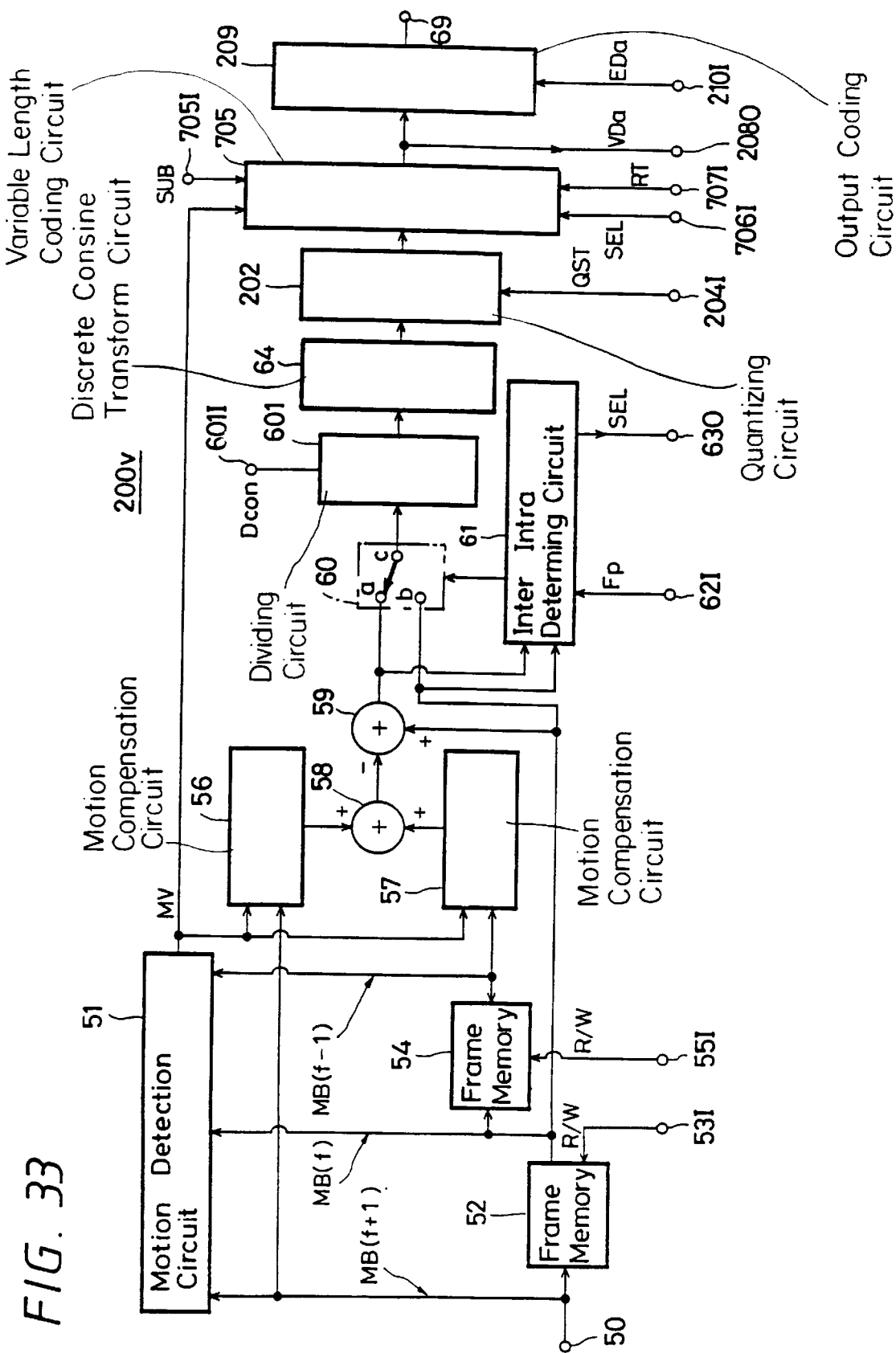
FIG. 33 is a structural diagram showing another example (second embodiment of the image encoder shown in FIG. 16.

FIG. 33 shows another arrangement of the video encoder 200v shown in FIG. 16. Those parts in FIG. 33 which are identical to those shown in FIG. 17 are denoted by identical reference characters, and will not be described in detail below.

The video encoder shown in FIG. 33 differs from the video encoder shown in FIG. 17 as to a dividing circuit 601 and a variable-length coding circuit 705.

The dividing circuit 601 shown in FIG. 33 differs from the dividing circuit 201 shown in FIG. 17 in that it does not divide an image at the start of an insert period, i.e., outputs an I picture as it is, as described above.

The variable-length coding circuit 705 shown in FIG. 33 differs from the variable-length coding circuit 205 shown in FIG. 17 in that it also converts subsample flag data SUB indicative of whether recorded image has been subsampled or not into a variable-length code.

The dividing circuit 601 subsamples differential data as a B picture supplied from the adder 59 through the switch 60 if a division control signal Dcon supplied from the system controller 400 shown in FIG. 16 through an input terminal 601I represents that data is to be subsampled.

Image data of subsamples a, b produced as the B picture by the subsampling process is converted into coefficient data ranging from a DC component to a high-harmonic AC component by the DCT circuit 64, and then supplied to the quantizing circuit 202. The image data of subsamples a, b supplied as the B picture to the quantizing circuit 202 is then quantized on the basis of quantization step data QST supplied from the system controller 400 shown in FIG. 16 through the input terminal 204I.

The quantized image data of subsamples a, b as the B picture is supplied to the variable-length coding circuit 705. The image data of subsample a as the B picture which is supplied to the variable-length coding circuit 705 is supplied, together with image data of the subsample a as an I picture which is successively supplied, as recording data on one track, to the output coding circuit 209 by a recording track signal RT supplied from the system controller 400 through an input terminal 707I, an inter/intra selection signal SEL supplied from the system controller 400 through an input terminal 706I, and subsample flag data SUB supplied from the system controller 400 through an input terminal 705I.

The image data of subsample b as the B picture which is supplied to the variable-length coding circuit 705 is supplied, together with image data of the subsample b as the I picture which is successively supplied, as recording data on one track, to the output coding circuit 209 by a recording track signal RT supplied from the system controller 400 through the input terminal 707I, an inter/intra selection signal SEL supplied from the system controller 400 through the input terminal 706I, and a subsample flag data SUB supplied from the system controller 400 through the input terminal 705I.

To the image data of the subsample a as the B and I pictures supplied to the output coding circuit 209 and the image data of the subsamples b as the B and I pictures supplied to the output coding circuit 209, there are added decoding information EDa, then inner and outer parity bits, and a synchronizing code supplied from the system controller 400 through the input terminal 210I. Thereafter, the output coding circuit 209 outputs the image data of the subsample a as the B and I pictures with the added data and then the image data of the subsample b as the B and I pictures with the added data. These image data are successively supplied through the switching circuit 13 shown in FIG. 16 to the recording/reproducing head 15, by which they are recorded on slanted tracks on the magnetic tape 14.

If a division control signal Dcon supplied from the system controller 400 shown in FIG. 16 through the input terminal 601I represents that data is not to be subsampled, then the dividing circuit 601 outputs, without subsampling, image data as an I picture supplied from the frame memory 52 through the switch 60.

The image data as the I picture which is outputted, without being subsampled, from the dividing circuit 601, is converted into coefficient data ranging from a DC component to a high-harmonic AC component by the DCT circuit 64, and then supplied to the quantizing circuit 202. The image data supplied as the I picture to the quantizing circuit 202 is then quantized on the basis of quantization step data QST supplied from the system controller 400 shown in FIG. 16 through the input terminal 204I.

The quantized image as the I picture is supplied to the variable-length coding circuit 705. The image data as the I picture which is supplied to the variable-length coding circuit 705 is supplied as recording data on one track to the output coding circuit 209 by a recording track signal RT supplied from the system controller 400 through the input terminal 707I, an inter/intra selection signal SEL supplied from the system controller 400 through the input terminal 706I, and subsample flag data SUB supplied from the system controller 400 through the input terminal 705I.

To the image data as the I picture supplied to the output coding circuit 209, there are added decoding information EDa, then inner and outer parity bits, and a synchronizing code, etc. supplied from the system controller 400 through the input terminal 210I. Thereafter, the output coding circuit 209 outputs recording data. The recording data outputted from the output coding circuit 209 is supplied through the switching circuit 13 shown in FIG. 16 to the recording/reproducing head 15, by which it is recorded on slanted tracks on the magnetic tape 14.

FIGS. 34A through 34E show an internal arrangement of the dividing circuit 601 and are illustrative of its operation.

The dividing circuit 601 shown in FIG. 34A comprises memories 601b, 601e for storing image data Da supplied from the switch 60 shown in FIG. 17 through an input terminal 601a based on a write enable signal WE and an address signal AD, and a memory controller 601f for supplying a write enable signal WE, a read enable signal RE, and an address signal AD to the memories 601b, 601e based on a division control signal Dcon supplied from the system controller 400 shown in FIG. 16 through an input terminal 601d.

FIGS. 34B1 and 34B2 show the division control signal Dcon. FIG. 34C shows the read enable signal RE supplied from the memory controller 601f to the memories 601b, 601e. FIG. 34D shows the read enable signal RE supplied from the memory controller 601f to the memories 601b, 601e. FIG. 34E shows image data Da read from the memories 601b, 601e and outputted through an output terminal 601c. In FIG. 34E, open triangles represent pixel data of the subsample a and open triangles represent pixel data of the subsample b.

The division control signal Dcon is composed of a low-order bit of the division control signal Dcon shown in FIG. 34B1 and a high-order bit of the division control signal Dcon shown in FIG. 34B2. The address signal AD is incremented in each half period of the read enable signal RE.

If the low-order bit of the division control signal Dcon shown in FIG. 34B1 is of a high level of "1" and the high-order bit of the division control signal Dcon shown in FIG. 34B2 is of a high level of "1", then the memory controller 601f renders active the read enable signals RE shown in FIGS. 34C and 34D which are supplied to the memory 601b or 601e for thereby alternately reading odd- and even-numbered pixel data from the memory 601b or 601e.

If the low-order bit of the division control signal Dcon shown in FIG. 34B1 is of a high level of "1" and the high-order bit of the division control signal Dcon shown in FIG. 34B2 is of a low level of "0", then the memory controller 601f renders active only the read enable signal RE shown in FIG. 34C which is supplied to the memory 601b or 601e for thereby reading only odd-numbered pixel data from the memory 601b or 601e.

If the low-order bit of the division control signal Dcon shown in FIG. 34B1 is of a low level of "0" and the high-order bit of the division control signal Dcon shown in FIG. 34B2 is of a high level of "1", then the memory controller 601f renders active only the read enable signal RE shown in FIG. 34d which is supplied to the memory 601b or 601e for thereby reading only even-numbered pixel data from the memory 601b or 601e.

Image data Da supplied through the input terminal 601a is first stored into the memory 601b by the write enable signal WE and the address signal AD from the memory controller 601f. When the storage of the image data Da into the memory 601b is finished, image data Da successively supplied through the input terminal 601a is stored into the memory 601e by the write enable signal WE and the address signal AD from the memory controller 601f.

If the low-order bit of the division control signal Dcon shown in FIG. 34B1 is of a high level of "1" and the high-order bit of the division control signal Dcon shown in FIG. 34B2 is of a high level of "1", then the memory controller 601f supplies the read enable signal RE shown in FIG. 34C and the address signal AD to the memory 601b, thereby reading odd-numbered pixel data stored in the memory 601b. At the same time that the odd-numbered pixel data stored is read, the memory controller 601f supplies the read enable signal RE shown in FIG. 34D and the address signal AD to the memory 601b, thereby reading even-numbered pixel data stored in the memory 601b. As a result, as shown in FIG. 34E, odd- and even-numbered pixel data stored in the memory 601b are outputted in an alternate string of pixel data.

If the low-order bit of the division control signal Dcon shown in FIG. 34B1 is of a high level of "1" and the high-order bit of the division control signal Dcon shown in FIG. 34B2 is of a low level of "0", then the memory controller 601f supplies the read enable signal RE shown in FIG. 34C and the address signal AD to the memory 601b, thereby reading odd-numbered pixel data stored in the memory 601b. At the same time that the odd-numbered pixel data stored is read, the memory controller 601f supplies the read enable signal RE shown in FIG. 34D and the address signal AD to the memory 601b. Since the read enable signal RE shown in FIG. 34D is not active during this period, even-numbered pixel data stored in the memory 601b is not read. As a consequence, as shown in FIG. 34E, only odd-numbered pixel data stored in the memory 601b are outputted.

If the low-order bit of the division control signal Dcon shown in FIG. 34B1 is of a low level of "0" and the high-order bit of the division control signal Dcon shown in FIG. 34B2 is of a high level of "1", then the memory controller 601f supplies the read enable signal RE shown in FIG. 34C and the address signal AD to the memory 601b. Since the read enable signal RE shown in FIG. 34C is not active during this period, odd-numbered pixel data stored in the memory 601b is not read. At the same time, the memory controller 601f supplies the read enable signal RE shown in FIG. 34D and the address signal AD to the memory 601b, thereby reading even-numbered pixel data stored in the memory 601b. As a consequence, as shown in FIG. 34E, only even-numbered pixel data stored in the memory 601b are outputted.

When the reading of the image data Da stored in the memory 601b is finished and the storage of the image data Da into the memory 601e is finished, the memory controller 601f starts storing image data Da into the memory 601e and also starts reading image data Da from the memory 601e in the same manner as described above. Each of the memories 601b, 601e may have a storage capacity of 1 macro block or one frame.

Figure 35:
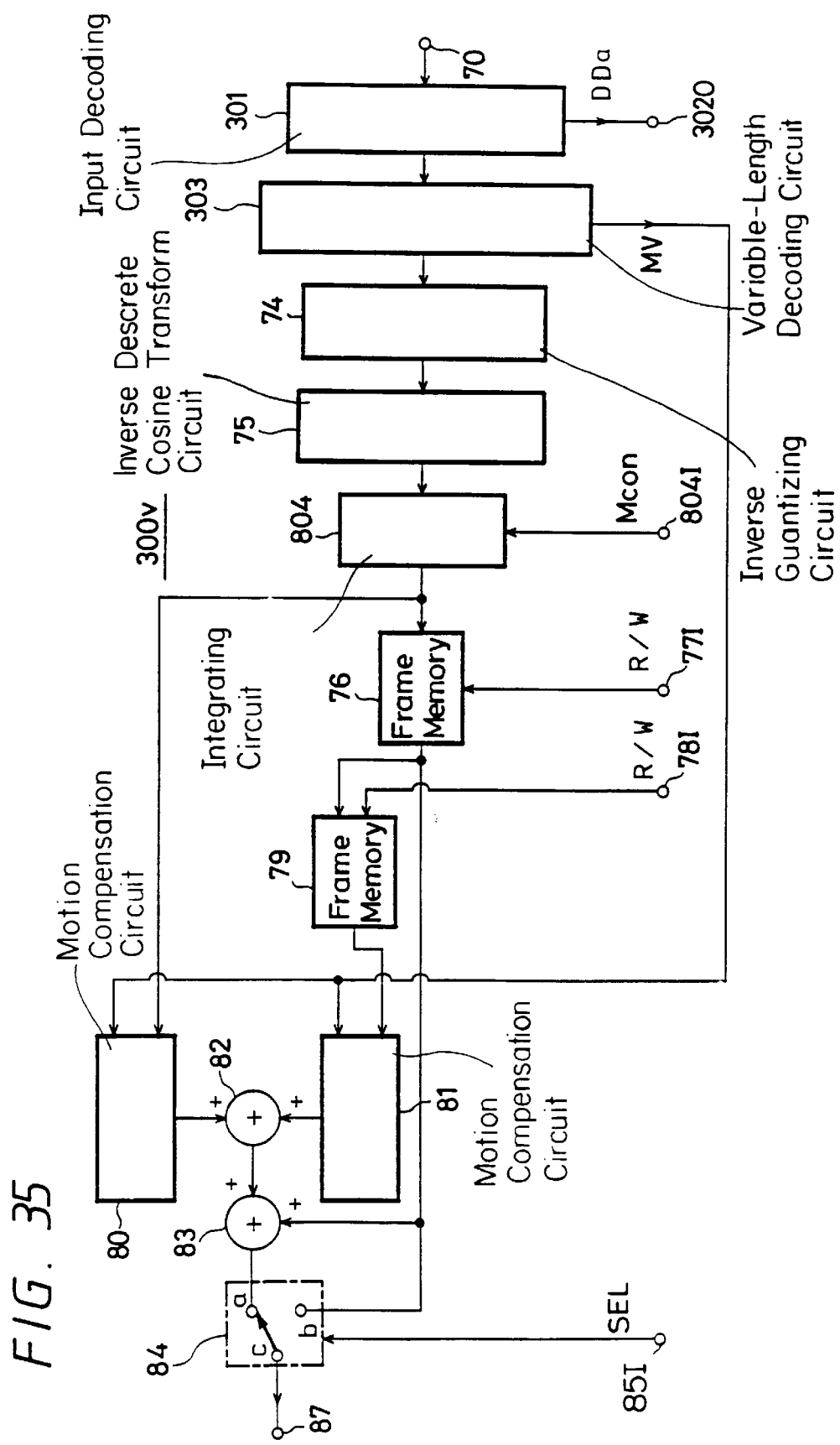
FIG. 35 is a structural diagram showing another example (second embodiment of the image encoder shown in FIG. 16.

FIG. 35 shows another arrangement of the video decoder 300V shown in FIG. 16. Those parts in FIG. 35 which are identical to those shown in FIG. 19 are denoted by identical reference characters, and will not be described in detail below.

The video encoder shown in FIG. 35 differs from the video encoder shown in FIG. 19 as to processing effected by a combining circuit 804 and in that the interpolating circuits 306, 307, 308 shown in FIG. 19 are not employed.

The combining circuit 804 combines decoded image data from the IDCT circuit 75 based on a combination control signal Mcon supplied from the system controller 400 shown in FIG. 16 through an input terminal 804I. The term "combines" used here means to reconstruct one item of image data from image data of a subsample a and image data of a subsample b. However, as already described above, if either one of subsamples a, b is not recorded, image data of the subsample b or a which is not available is produced by interpolation from reproduced image data of the subsample a or b, and one item of image data is produced from the image data of the subsample a or b produced by interpolation and the reproduced image data of the subsample a or b. The combining circuit 804 outputs an image at the start of an insert period without combining its image data because the image at the start of the insert period has not been subsampled when recorded. The combination control signal Mcon is a control signal required by the combining circuit 804 to carry out the above combining process.

Operation of the combining circuit 804 will be described below. The details of the operation which are the same as those of the operation already described with reference to FIG. 19 will not be described below.

Image data decoded by the IDCT circuit 75 are supplied to the combining circuit 804. If the image data supplied to the combining circuit 804 are both image data of subsamples a, b, then the combining circuit 804 mixes and outputs the image data based on the combination control signal Mcon supplied through the input terminal 804I. If the image data supplied to the combining circuit 804 is only image data of a subsample a or b, then the combining circuit 804 interpolates the image data and outputs one item of image data. If the image data supplied to the combining circuit 804 is image data as an I picture at the start of an insert period, then the combining circuit 804 outputs the image data as it is. The image data from the combining circuit 804 is supplied to the frame memory 76 and the motion compensating circuit 80.

At the time image data is stored in the frame memories 76, 79, if the image data stored in the frame memory 76 is image data in a present frame, then the image data stored in the frame memory 79 is image data in a preceding frame, and the image data outputted from the combining circuit 804 is image data in a succeeding frame.

Recovery of image data in a present frame as a B picture will first be described below. For the image data recovery, the movable contact c of the switch 84 is connected to the inter-side fixed contact a by an inter/intra control signal SEL supplied from the system controller 400 shown in FIG. 16 through the input terminal 85I. Image data in a succeeding frame outputted from the combining circuit 804 is supplied to the motion compensating circuit 80. Image data in a preceding frame read from the frame memory 79 is supplied to the motion compensating circuit 81.

The motion compensating circuit 80 extracts macro block data represented by motion vector data MV from the image data in the succeeding frame outputted from the combining circuit 804, and supplies the extracted macro block data to the adder 82. The motion compensating circuit 81 extracts macro block data represented by motion vector data MV from the image data in the preceding frame outputted from the frame memory 79, and supplies the extracted macro block data to the adder 82. The adder 82 adds the macro block data in the succeeding frame from the motion compensating circuit 80 and the macro block data in the preceding frame from the motion compensating circuit 81, and averages the data by multiplying them by a coefficient of "½" with an internal ½ multiplier.

The adder 83 adds the image data (differential data) in the present frame from the frame memory 76 and macro block data outputted as average data from the adder 82, thereby recovering original macro block data. The recovered macro block data is supplied through the switch 84 and the output terminal 86 to the playback signal processing circuit 22 shown in FIG. 16.

Recovery of image data in a present frame as an I picture other than an image at the start of an insert period will be described below. For the image data recovery, the movable contact c of the switch 84 is connected to the intra-side fixed contact b by an inter/intra control signal SEL supplied from the system controller 400 shown in FIG. 16 through the input terminal 85I. Now, signals pass through the frame memory 76 and the switch 84. Image data produced by combining image data of subsamples a, b as an I picture, or image data of the subsample a or b, and image data D of the subsample a or b produced by interpolation are combined into image data, which is supplied as output image data to the playback signal processing circuit 22 shown in FIG. 16 through the output terminal 86.

Recovery of image data in a present frame as an I picture of an image at the start of an insert period will be described below. For the image data recovery, the movable contact c of the switch 84 is connected to the intra-side fixed contact b by an inter/intra control signal SEL supplied from the system controller 400 shown in FIG. 16 through the input terminal 85I. Now, signals pass through the frame memory 76 and the switch 84. Image data as an I picture which has not been subsampled when recorded is outputted from the combining circuit 804 without being combined thereby, and thereafter supplied as output image data to the playback signal processing circuit 22 shown in FIG. 16 through the output terminal 86.

Figure 36:
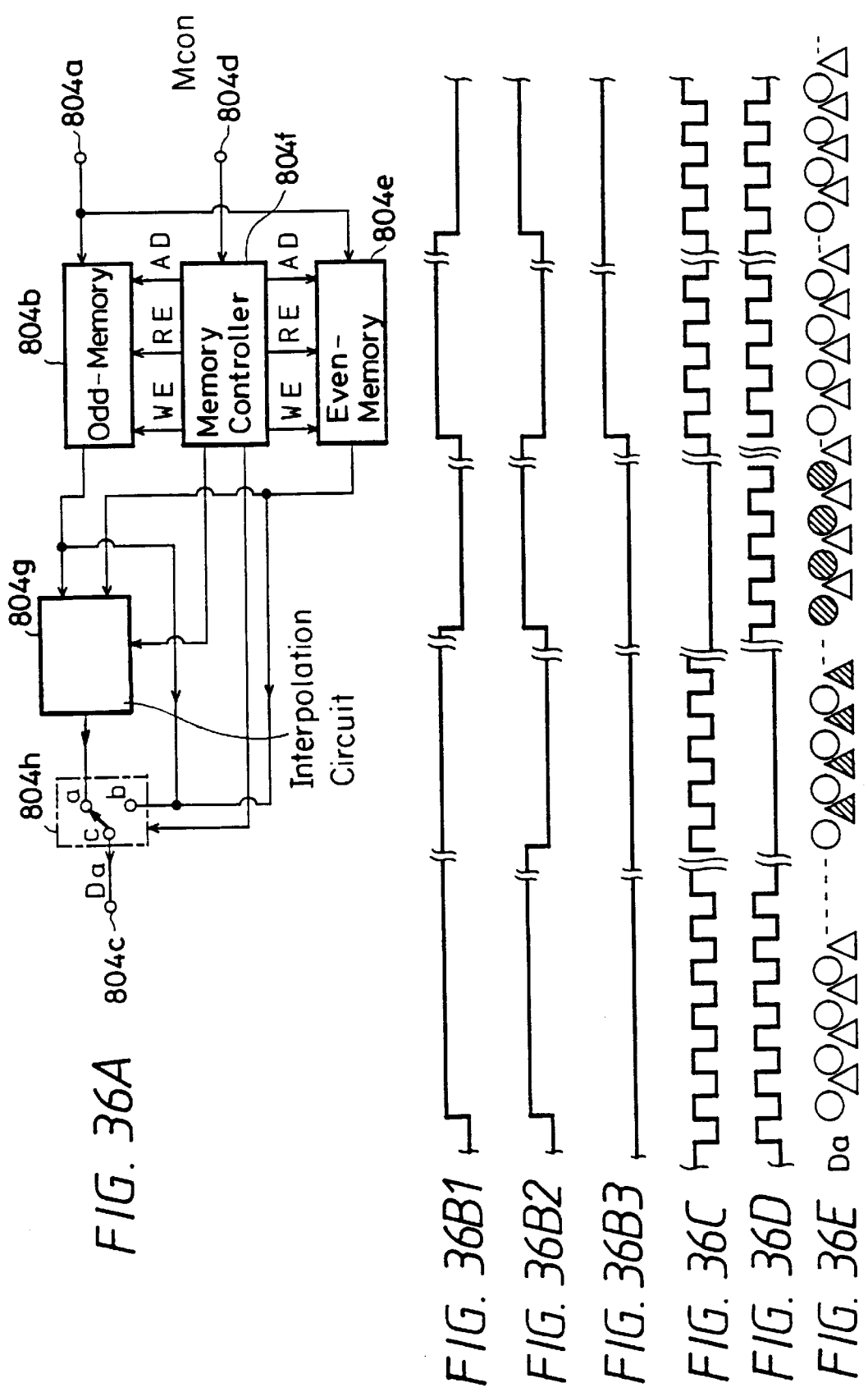

FIG. 36 is a diagram used to explain an inner arrangement of the integrating circuit shown in FIG. 35 and an operation thereof.

The integrating circuit 804 shown in FIG. 36A includes an odd-number memory 804b and an even-number memory 804e for storing image data Da as the subsample a or the subsample b supplied from the IDCT circuit 75 shown in FIG. 19 through the input terminal 804a or image data Da, which are not subsampled, as the I picture at the head of the insertion period therein based on the write enable signal WE and the address signal AD from the system controller 400, a controller 804f for supplying the write enable signal WE, the read enable signal RE and the address signal AD to the odd-number memory 804b and the even-number memory 804e based on the integration control signal Mcon supplied from the system controller 400 shown in FIG. 16 through the input terminal 804d, the interpolation circuit 804g for carrying out interpolation processing based on the image data formed of odd-numbered and even-numbered pixel data respectively read from the odd-number memory 804b and the even-number memory 804e, and the switch 804h for selectively outputting the interpolated image data from the interpolation circuit 804g and the image data read from the odd-number and even-number memories 804b, 804e.

The odd-number memory 804b is used to store the image data of the subsample a and a part of the image data as the I picture at the head of the insertion period. The even-number memory 804e is used to store the image data of the subsample b and the image data of the rest of I pictures, other than the I picture stored in the odd-number memory 804b, of the image data as the I picture at the head of the insertion period.

If there are only the image data of the subsample a, the interpolation circuit 804g obtains the image data of the subsample b based on the image data of the subsample a similarly to the interpolation circuits 306, 307 and 308. The interpolation circuit 804g generates one image data from the image data of the subsample a and the image data of the subsample obtained by the interpolation processing. If there are only the image data of the subsample a, the interpolation circuit 804g obtains the image data of the subsample b based on the image data of the subsample a similarly to the interpolation circuits 306, 307 and 308. The interpolation circuit 804g generates one image data from the image data of the subsample a and the image data of the subsample obtained by the interpolation processing.

The operation of the integrating circuit will be described. The operation will be described with reference to FIG. 36B1, FIG. 36B2, FIG. 36B3, FIG. 36D, FIG. 36E. FIG. 36B1, FIG. 36B2 and FIG. 36B3 show the integration control signal Mcon. FIG. 36C shows the read enable signal RE supplied from the controller 804f to the odd-number memory 804b. FIG. 36D shows the read enable signal RE supplied from the controller 804f to the even-number memory 804b. FIG. 36E shows the image data read from the odd-number memory 804b and the even-number memory 804e or the image data Da output from the interpolation circuit 804 through the switch 804h and the output terminal 804c. In FIG. 36E, a symbol marked by an open circle depicts pixel data of the subsample a. A symbol marked by a open triangle depicts the pixel data of the subsample b. A symbol marked by an open circle with hatched lines depicts the pixel data of the image data of the subsample a generated by interpolation processing using the pixel data of the subsample b. A symbol marked by a hatched open triangle depicts the pixel data of the image data of the subsample b generated by the interpolation processing using the image data of the subsample b.

The integration control signal Mcon is a control signal of 3 bits. FIG. 36B1 shows lower-order bits of the integration control signal Mcon. FIG. 36B2 shows middle-order bits of the integration control signal Mcon. FIG. 36B3 shows higher-order bits of the integration control signal Mcon. If a value of the lower-order bits of the integration control signal Mcon is at high "1" level, a value of the middle-order bits of the integration control signal Mcon is at high "1" level and a value of the higher-order bits of the integration control signal Mcon is at low "0" level, then there are both of the image data of the subsamples a and b.

If a value of the lower-order bits of the integration control signal Mcon is at high "1" level, a value of the middle-order bits of the integration control signal Mcon is at low "0" level and a value of the higher-order bits of the integration control signal Mcon is at low "0" level, then there are only the image data of the subsample a.

If a value of the lower-order bits of the integration control signal Mcon is at low "0" level, a value of the middle-order bits of the integration control signal Mcon is at high "1" level and a value of the higher-order bits of the integration control signal Mcon is at low "0" level, then there are only the image data of the subsample b.

If a value of the lower-order bits of the integration control signal Mcon is at high "1" level, a value of the middle-order bits of the integration control signal Mcon is at low "0" level and a value of the higher-order bits of the integration control signal Mcon is at high "1" level, then the subsample processing is not carried out upon recording and the odd-number memory 804b shown in FIG. 36 is accessed.

If a value of the lower-order bits of the integration control signal Mcon is at low "0" level, a value of the middle-order bits of the integration control signal Mcon is at high "1" level and a value of the higher-order bits of the integration control signal Mcon is at high "1" level, then the subsample processing is not carried out upon recording and the even-number memory 804e shown in FIG. 36 is accessed.

Based on the write enable signal WE and the address signal AD supplied from the controller 804f, the image data Da supplied through the input terminal 804a are stored in the odd-number memory 804b if they are the image data of the subsample a, and the image data Da supplied through the input terminal 804a are stored in the even-number memory 804e if they are the image data of the subsample b. The image data as the I picture, which are not subsampled upon recording and are located at the head of the insertion period, successively stored in the odd-number memory 804b and the even-number memory 804e.

When the image data Da of the subsample a and the image data of the subsample b are stored in the odd-numbered memory 804b and the even-numbered memory 804e, integrating processing is started. If both of the image data of the subsample a and subsample b are coexistent, as shown in FIGS. 36B1, 36B2 and 36B3, the lower bit and the intermediate bit of the integrating control circuit Mcon go to high "1" level and the upper bit of the same goes to low "0" level. In this case, during this operation, the controller 804f supplies the read enable signal RE and the address signal AD shown in FIG. 36C to the odd-numbered memory 804b, and also supplies the read enable signal RE and the address signal AD shown in FIG. 36D to the even-numbered memory 804e. Further, the controller 804f supplies a switching control signal to the switch 804h so that the switch 804h connects the movable contact c to the fixed contact b on the side of non-interpolation side.

The read enable signal RE is set to be active when it is in high "1" level. The address signal AD is incremented in its value at every half period of the read enable signal RE. Therefore, as shown in FIG. 36, the image data of the subsample a stored in the even-numbered memory 804b and the image data of the subsample b stored in the even-numbered memory 804e are alternately read. As a result they are integrated and output through the switch 804h.

Next, if there is only image data of the subsample a, as shown in FIG. 36B1, the lower bit of the integrating control signal Mcon goes to high "1" level while as shown in FIG. 36B2 and FIG. 36B3, the intermediate and the upper bits go to low "0" level. In this case, during this operation, the controller 804f supplies the read enable signal RE and the address signal AD shown in FIG. 36C to the odd-numbered memory 804b. Further, the controller 804f supplies the switching control signal to the switch 804h so that the switch 804h connects the movable contact c to the fixed contact a on the side of interpolation side.

The read enable signal RE is set to be active when it is in high "1" level. The address signal AD is incremented in its value at every half period of the read enable signal RE. Therefore, the image data of the subsample a stored in the odd-numbered memory 804b is read and supplied to the interpolation circuit 804g. The interpolating circuit 804g produces image data of the subsample b by an interpolation processing on the basis of the image data of the subsample a read from the odd-numbered memory 804b. Thus, one image data is created with the image data of the subsample a and the image data of the subsample b. Then, as shown in FIG. 36E, the image data arranged as one picture by applying the interpolation processing in the interpolation circuit 804g is output through the switch 804h.

Next, if there is only image data of the subsample b, as shown in FIG. 36B1, the lower bit of the integrating control signal Mcon goes to low "0" level, as shown in FIG. 36B2, the intermediate bit goes to high "1" level and as shown in FIG. 36B3, the upper bit goes to low "0" level. In this case, during this operation, the controller 804f supplies the read enable signal RE and the address signal AD shown in FIG. 36D to the even-numbered memory 804e. Further, the controller 804f supplies the switching control signal to the switch 804h so that the switch 804h connects the movable contact c to the fixed contact a on the side of interpolation side.

The read enable signal RE is set to be active when it is in high "1" level. The address signal AD is incremented in its value at every half period of the read enable signal RE. Therefore, the image data of the subsample b stored in the even-numbered memory 804e is read and supplied to the interpolation circuit 804g. The interpolating circuit 804g produces image data of the subsample a by an interpolation processing on the basis of the image data of the subsample a read from the even-numbered memory 804e. Thus, one image data is created with the image data of the subsample b and the image data of the subsample a. Then, as shown in FIG. 36E, the image data arranged as one picture by applying the interpolation processing in the interpolation circuit 804g is output through the switch 804h.

If the image data to be processed is image data that was not subjected to the subsample processing upon the recording, i.e., the image data as an I-picture that is image data of the head of the insert period, first, as shown in FIG. 36B1 the lower bit goes to high "1" level, the intermediate bit of the integrating control signal Mcon goes to low "0" level as shown in FIG. 36B2, while as shown in FIG. 36B3, the upper bit of the integrating control signal Mcon goes to high "1" level. In this case, during this operation, the controller 804f supplies the read enable signal RE and the address signal AD shown in FIGS. 36C and 36D to the odd-numbered memory 804b. Further, the controller 804f supplies the switching control signal to the switch 804h so that the switch 804h connects the movable contact c to the fixed contact b on the side of non-interpolation side.

The read enable signal RE is set to be active when it is in high "1" level. The address signal AD is incremented in its value at every half period of the read enable signal RE. Therefore, as shown in FIG. 36E, pixel data of image data which has not been subjected to subsampling as an I-picture stored in the odd-numbered memory 804b is sequentially read and output through the switch 804h.

Next, a shown in FIG. 36B1, the lower bit of the integrating control signal Mcon goes to low "0" level and as shown in FIGS. 36B2 and 36B3, the intermediate bit and upper bit of the integrating control signal Mcon go to high "1" level. In this case, during this operation, the controller 804f supplies the read enable signal RE and the address signal AD shown in FIGS. 36C and 36D to the even-numbered memory 804e. Further, the controller 804f supplies the switching control signal to the switch 804h so that the switch 804h connects the movable contact c to the fixed contact b on the side of non-interpolation side.

The read enable signal RE is set to be active when it is in high "1" level. The address signal AD is incremented in its value at every half period of the read enable signal RE. Therefore, as shown in FIG. 36E, pixel data of image data which has not been subjected to subsampling as an I-picture stored in the even-numbered memory 804e is sequentially read and output through the switch 804h.

By the way, the memory capacity of the odd-numbered memory 804b and the even-numbered memory 804e may be set to one macroblock amount or one frame amount.

Figure 37:
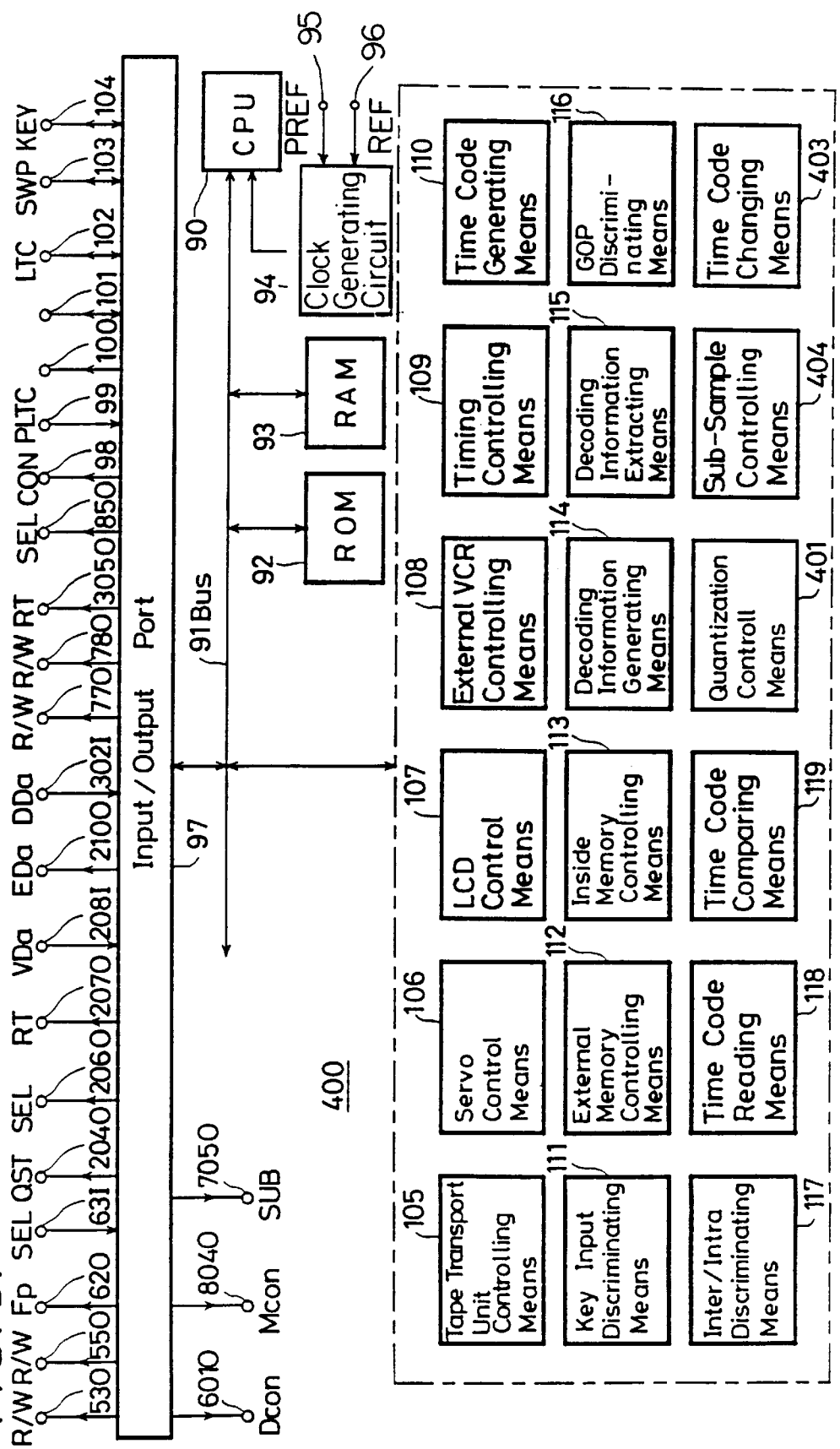
FIG. 37 is a structural diagram showing another example (second embodiment) of an inner arrangement of the system controller shown in FIG. 16.

FIG. 37 is a structural diagram showing another arrangement of the system controller 400 shown in FIG. 16. In FIG. 37, like parts and units corresponding to those shown in FIG. 21 are marked with the same reference numerals and need not to be described in detail.

In the arrangement shown in FIG. 37, a unit different from its equivalent in the system controller shown in FIG. 21 is a subsample controlling means 404. Contents of a division control signal Dcon and an integration control signal Mcon are different from those shown in FIG. 21. While subsample flag data SUB is not used in the arrangement shown in FIG. 21, it is used.

When data are encoded, the subsample controlling means 404 supplies the division control signal Dcon described with reference to FIG. 34 through the output terminal 61O to the division circuit 201 shown in FIG. 33 based on the inter/intra selection signal SEL, and the recording track signal RT generated by the tape transport unit controlling means 105 based on the drum switching pulse SWP supplied from the tape transport unit 14 shown in FIG. 16 through the switching circuit 13 and the input/output terminal 103.

When data are decoded, the subsample controlling means 404 obtains the integration control information Mcon shown in FIG. 36 based on the recording track signal RT generated by the tape transport unit controlling means 105 based on the drum switching pulse SWP supplied from the tape transport unit 14 shown in FIG. 16 through the switching circuit 13 and the input/output terminal 103, and the GOP head data GOP, the edition state flag data EDT, the inter/intra control signal SEL and the subsample flag data SUB of the decoding information DDa supplied from the input decoding circuit 301 shown in FIG. 35 through the input terminal 302I. The subsample controlling means 404 supplies the integration control signal Mcon through the output terminal 804O to the integrating circuit 804 shown in FIG. 35.

There will be described how the subsample controlling means 404 generates the integration control signal Mcon shown in FIG. 36. When a new image is recorded by the insert edition, of all the newly recorded image data, image data as the I picture which is image data at the head thereof are recorded together with the GOP head data GOP indicating the head of the GOP, the edition state flag data EDT, the inter/intra selection signal SEL and the subsample flag data SUB. Thus, when data are reproduced, the subsample controlling means 404 recognizes input reproduced data of each track based on the recording track signal RT, recognizes data at the head of the GOP based on the head data of the GOP, and recognizes that data of a reproduced track are image data as the I picture newly recorded by the insert edition on the magnetic tape 17 of the recording-side VCR 10 without being subsampled, based on the edition state flag data EDT and the subsample flag data SUB.

The above recognition may be understood easily with reference to FIG. 31 and so on In this embodiment, as shown in FIG. 31, the head GOP in the insertion period is formed of image data of the subsample a originally recorded on the magnetic tape 17 of the recording-side VCR 10, and image data as the I picture newly recorded by the insert edition. These image data are recorded on different tracks. Therefore, based on the edition state flag data EDT and the subsample flag data SUB, the subsample controlling means 404 can recognize that the image data originally recorded on the magnetic tape 17 of the recording-side VCR 10 are the image data of the subsample a and the image data newly recorded by the insert edition are image data as the I picture recorded without being subsampled.

The image data of the sub sample a originally recorded on the magnetic tape 17 of the recording-side VCR 10 are formed of those of the B picture and the I picture. The image data as the I picture newly recorded by the insertion edition are formed of image data of the I picture. The subsample controlling means 404 recognizes the boundary portion between the two image data based on the inter/intra selection signal SEL. The integration control signal Mcon is generated by the subsample controlling means 404 based on the above-described recognition.

As shown in FIG. 31, the GOPs other than the head and end GOPs in the insertion period are formed of the image data of the subsample a and the image data of the subsample b both of which are newly recorded by the insert edition. These image data are recorded on different tracks. Therefore, based on the edition state flag data EDT and the subsample flag data SUB, the subsample controlling means 404 can recognize that image data of one track of the two tracks are the image data of the subsample a and image data of the other track thereof are the image data of the subsample b.

The image data of the subsample a forming the one track and the image data of the subsample b forming the other track are each formed of the B picture and the I picture. The subsample controlling means 404 recognizes the boundary portion between the two image data based on the inter/intra selection signal SEL.

As the above description clearly shows, since the subsample flag data SUB are data indicating whether or not the data are subsampled, it is possible that, based on the subsample flag data SUB, the subsampling controlling means 404 recognizes that the image data at the head of the insertion period are not subsampled.

As shown in FIG. 31, the GOP at the end of the insertion period is formed of the image data of the subsample a originally recorded on the magnetic tape 17 of the recording-side VCR 10 and the image data of the subsample b newly recorded by the insertion edition. These image data are recorded on different tracks. Therefore, based on the edition state flag data EDT and the subsample flag data SUB, the subsample controlling means 404 can recognize the image data originally recorded on the magnetic tape 17 of the recording-side VCR 10 are the image data of the subsample a and the image data newly recorded by the insertion edition are the image data of the subsample b.

The image data of the subsample a originally recorded on the magnetic tape 17 of the recording-side VCR 10 and the image data of the subsample b newly recorded by the insertion edition are each formed of the B picture and the I picture. The subsample controlling means 404 recognizes the boundary portion between the two image data based on the inter/intra selection signal SEL.

The control operations of the system controller 400 shown in FIG. 37 will be described with reference to FIG. 38 and FIG. 39. Units for mainly carrying out the control operations are the above-mentioned means in charge of respective functions of the CPU 90. In the following description, the terminals and the input/output port 97 shown in FIG. 37 will not be mentioned, e.g., words "through the input/output terminal 104 and the input/output port 97" and the like will not be described since they has already been described and long sentences prevent the contents of the control operations of the respective means for mainly carrying out the control operations from being understood.

In the second embodiment, a routine including processings different from those in the first embodiment is the reproduction-side setting processing routine, the recording-side setting processing routine and the reproducing processing routine. In order to facilitate description, only the reproducing processing routine are shown in flowcharts in FIGS. 38, 39 and only processings in the reproduction-side setting processing routine and the recording-side setting processing routine which are different from those in the first embodiment will be described.

Figure 38:
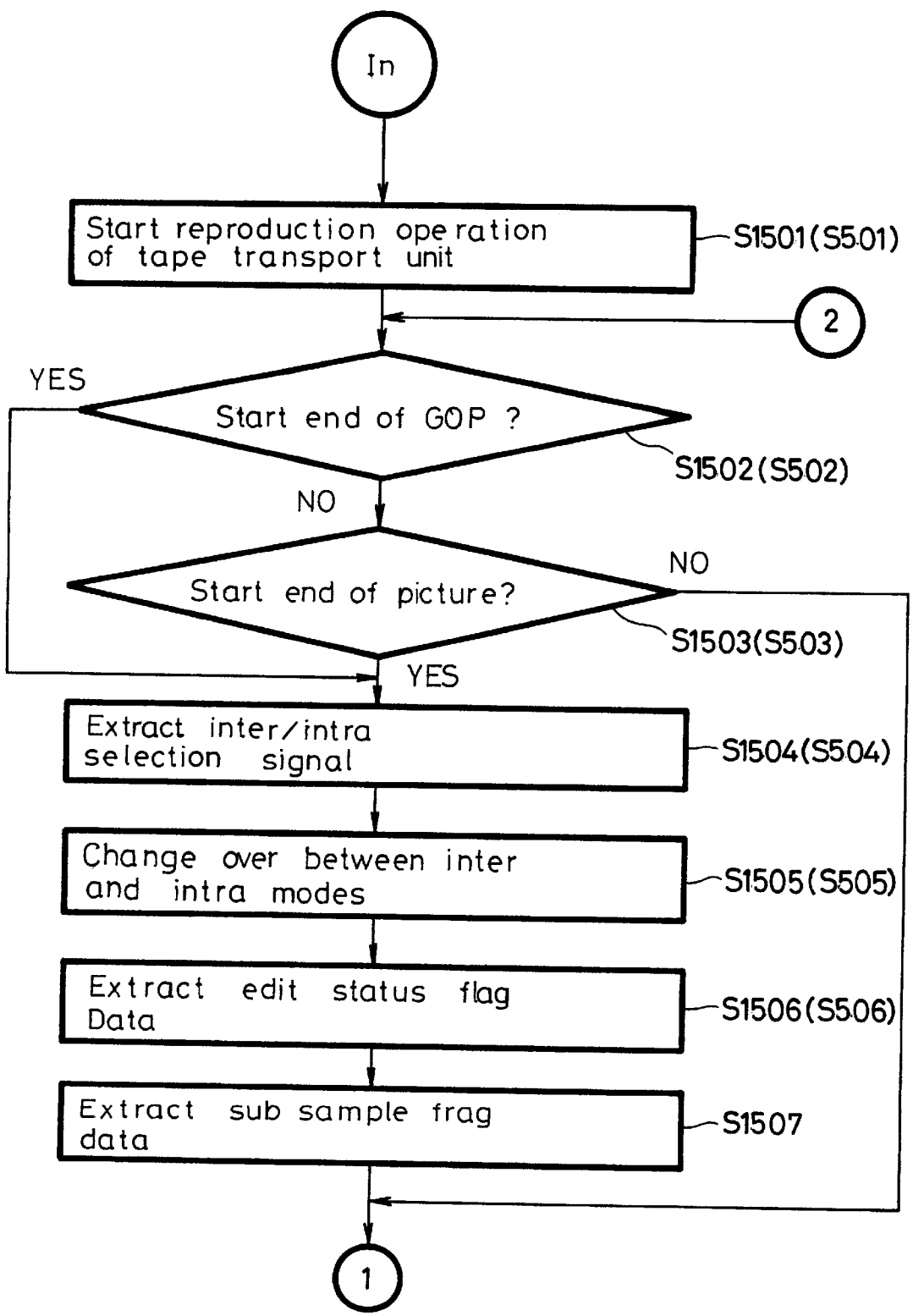
FIG. 38 is a flowchart for explaining the control operation carried out in accordance with another example (second embodiment) of the reproducing process routine shown in FIG. 22.
Figure 39:
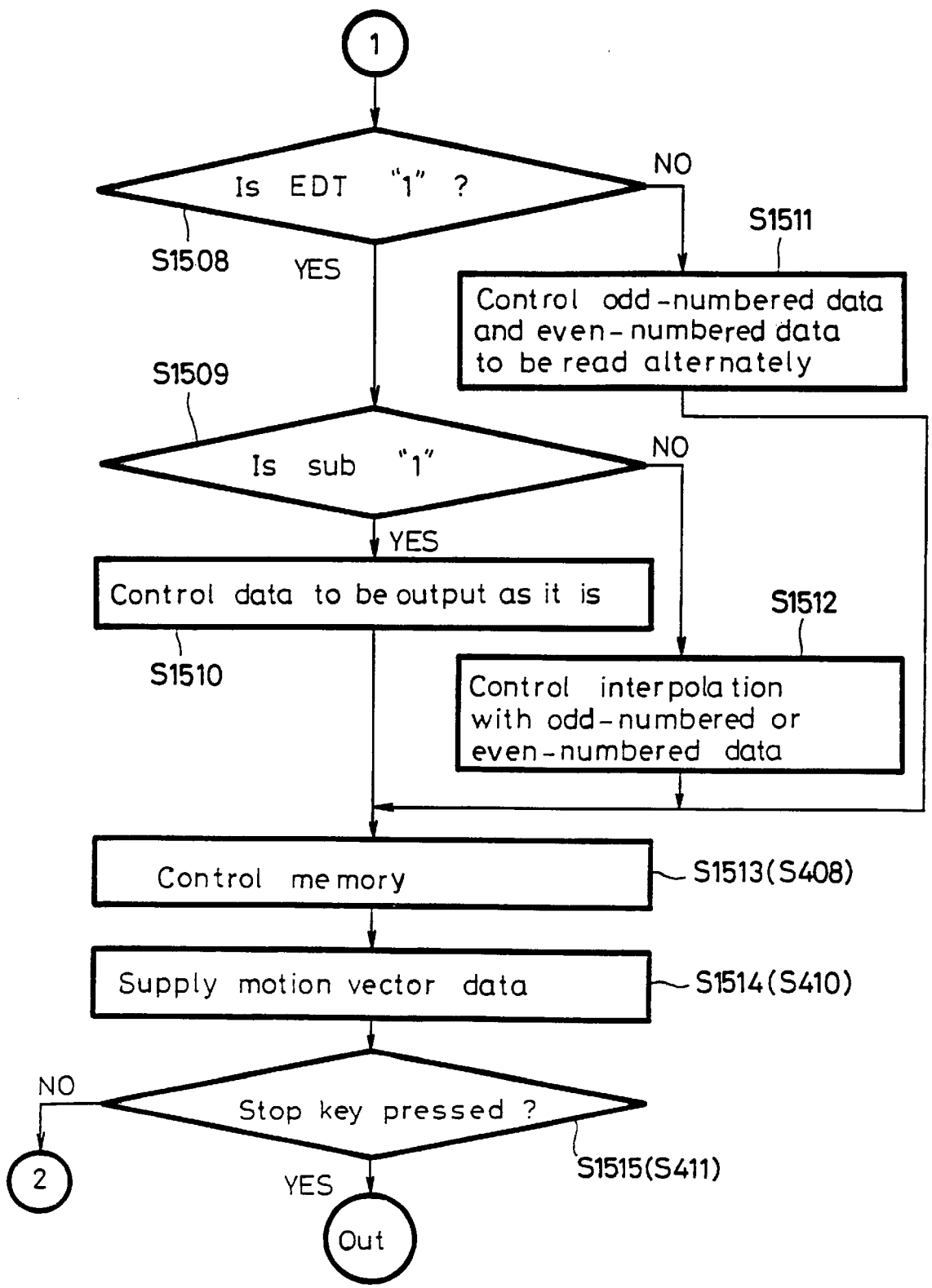
FIG. 39 is a flowchart for explaining the control operation carried out in accordance with another example (second embodiment) of the reproducing process routine shown in FIG. 22.

In the flowcharts shown in FIGS. 38, 39, steps similar or substantially similar to those of the flowchart shown in FIGS. 22–30 are marked with parentheses and the same reference numerals therein as those of the corresponding steps of the flowchart shown in FIG. 30 and need not be described in detail by substituting description of the corresponding steps of the flowchart shown in FIG. 30 therefor. While the description of the corresponding steps is substituted, the block shown in FIG. 37 plays a main role of the control operations.

In this embodiment, in step S353 of the flowchart shown in FIG. 24, the data in response to the pressed key are stored in the memory not as the time code data pin of the temporary in-point but time code data Pin of the actual in-point.

In this embodiment, in step S406 shown in FIG. 26, not the time code data pin of the temporary in-point but the time code data Pin of the actual in-point are read out from the memory.

In this embodiment, the processings in steps S407 and S408 of the flowchart shown in FIG. 26 is necessary.

FIGS. 38 and 39 are flowcharts used to explain the control operations based on another example of the reproducing processing routine shown in FIG. 22.

In step S1507, under the control of the subsample controlling means 404 shown in FIG. 37, the inside memory controlling means 113 reads the subsample flag data SUB from the RAM 93. The read subsample flag data SUB are supplied to the subsample controlling means 404. Then, the process proceeds to step S1508 of the flowchart shown in FIG. 39.

In step S1508, the subsample controlling means 404 shown in FIG. 37 determines whether or not the edition state flag data EDT read out from the RAM 93 has a value of "1". If it is determined as "YES", then the process proceeds to step S1509. If it is determined as "NO", then the process proceeds to step S1511.

In step S1509, the subsample controlling means 404 shown in FIG. 37 determines whether or not the subsample flag data SUB read out from the RAM 93 has a value of "1". If it is determined as "YES", then the process proceeds to step S1510. If it is determined as "NO", then the process proceeds to step S1512.

In step S1510, the subsample controlling means 404 shown in FIG. 37 supplies the integration control signal Mcon to the integrating circuit 804 shown in FIG. 35 in order to control the integrating circuit 804 not to subject the image data to the integration processing and to output the image data as they are. Then, the process proceeds to step S1513. The integration control signal Mcon generated in step S1510 corresponds to a pattern in which lower-order bits shown in FIG. 36B1 are at high "1" level, middle-order bits shown in FIG. 36B2 are at low "0" level and higher-order bits shown in FIG. 36B3 are at high "1" level, and a pattern in which a lower-order bits shown in FIG. 36B1 are at low "0" level and middle-order bits and higher-order bits shown in FIGS. 36B2 and 36B3 are at high "1" level.

In step S1511, the subsample controlling means 404 supplies to the integrating circuit 804 the integration control signal Mcon used to control the integrating circuit 804 to subject the image data to the integration processing and output the same. Then, the process proceeds to step S1513. The integration control signal Mcon generated in step S1510 correspond to a pattern in which lower-order bits shown in FIG. 36B1 and middle-order bits shown in FIG. 36B2 are at high "1" level and higher-order bits shown in FIG. 36B3 are at low "0" level.

In step S1512, the subsample controlling means 404 supplies to the integrating circuit 804 the integration control signal Mcon used to control the integrating circuit 804 to subject the image data to the interpolation processing and output the same. Then, the process proceeds to step S1513. The integration control signal Mcon generated in step S1510 corresponds to a pattern in which lower-order bits shown in FIG. 36B1 are at high "1" level and middle-order bits shown in FIG. 36B2 and higher-order bits shown in FIG. 36B3 are at low "0" level, and a pattern in which a lower-order bits shown in FIG. 36B1 are at low "0" level and middle-order bits shown in FIG. 36B2 are at high "1" level and higher-order bits shown in FIG. 36B3 are at low "0" level.

As described above, in this embodiment, when the time code Pout of the out-point which is the recording end point on the magnetic tape 17 of the recording-side VTR 10 is not positioned at the end of the GOP, the time code Pout of the out-point designated on the magnetic tape 3 of the reproduction-side VCR 1 is displaced and all the insert image are subjected to the coding processing. Further, when the insert image is recorded on the magnetic tape 17, the image data as the I picture, which is not subjected to the subsample processing, at the head of the insert period are recorded on the second track of the two tracks corresponding to the GOP at the head of the insert period. The image data of the B and I pictures of the subsample b at the end of the insert image are recorded on the second track of the two tracks corresponding to the GOP at the end of the insert period. The corresponding B and I pictures of the subsamples a of the insert image and the B and I pictures of the subsample b are recorded on all the tracks corresponding to the rest of GOPs in the insert period.

Accordingly, since the B and I pictures of the subsample a originally recorded on the magnetic tape 17 of the recording-side VCR 10 remains on the first track of the two tracks corresponding to the GOP at the head of the insert period when the image data are reproduced, it is possible to use the I picture of the corresponding track and the I picture originally recorded on the immediately preceding track when the B picture of the subsample a recorded on the track. Since the image data of the I picture which is not subjected to the subsample processing are recorded on the second track thereof, the image data can be decoded by using only the image data of the I picture. Since the B and I pictures of the subsample a originally recorded on the magnetic tape 17 of the recording-side VCR 10 remains on the first track of the two tracks corresponding to the GOP at the end of the insertion period, it is possible to use the I picture of the track and the I picture originally recorded on the immediately preceding track when the B picture of the subsample a recorded on the first track is restored. Since the B and I pictures of the subsample b as the inserted image are recorded on the second track thereof, it is possible to use the I picture of the track and the I picture of the succeeding track when the B picture of the subsample b recorded on the second track is restored.

Therefore, when the image data originally recorded on the magnetic tape 17 is restored, the inserted image is not used. When the inserted image is restored, the image data originally recorded on the magnetic tape 17 are not used. Thus, it is possible to achieve a drastically improved effect in which the remarkable deterioration of the picture quality is prevented from being caused. In addition, since the image data at the head of the insert period are processed as the image data of the I picture which is not subjected to the subsample processing, it is possible to achieve an effect in which the picture quality of the image at the head of the insertion period can be improved.

While the VCR is used and the magnetic tape is used as the recording medium in the first and second embodiments, the present invention is not limited thereto. Even when a hard disc drive apparatus, an optical disc drive apparatus, or a silicon disc drive apparatus is substituted for the recording-side VCR 10 shown in FIG. 16, the same effect can be achieved. In this case, the tape transport unit 14 and the servo control unit 24 shown in FIG. 16 are replaced with a hard disc, the drive unit of the hard disc and a magnetic head if the hard disc drive apparatus is used, replaced with an optical disc, a drive unit of the optical disc and an optical pickup if the optical disc drive apparatus is used, or replaced with a semiconductor memory and a controller of the semiconductor if the silicon disc apparatus is used.

It is possible to employ the subsample processing methods such as a method in which pixel data in the macro block are divided by a field unit, a method in which they are divided into upper and lower sides thereof, a method in which they are divided into left and right sides thereof, a method in which they are divided in an longitudinal order, or a method in which they are divided in a matrix fashion.

While "one" track forms one frame in the first and second embodiments, it may be understood that if n tracks are processed, then the number of tracks forming one frame becomes n. For example, if n=2, then of four tracks forming the GOP at the head of the insertion period, the third and fourth tracks may be formed of the insert image data as the B and I pictures of the subsample b or the insert image data as the I picture which is not subjected to the subsample processing.

In this case, the reference time code data subtracted from the time code data pin of the temporary in-point for obtaining the time code data Pin of the actual reproduction-side in-point are "00h, 00m, 00s, 01f" if the in-point Rin of the designated recording start point is on the second track of the four tracks, "00h, 00m, 00s, 02f" if the in-point Rin is on the third track thereof, or "00h, 00m, 00s, 03f" if the in-point Rin is on the third track thereof.

On the other hand, the reference time code data added to the time code data pout of the temporary out-point for obtaining the time code data Pout of the actual reproduction-side out-point are "00h, 00m, 00s, 03f" if the out-point Rout of the calculated recording end point is on the first track of the four tracks, "00h, 00m, 00s, 02f" if the in-point Rin is on the third track thereof, or "00h, 00m, 00s, 01f" if the in-point Rin is on the third track thereof.

While one GOP is formed of two frames and one frame is formed of two tracks in the first and second embodiments, one GOP may be formed of any frames.

For example, if one GOP is formed of four frames, then one GOP is formed of an amount of four tracks. In this case, the reference time code data are similar as described above.

According to the present invention, in the editing recording in which coded image information is overlappingly recorded on a region where the divided and coded image information of the first group and the divided and coded image information of the second group are recorded, in accordance with the decision steps, it is determined whether or not the recording start frame and the recording end frame of the recording coded image information are coincident with the frames of the middle of the recording units of the coded image information recorded on the recording medium. If in the above decision step it is determined that the recording start frame and the recording end frame of the recording coded image information are coincident with the frames of the middle of the recording units of the coded image information recorded on the recording medium, then in accordance with the third recording step, the divided and coded image information of one group of the recording coded image information is recorded on one region of the first and second regions of the recording region corresponding to the middle frame on the recording medium. Therefore, when the recording medium thus recorded is reproduced, the coded image information reproduced from one region of the first and second regions of the recording region is restored to the original image information by using the coded image information and the coded image information recorded on the recording medium, and the coded image information reproduced from the other region of the first and second regions of the recording region is restored to the original image information by using the coded image information and the coded image information recorded on the recording medium. Thus, it is possible to prevent the inadequate and to drastically improve the picture qualities of the image newly recorded by the editing recording and the reproduced image originally recorded thereon.

Since in the recording step the divided and coded image information and the non-divided and coded image information of one group of the recording coded image information are recorded, when the recording medium thus recorded is reproduced, the coded image information reproduced from one region of the first and second regions of the recording region is restored to the original image information by using the coded image information and the coded image information recorded on the recording medium, and the coded image information reproduced from the other region of the first and second regions of the recording region is restored to the original image information by using the coded image information and the coded image information recorded on the recording medium. Thus, in addition to the above-mentioned effect, it is possible to further improve the image quality of the reproduced image newly recorded by the above insert edition.

According to the present invention, in the normal reproduction mode, under the control of the controlling means, the recording means record the divided and coded image information of the first and second groups on the first and second regions disposed at different positions on the recording medium. In the editing recording in which the coded image information is overlappingly recorded on the region of the recording medium where the coded image information is recorded, when the recording start frame and the recording end frame of the recording coded image information are coincident with the frames of the middle of the recording units of the coded image information recorded on the recording medium, under the control of the controlling means, the recording means overwrite the divided and coded image information of the one group of the recording coded image information on only one region of the first and second regions of the recording region corresponding to the middle frame on the recording medium. Therefore, when the recording medium thus recorded is reproduced, the coded image information reproduced from one region of the first and second regions of the recording region is restored to the original image information by using the coded image information and the coded image information recorded on the recording medium, and the coded image information reproduced from the other region of the first and second regions of the recording region is restored to the original image information by using the coded image information and the coded image information recorded on the recording medium. Thus, it is possible to prevent the inadequate and to drastically improve the picture qualities of the image newly recorded by the editing recording and the reproduced image originally recorded thereon.

According to the present invention, under the control of the control means, the divided and coded image information and the non-divided and coded image information of one group of the recording coded image information is recorded. Therefore, when the recording medium thus recorded is reproduced, the divided and coded image information reproduced from one region of the first and second regions of the recording region is restored to the original image information by using the divided and coded image information and the divided and coded image information recorded on the recording medium, and the divided and coded image information and the non-divided and coded image information reproduced from the other region of the first and second regions of the recording region is restored to the original image information by using the coded image information and the divided and coded image information recorded on the recording medium. Thus, in addition to the above effect, it is possible to further improve the picture quality of the reproduced image information newly recorded by the edition recording.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A method of reproducing image information recorded with decoding information on first and second recording areas of a recording medium in first and second groups of image information which have been intraframe or interframe-coded, the image information being reproduced having been previously edited at insertion start and end points, where either of respective first or second groups of image information were recorded in said first and second recording areas at said insertion start and end points and the other of said first and second groups were recorded in said first and second recording areas between said insertion start and end points, comprising the steps of:

reproducing first and second groups of image information from said recording medium;

detecting whether said first and second groups of image information from one frame are reproduced, if only one group of a frame is reproduced then, interpolating from a reproduced one of said first or second groups of image information to generate whole image information of one frame, otherwise, generating whole image information of one frame from said first and second groups of image information; and decoding said whole image information based on whether said first and second groups were intraframe or interframe-coded when recorded.

2. A method of reproducing image information recorded with decoding information on first and second recording areas of a recording medium in one group that is defined as undivided image information or recorded in first and second groups of image information which have been intra-frame or interframe-coded, with said undivided image information recorded at an insertion start point in said first and second recording areas, either of respective first or second groups of image information being recorded in first and second recording areas at an insertion end point and the other of said first and second groups of image information being recorded in said first or second recording areas between said insertion start and end points, said method comprising the steps of:

selectively reproducing said first and second groups of image information or said undivided image information from said recording medium;

detecting, based on said decoding information, whether said first and second groups of image information from one frame are reproduced or whether said undivided image information is reproduced if said undivided image information has been reproduced, generating whole image information from said undivided image information recorded in said first and second recording areas, if said first and second groups of image information from one frame are reproduced, then generating whole image information from said first and second groups, otherwise, interpolating from a reproduced one of said first or second group of image information to generate whole image information; and decoding said whole image information based on whether said first and second groups of image information or said undivided image information was interframe or intraframe-coded when recorded.

3. An apparatus for reproducing image information recorded with decoding information on first and second recording areas of a recording medium in first and second groups of image information which is interframe or intraframe coded, the image information being reproduced having been previously edited at insertion start and end points, where either of respective first or second groups of image information were recorded in respective first and second recording areas at said insertion start and end points and the other of said first and second groups of image information were recorded in said first and second recording areas between said insertion start and end points, comprising:

reproducing means for reproducing said first and second groups of image information from said recording medium;

detecting means for detecting, based on said decoding information, whether said first and second groups of image information from one frame are reproduced by said reproducing means;

interpolating means for interpolating from a reproduced one of said first or second group to generate whole image information of one frame if only one of said groups is reproduced;

generating means for generating whole image information of one frame from said first and second groups of image information, otherwise; and decoding means for decoding said whole image information based on whether said first and second groups were interframe or intraframe-coded when recorded.

4. Apparatus for reproducing image information stored in one group that is defined as undivided image information or stored in first and second groups of image information with decoding information on first and second recording areas of a recording medium, with said undivided image information being recorded at an insertion start point in said first and second recording areas and, at an insertion end point, either of respective first or second groups of image information being recorded on first and second recording areas, and the other of said first and second groups being recorded on first and second recording areas between said insertion start and end points, said apparatus comprising:

reproducing means for selectively reproducing said first and second groups of image information or undivided image information from said recording medium;

detecting means for detecting, based on said decoding information, whether said first and second groups of image information have been reproduced or whether said undivided image information has been reproduced;

generating means for generating whole image data from said undivided image information or said first and second groups of image information if both are detected to be reproduced;

interpolating means for interpolating from a reproduced one of said first or second group to generate said whole image information if only one of said groups is reproduced; and decoding means for decoding said whole image information based on whether said undivided image information or said first or second group of image information was interframe or intraframe-coded when recorded.

* * * * *